US011936870B2

(12) United States Patent
Piao et al.

(10) Patent No.: US 11,936,870 B2
(45) Date of Patent: Mar. 19, 2024

(54) IMAGE ENCODING METHOD AND DEVICE, AND IMAGE DECODING METHOD AND DEVICE

(71) Applicant: SAMSUNG ELECTRONICS CO., LTD., Suwon-si (KR)

(72) Inventors: Yinji Piao, Suwon-si (KR); Minsoo Park, Suwon-si (KR); Minwoo Park, Suwon-si (KR); Seungsoo Jeong, Suwon-si (KR); Kiho Choi, Suwon-si (KR); Narae Choi, Suwon-si (KR); Woongil Choi, Suwon-si (KR); Anish Tamse, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 199 days.

(21) Appl. No.: 17/532,435

(22) Filed: Nov. 22, 2021

(65) Prior Publication Data

US 2022/0086444 A1   Mar. 17, 2022

Related U.S. Application Data

(63) Continuation of application No. PCT/KR2020/006665, filed on May 21, 2020.
(Continued)

(51) Int. Cl.
*H04N 19/129* (2014.01)
*H04N 19/176* (2014.01)
(Continued)

(52) U.S. Cl.
CPC ......... *H04N 19/129* (2014.11); *H04N 19/176* (2014.11); *H04N 19/18* (2014.11); *H04N 19/46* (2014.11); *H04N 19/96* (2014.11)

(58) Field of Classification Search
None
See application file for complete search history.

(56) References Cited

U.S. PATENT DOCUMENTS 9,813,713 B2   11/2017   Tsukuba et al.
10,390,046 B2   8/2019   Joshi et al.
(Continued)

FOREIGN PATENT DOCUMENTS

JP   2018-78647 A   5/2018
KR   10-1929084 B1   12/2018

OTHER PUBLICATIONS

Karczewicz et al., "CE8-related: Quantized residual BDPCM," JVET-N0413, Joint Video Experts Team (JVET) of ITU-T SG 16 WP 3 and ISO/IEC JTC 1/SC 29/WG 11, 14th Meeting: Geneva, CH, Mar. 2019 (Total 6 pages).
(Continued)

*Primary Examiner* — Rebecca A Volentine
(74) *Attorney, Agent, or Firm* — Sughrue Mion, PLLC

(57) ABSTRACT

An image encoding/decoding method and an apparatus thereof are provided. The decoding method includes: determining a coding unit by splitting an image; determining a transform unit in the coding unit; determining whether to decode residual data of the transform unit according to a transform skip mode; obtaining a significant subgroup flag about a subgroup in the transform unit; based on the significant subgroup flag indicating that the subgroup includes at least one non-zero significant coefficient and scanning information about coefficients of the subgroup, obtaining a first bin about a significant coefficient flag, a sign flag, a first flag, and a parity flag of a coefficient of a scan position; obtaining the residual data including a coefficient in the subgroup based on the base level and a remainder of an absolute value excluding the base level; and obtaining a
(Continued)

reconstruction block of the coding unit, based on the residual data.

4 Claims, 29 Drawing Sheets

Related U.S. Application Data

(60) Provisional application No. 62/850,815, filed on May 21, 2019.

(51) Int. Cl.
    *H04N 19/18*     (2014.01)
    *H04N 19/46*     (2014.01)
    *H04N 19/96*     (2014.01)

(56) References Cited

U.S. PATENT DOCUMENTS

2015/0016537 A1* 1/2015 Karczewicz .......... H04N 19/91
                                                                                                                    375/240.18
2016/0050426 A1   2/2016 Piao et al.
2018/0167612 A1   6/2018 Lee et al.

OTHER PUBLICATIONS

Bross et al., "CE8-related: Context Modelling of Sign for TS Residual Coding," JVET-N0357-v2, Joint Video Experts Team (JVET) of ITU-T SG 16 WP 3 and ISO/IEC JTC 1/SC 29/WG 11, 14th Meeting: Geneva, CH, Mar. 2019 (Total 2 pages).

Sun et al., "CE8: Palette Mode Improvements in HEVC (CE8-2.2)," JVET-N0404, Joint Video Experts Team (JVET) of ITU-T SG 16 WP 3 and ISO/IEC JTC 1/SC 29/WG 11, 14th Meeting: Geneva, SW, Mar. 2019 (Total 9 pages).

Helmrich et al., "CE7-related: Joint chroma residual coding with multiple modes," JVET-N0282-v3, Joint Video Experts Team (JVET) of ITU-T SG 16 WP 3 and ISO/IEC JTC 1/SC 29/WG 11, 14th Meeting: Geneva, CH, Mar. 2019 (Total 10 pages).

Van Der Auwera et al., "CE7-related: Joint coding of chroma residuals," JVET-N0347-v3, Joint Video Experts Team (JVET) of ITU-T SG 16 WP 3 and ISO/IEC JTC 1/SC 29/WG 11, 14th Meeting: Geneva, CH, Mar. 2019 (Total 11 pages).

Communication dated Aug. 26, 2020, issued by the International Searching Authority in counterpart International Application No. PCT/KR2020/006665 (PCT/ISA/220, 210, 237).

Bross et al., "Non-CE8: Unified Transform Type Signalling and Residual Coding for Transform Skip," JVET-M0464-v4, Joint Video Experts Team (JVET) of ITU-T SG 16 WP 3 and ISO/IEC JTC 1/SC 29/WG 11, 13th Meeting: Marrakech, MA, Jan. 2019 (Total 14 pages).

Bross et al., "CE8: Residual Coding for Transform Skip Mode (CE8-4.3a, CE8-4.3b, CE8-4.4a, and CE8-4.4b)," JVET-N0280, Joint Video Experts Team (JVET) of ITU-T SG 16 WP 3 and ISO/IEC JTC 1/SC 29/WG 11, 14th Meeting: Geneva, CH, Mar. 2019 (Total 5 pages).

* cited by examiner

FIG. 3B

```
Last_pos
sigCGflag
for( k ··· ) & remBin>=4 {   // first pass
  sig_flag[ k ]       // ctx depends on prev. state
  if( sig_flag[ k ] ) {
    gt1_flag[ k ]     // ctx does NOT depend on par_flag
    if(gt1_flag[ k ]) {
    par_flag[ k ]
    gt3_flag[ k ]     // ctx does NOT depend on other gt3_flag's
  }}
   coeff[k]+=1 + par_flag+gt1_Flag + (gt3_flag<<1)
}
for( k ···k1 ) {  // second pass (EP bins for remLevel)
  if( gt3_flag[ k ] )
    rem [ k ]
    coeff[k]+=(rem[k]<<1)
}
for( k1 ··· ) {  // third pass (EP bins for fullLevel)
   rem [ k ]
   coeff[k] = rem[ k ] == pos0 ? 0 : rem[k] < pos0 ? rem[k]+1 : rem[k]
}
for( k ··· ){
  sign[k]
}
```

FIG. 3C

```
sigCGflag  if(remBin>0) ctxModel, else bypass
for( k ··· ) {  // first pass
   sig_flag[ k ] if(remBin>0) ctxModel, else bypass
   if( sig_flag[ k ] ) {
    sign[k]  if(remBin>0) ctxModel, else bypass
     gt1_flag[ k ] if(remBin>0) ctxModel, else bypass
    if(gt1_flag[ k ]) {
    par_flag[ k ] if(remBin>0) ctxModel, else bypass
}}
 coeff[k]+=1 + par_flag+gt1Flag
}
for(gtX) { X=3,5,7,9  // second pass
for( k ··· ) {
if(coeff[k]>=X-1)
    gtX_flag[k] if(remBin>0) ctxModel, else bypass
 if( gtX_flag[ k ] )
   coeff[k]+=(gtX_flag[k]<<1)
}}
for( k ··· ) {  // third pass (EP bins for r)
  if(coeff[k]>=10)
  rem [ k ]
  coeff[k]+=(rem[k]<<1)
}
```

FIG. 3D

```
sigCGflag  ctxModel only
for( k ... ) & remBin>=4 {  // first pass
   sig_flag[ k ] ctxModel only
   if( sig_flag[ k ] ) {
     sign[k] ctxModel only
     gt1_flag[ k ] ctxModel only
     if(gt1_flag[ k ]) {
     par_flag[ k ] ctxModel only
}}
 coeff[k]+=1 + par_flag+gt1Flag
}
for(gtX) {  X=3,5,7,9   // second pass
for( k ...k1 ) {
if(coeff[k]>=X-1)
     gtX_flag[k] if(remBin>0) ctxModel, else bypass
  if( gtX_flag[ k ] )
   coeff[k]+=(gtX_flag[k]<<1)
}}
for( k ... k1) {  // third pass (EP bins for r)
   if(coeff[k]>=10)
   rem [ k ]
   coeff[k]+=(rem[k]<<1)
}
for( k1 ... ) {  // fourth pass (EP bins for fullLevel)
   rem [ k ]
   coeff[k] = rem[ k ] == pos0 ? 0 : rem[k] < pos0 ? rem[k]+1 : rem[k]
}
```

FIG. 4C

| state | quantizer | next state | |
|---|---|---|---|
| | | (k & 1) ==0 | (k & 1) ==1 |
| 0 | Q0 | 0 | 2 |
| 1 | Q0 | 2 | 0 |
| 2 | Q1 | 1 | 3 |
| 3 | Q1 | 3 | 1 |

FIG. 16

| DEPTH \ BLOCK SHAPE | 0: SQUARE | 1: NS_VER | 2: NS_HOR |
|---|---|---|---|
| DEPTH D | 1300 | 1310 | 1320 |
| DEPTH D+1 | 1302 | 1312 | 1322 |
| DEPTH D+2 | 1304 | 1314 | 1324 |
| ... | ... | ... | ... |

IMAGE ENCODING METHOD AND DEVICE, AND IMAGE DECODING METHOD AND DEVICE

CROSS-REFERENCE TO RELATED APPLICATION(S)

This application is a bypass continuation application of International Application No. PCT/KR2020/006665, filed May 21, 2020, which is based on and claims priority to U.S. Provisional Application No. 62/850,815, filed May 21, 2019, in the United States Patent and Trademark Office, the disclosures of which are incorporated by reference herein in their entireties.

BACKGROUND

1. Field

The disclosure relates to a method and apparatus for encoding and decoding an image by using various-shape coding units included in the image. When a method and apparatus according to an embodiment performs residual encoding/decoding according to a transform skip mode, the method and apparatus may efficiently arithmetically encode and arithmetically decode information about a coefficient included in a coding unit.

2. Description of Related Art

As hardware capable of reproducing and storing high-resolution or high-quality image content become widely popular, a codec for efficiently encoding or decoding the high-resolution or high-quality image content is in high demand. The encoded image content may be reproduced by decoding the encoded image content. Recently, methods of effectively compressing high-resolution or high-quality image content are used. For example, an efficient image compression method is implemented through a process of randomly processing an image to be encoded.

Various data units may be used to compress images, and an inclusion relation may exist between the data units. A data unit may be split by using various methods to determine a size of the data unit to be used in image compression, and an optimal data unit may be determined based on a characteristic of an image, such that the image may be encoded or decoded.

SUMMARY

In accordance with an aspect of the disclosure, there is provided an image decoding method including: determining at least one coding unit by hierarchically splitting a current image; determining at least one transform unit in the at least one coding unit; determining whether to decode residual data of the at least one transform unit according to a transform skip mode; based on determining that the residual data is to be decoded according to the transform skip mode, obtaining a significant subgroup flag about at least one subgroup in the at least one transform unit; based on the significant subgroup flag indicating that the subgroup includes at least one non-zero significant coefficient and scanning information about coefficients of the subgroup, obtaining at least one first bin about at least one of a significant coefficient flag, a sign flag, a first flag, and a parity flag of a coefficient of a scan position, the at least one first bin being equal to or smaller than a predetermined number of bins and being arithmetic encoded by using a context model; obtaining the residual data including at least one coefficient in the subgroup, based on at least one of a base level of the coefficient of the scan position obtained by arithmetic decoding the first bin by using the context model and a remainder of an absolute value excluding the base level; and obtaining a reconstruction block of the coding unit, based on the residual data, wherein a significant subgroup flag of a current subgroup indicates whether the current subgroup includes the at least one non-zero significant coefficient, a significant coefficient flag of a current scan position indicates whether a coefficient of the current scan position is a non-zero coefficient, a first flag of the current scan position indicates whether an absolute value of the coefficient of the current scan position is greater than 1, and a parity flag of the current scan position indicates whether the coefficient of the current scan position is an odd number of an even number.

The image decoding method further includes: obtaining at least one third bin that is arithmetic encoded in a bypass mode and that indicates a coefficient absolute value, with respect to a coefficient of another scan position other than the coefficient of the scan position related to the first bin from among the coefficients included in the subgroup. The obtaining the residual data including the at least one coefficient included in the subgroup includes: obtaining a first coefficient in the subgroup, based on the at least one of the base level of the coefficient of the scan position obtained by arithmetic decoding the first bin by using the context model and the remainder of the absolute value excluding the base level; obtaining at least one second coefficient by arithmetic decoding, in the bypass mode, the at least one third bin being arithmetic encoded in the bypass mode and indicating the coefficient absolute value; and obtaining the residual data including the first coefficient and the at least one second coefficient, and wherein the obtaining the reconstruction block of the coding unit includes obtaining the reconstruction block of the coding unit, based on the at least one first coefficient and the at least one second coefficient.

The obtaining the first bin about the at least one of the significant coefficient flag, the sign flag, the first flag, and the parity flag of the coefficient of the scan position includes, when a number of bins remaining in the predetermined number of bins after being arithmetic decoded by using the context model before the current scan position is scanned is equal to or greater than 4, obtaining a first bin about the at least one of the significant coefficient flag, the sign flag, the first flag, and the parity flag of the coefficient of the current scan position.

The determining whether the transform unit is to be decoded according to the transform skip mode includes, when a component in the transform unit is a luma component and, and the residual data is to be decoded according to a multiple transform selection scheme skip mode with respect to the transform unit, or the residual data is to be decoded according to a block-based delta pulse code modulation (BDPCM) mode, determining that the residual data is to be decoded according to the transform skip mode with respect to the transform unit.

The image decoding method further includes: based on the significant coefficient flag of the coefficient of the current scan position indicating that the coefficient of the current scan position is the significant coefficient, and when a number of bins remaining after a number of first bins and bins about a second flag obtained before the current scan position is scanned is deducted from the predetermined number of bins is equal to or greater than 4, obtaining a second bin about a second flag of the coefficient of the current scan position, the second bin being arithmetic encoded by using the context model, wherein the second flag indicates whether the absolute value of the coefficient of the current scan position is greater than a first value, and wherein the first value is an odd number greater than 1.

The image decoding method further includes: obtaining the base level of the coefficient of the scan position, based on the second bin about the second flag; and based on the obtained base level of the coefficient of the scan position being equal to or greater than a second value, obtaining a bin about the remainder of the absolute value of the coefficient of the scan position, the bin being arithmetic encoded in the bypass mode.

The image decoding method further includes: based on the residual data being determined not to be decoded according to the transform skip mode with respect to the transform unit, obtaining the residual data by inverse-transforming the at least one transform coefficient in the transform unit, wherein the obtaining the residual data by inverse-transforming the at least one transform coefficient in the transform unit includes: obtaining last significant coefficient position information indicating a position of a last significant coefficient of the transform unit; obtaining a significant subgroup flag about at least one subgroup in the transform unit, based on the obtained last significant coefficient position information; based on the significant subgroup flag indicating that the subgroup includes at least one non-zero significant coefficient, obtaining, by scanning the information about the transform coefficients of the subgroup, a first bin including at least one of the significant coefficient flag, the first flag, the parity flag, and a second flag of the coefficient of the scan position, the first bin being equal to or smaller than a predetermined number of bins and being arithmetic encoded in the bypass mode by using the context model; and obtaining the residual data by obtaining the at least one transform coefficient in the subgroup, based on the at least one of the base level of the coefficient of the scan position which is obtained by arithmetic decoding the first bin by using the context model and the remainder of the absolute value excluding the base level of the coefficient of the scan position, and by inverse-quantizing and inverse-transforming the at least one transform coefficient in the subgroup, wherein the second flag indicates whether the absolute value of the coefficient of the scan position is greater than a first value, and wherein the first value is an odd number greater than 1.

The image decoding method further includes: obtaining at least one second bin that is arithmetic encoded in the bypass mode and that indicates an absolute value of the transform coefficient of the other scan position with respect to a transform coefficient of another scan position other than the transform coefficient of the scan position related to the first bin from among the transform coefficients in the subgroup, wherein the obtaining the residual data by obtaining the at least one transform included in the subgroup by inverse-quantizing and inverse-transforming the at least one transform coefficient included in the subgroup includes: obtaining at least one first transform coefficient in the subgroup, based on at least one of the base level which is obtained by arithmetic decoding the first bin by using the context model and the remainder of the absolute value excluding the base level, and obtaining at least one second transform coefficient by arithmetic decoding the at least one second bin in the bypass mode, the at least one second bin being arithmetic encoded in the bypass mode and indicating the absolute value of the transform coefficient; and obtaining the residual data including the at least one first coefficient and the at least one second coefficient by inverse-quantizing and inverse-transforming the at least one first transform coefficient and the second transform coefficient included in the subgroup, and obtaining a reconstruction block of the coding unit, based on the at least one first coefficient and the at least one second coefficient.

The obtaining the residual data including the first coefficient and the at least one second coefficient includes: obtaining the coefficient absolute value by performing Golomb-Rice inverse-binarization on a bin generated by arithmetic decoding the at least one third bin in the bypass mode, and obtaining the at least one second coefficient, based on the coefficient absolute value.

The image decoding method further includes: obtaining at least one second bin at a scan position of the second flag based on a value of the second flag, the at least one second bin being arithmetic encoded in the bypass mode and indicating a remainder of an absolute value of the transform coefficient, wherein the obtaining the residual data by obtaining the at least one transform coefficient in the subgroup by inverse-quantizing and inverse-transforming the at least one transform coefficient in the subgroup includes: obtaining a base level of at least one transform coefficient of a scan position of the second flag by arithmetic decoding the first bin by using the context mode, obtaining the remainder of the absolute value of the at least one transform coefficient at the scan position of the second flag by performing Golomb-Rice inverse-binarization on a bin generated by arithmetic decoding the second bin in the bypass mode, and obtaining the at least one transform coefficient at the scan position of the second flag, based on the base level of the at least one transform coefficient at the scan position of the second flag and the remainder of the absolute value of the at least one transform coefficient at the scan position of the second flag; and obtaining the residual data by inverse-quantizing and inverse-transforming the at least one transform coefficient at the scan position of the second flag, and wherein the second flag indicates whether the absolute value of the coefficient of the scan position is greater than a second value, and wherein the second value is an odd number greater than 1.

In accordance with an aspect of the disclosure, there is provided an image decoding apparatus including: at least one processor configured to: determine at least one coding unit by hierarchically splitting a current image; determine at least one transform unit in the at least one coding unit; determine whether to decode residual data of the at least one transform unit according to a transform skip mode; based on determining that the residual data is to be decoded according to the transform skip mode, obtain a significant subgroup flag about at least one subgroup in the at least one transform unit; based on the significant subgroup flag indicating that the subgroup includes at least one non-zero significant coefficient and scan information about coefficients of the subgroup, obtain at least one first bin about at least one of a significant coefficient flag, a sign flag, a first flag, and a parity flag of a coefficient of a scan position, the at least one first bin being equal to or smaller than a predetermined number of bins and being arithmetic encoded by using a context model, obtain the residual data including at least one coefficient in the subgroup, based on at least one of a base level of the coefficient of the scan position obtained by arithmetic decoding the first bin by using the context model and a remainder of an absolute value excluding the base level, and obtain a reconstruction block of the coding unit, based on the residual data, wherein a significant subgroup flag of a current subgroup indicates whether the current subgroup includes the at least one non-zero significant coefficient, a significant coefficient flag of a current scan position indicates whether a coefficient of the current scan position is a non-zero coefficient, a first flag of the current scan position indicates whether an absolute value of the coefficient of the current scan position is greater than 1, and a parity flag of the current scan position indicates whether the coefficient of the current scan position is an odd number of an even number.

In accordance with an aspect of the disclosure, there is provided an image encoding method including: determining at least one coding unit by hierarchically splitting a current image; determining at least one transform unit included in the coding unit; determining whether to encode residual data of the at least one transform unit according to a transform skip mode; based on determining that the residual data is to be encoded according to the transform skip mode, generating a significant subgroup flag about at least one subgroup in the at least one transform unit; based on the subgroup including at least one non-zero significant coefficient and scanning information about coefficients of the subgroup, generating at least one first bin by arithmetic encoding at least one of a significant coefficient flag, a sign flag, a first flag, and a parity flag of a coefficient of a scan position by using a context model, the at least one first bin being equal to or less than a predetermined number of bins; and generating a bitstream including the residual data that includes the significant subgroup flag and the first bin, wherein a significant subgroup flag of a current subgroup indicates whether the current subgroup includes at least one non-zero significant coefficient, a significant coefficient flag of a current scan position indicates whether a coefficient of the current scan position is a non-zero coefficient, a first flag of the current scan position indicates whether an absolute value of the coefficient of the current scan position is greater than 1, and a parity flag of the current scan position indicates whether the coefficient of the current scan position is an odd number of an even number.

The image encoding method further includes: generating at least one third bin by arithmetic encoding a coefficient absolute value in a bypass mode with respect to a coefficient of another scan position other than the coefficient of the scan position related to the first bin from among the coefficients included in the subgroup, and wherein the generating the bitstream including the significant subgroup flag and the first bin further includes generating the bitstream including the significant subgroup flag, the first bin, and the third bin.

The generating the first bin by arithmetic encoding the at least one includes, when a number of bins remaining from the predetermined number of bins after being arithmetic encoded by using the context model before the current scan position is scanned is equal to or greater than 4, generating the first bin by arithmetic encoding the at least one of the significant coefficient flag, the sign flag, the first flag, and the parity flag of the coefficient of the current scan position by using the context model, wherein the image encoding method further includes, when the coefficient of the current scan position is a significant coefficient, and a number of bins remaining after a number of first bins and bins about a second flag obtained before the current scan position is scanned are deducted from the predetermined number of bins is equal to or greater than 4, generating a bin about the second flag by arithmetic encoding the second flag of the coefficient of the current scan position by using the context model, and wherein the second flag indicates whether the absolute value of the coefficient of the current scan position is greater than a first value, and wherein the first value is an odd number greater than 1.

The image encoding method further includes: based on determining that the residual data is not to be encoded according to the transform skip mode, generating the residual data by transforming at least one coefficient in the at least one transform unit, wherein the generating the residual data by transforming the at least one coefficient included in the at least one transform unit further includes: generating at least one transform coefficient by transforming the at least one coefficient included in the transform unit; generating last significant coefficient position information indicating a position of a last significant coefficient of the at least one transform unit; generating a significant subgroup flag about at least one subgroup included in the at least one transform unit; and when the subgroup includes at least one non-zero significant coefficient, generating, by scanning information about transform coefficients of the subgroup, a first bin about at least one of a significant coefficient flag, a first flag, a parity flag, and a second flag of a transform coefficient of the scan position, the first bin being equal to or smaller than a predetermined number of bins and being arithmetic encoded by using the context model, and wherein the second flag indicates whether the absolute value of the coefficient of the scan position is greater than a first value, and wherein the first value is an odd number greater than 1.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3B is a diagram illustrating pseudo-code of normal coefficient coding according to an embodiment;

FIG. 3C is a diagram illustrating pseudo-code of coefficient coding in a transform skip mode according to an embodiment;

FIG. 3D is a diagram illustrating pseudo-code of coefficient coding in a transform skip mode according to an embodiment;

FIGS. 4A to 4C are diagrams for describing a dependent quantization process according to an embodiment;

FIG. 16 illustrates a process of determining a depth of a coding unit as a shape and size of the coding unit change, when the coding unit is recursively split such that a plurality of coding units are determined, according to an embodiment;

DETAILED DESCRIPTION

Figure 1A:
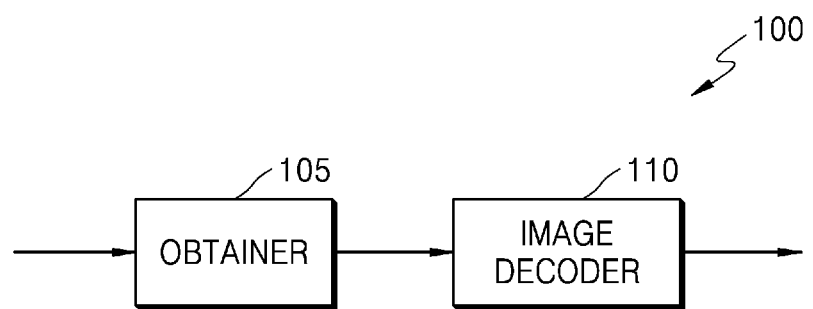
FIG. 1A is a block diagram of an image decoding apparatus, according to various embodiments.

An image decoding method according to an embodiment of the disclosure includes: determining at least one coding unit by hierarchically splitting a current image; determining at least one transform unit included in the coding unit; determining whether residual data is to be decoded according to a transform skip mode, with respect to the transform unit; when the residual data is to be decoded according to the transform skip mode, with respect to the transform unit, obtaining a significant subgroup flag about at least one subgroup included in the transform unit; and when the significant subgroup flag indicates that the subgroup includes at least one non-zero significant coefficient, scanning information about coefficients of the subgroup, and thus, obtaining at least one first bin about at least one of a significant coefficient flag, a sign flag, a first flag, and a parity flag of a coefficient of a scan position, the at least one first bin being equal to or smaller than a predetermined number of bins and being arithmetic encoded by using a context model; obtaining residual data including at least one coefficient included in the subgroup, based on at least one of a base level of the coefficient of the scan position which is obtained by arithmetic decoding the first bin by using the context model and a remainder of an absolute value excluding the base level and obtaining a reconstruction block of the coding unit, based on the residual data, wherein a significant subgroup flag of a current subgroup indicates whether the current subgroup includes at least one non-zero significant coefficient, a significant coefficient flag of a current scan position is a flag indicating whether a coefficient of the current scan position is a non-zero coefficient, a first flag of the current scan position is a flag indicating whether an absolute value of the coefficient of the current scan position is greater than 1, and a parity flag of the current scan position is a flag indicating whether the coefficient of the current scan position is an odd number of an even number.

An image decoding apparatus according to an embodiment of the disclosure may include: at least one processor configured to determine at least one coding unit by hierarchically splitting a current image, determine at least one transform unit included in the coding unit, determine whether residual data is to be decoded according to a transform skip mode, with respect to the transform unit, when the residual data is to be decoded according to the transform skip mode, with respect to the transform unit, obtain a significant subgroup flag about at least one subgroup included in the transform unit, when the significant subgroup flag indicates that the subgroup includes at least one non-zero significant coefficient, scan information about coefficients of the subgroup, and thus, obtain at least one first bin about at least one of a significant coefficient flag, a sign flag, a first flag, and a parity flag of a coefficient of a scan position, the at least one first bin being equal to or smaller than a predetermined number of bins and being arithmetic encoded by using a context model, obtain residual data including at least one coefficient included in the subgroup, based on at least one of a base level of the coefficient of the scan position which is obtained by arithmetic decoding the first bin by using the context model and a remainder of an absolute value excluding the base level, and obtain a reconstruction block of the coding unit, based on the residual data, wherein a significant subgroup flag of a current subgroup indicates whether the current subgroup includes at least one non-zero significant coefficient, a significant coefficient flag of a current scan position is a flag indicating whether a coefficient of the current scan position is a non-zero coefficient, a first flag of the current scan position is a flag indicating whether an absolute value of the coefficient of the current scan position is greater than 1, and a parity flag of the current scan position is a flag indicating whether the coefficient of the current scan position is an odd number of an even number.

An image encoding method according to an embodiment of the disclosure may include: determining at least one coding unit by hierarchically splitting a current image; determining at least one transform unit included in the coding unit; determining whether residual data is to be encoded according to a transform skip mode, with respect to the transform unit; when the residual data is to be encoded according to the transform skip mode, with respect to the transform unit, generating a significant subgroup flag about at least one subgroup included in the transform unit; when the subgroup includes at least one non-zero significant coefficient, scanning information about coefficients of the subgroup, and thus generating at least one first bin by arithmetic encoding at least one of a significant coefficient flag, a sign flag, a first flag, and a parity flag of a coefficient of a scan position by using a context model, the at least one first bin being equal to or less than a predetermined number of bins; and generating a bitstream including residual data including the significant subgroup flag and the first bin, wherein a significant subgroup flag of a current subgroup indicates whether the current subgroup includes at least one non-zero significant coefficient, a significant coefficient flag of a current scan position is a flag indicating whether a coefficient of the current scan position is a non-zero coefficient, a first flag of the current scan position is a flag indicating whether an absolute value of the coefficient of the current scan position is greater than 1, and a parity flag of the current scan position is a flag indicating whether the coefficient of the current scan position is an odd number of an even number.

The image encoding method may further include: with respect to a coefficient of another scan position other than the coefficient of the scan position related to the first bin from among the coefficients included in the subgroup, generating at least one third bin by arithmetic encoding a coefficient absolute value in a bypass mode, and wherein the generating of the bitstream including the significant subgroup flag and the first bin may include generating a bitstream including the significant subgroup flag, the first bin, and the third bin.

An image encoding method according to an embodiment of the disclosure may include: determining at least one coding unit by hierarchically splitting a current image; determining at least one transform unit included in the coding unit; determining whether residual data is to be encoded according to a transform skip mode, with respect to the transform unit; when the residual data is to be encoded according to the transform skip mode, with respect to the transform unit, generating a significant subgroup flag about at least one subgroup included in the transform unit; when the subgroup includes at least one non-zero significant coefficient, scanning information about coefficients of the subgroup, and thus generating at least one first bin by arithmetic encoding at least one of a significant coefficient flag, a sign flag, a first flag, and a parity flag of a coefficient of a scan position by using a context model, the at least one first bin being equal to or less than a predetermined number of bins; and generating a bitstream including residual data including the significant subgroup flag and the first bin, wherein a significant subgroup flag of a current subgroup indicates whether the current subgroup includes at least one non-zero significant coefficient, a significant coefficient flag of a current scan position is a flag indicating whether a coefficient of the current scan position is a non-zero coefficient, a first flag of the current scan position is a flag indicating whether an absolute value of the coefficient of the current scan position is greater than 1, and a parity flag of the current scan position is a flag indicating whether the coefficient of the current scan position is an odd number of an even number.

The image encoding method may further include: with respect to a coefficient of another scan position other than the coefficient of the scan position related to the first bin from among the coefficients included in the subgroup, generating at least one third bin by arithmetic encoding a coefficient absolute value in a bypass mode, and wherein the generating of the bitstream including the significant subgroup flag and the first bin may include generating a bitstream including the significant subgroup flag, the first bin, and the third bin.

A computer program of an image decoding method according to an embodiment of the disclosure may be recorded on a computer-readable recording medium.

DETAILED DESCRIPTION

Various aspects, features and advantages of the embodiments of the disclosure will be more apparent from the following description with reference to the accompanying drawings. In this regard, the disclosure may have different forms and should not be construed as being limited to the embodiments set forth herein. Rather, these embodiments are provided so that this disclosure will be thorough and complete and will fully convey the inventive concept of the disclosure to one of ordinary skill in the art.

The terms used in the disclosure will be briefly defined, and the embodiments will be described in detail.

All terms including descriptive or technical terms which are used in the disclosure should be construed as having meanings that are generally known to one of ordinary skill in the art. However, the terms may have different meanings according to the intention of one of ordinary skill in the art, precedential cases, or the appearance of new technologies. Also, some terms may be arbitrarily selected by the applicant, and the meaning of the selected terms will be described in detail in the disclosure. Therefore, the terms used in the disclosure should not be interpreted only based on their names, but should be interpreted based on the meaning of the terms in context of the present disclosure.

In the following description, singular forms may include plural forms unless the context clearly indicates otherwise.

When a part "includes" or "comprises" an element, unless there is a particular description contrary thereto, the part may further include other elements, not excluding the other elements.

In the following description, terms such as "unit" may indicate software or a hardware component, and the "unit" performs certain functions. However, the "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units".

According to an embodiment of the disclosure, "unit" may be implemented as a processor and a memory. The term "processor" should be interpreted broadly to include a general purpose processor, a central processing unit (CPU), a microprocessor, a digital signal processor (DSP), a controller, a microcontroller, a state machine, and the like. In some environments, the "processor" may refer to an application specific integrated circuit (ASIC), a programmable logic device (PLD), a field programmable gate array (FPGA), or the like. The term "processor" may refer to a combination of processing devices such as, for example, a combination of a DSP and a microprocessor, a combination of a plurality of microprocessors, a combination of one or more microprocessors in conjunction with a DSP core, or a combination of any other such configurations.

The term "memory" should be interpreted broadly to include any electronic component capable of storing electronic information. The term "memory" may refer to various types of processor-readable media, such as random access memory (RAM), read-only memory (ROM), non-volatile random access memory (NVRAM), programmable read-only memory (PROM), erase-programmable read-only memory (EPROM), electrically erasable PROM (EEPROM), flash memory, a magnetic or optical data storage device, registers, and the like. When the processor can read information from a memory and/or write information to the memory, the memory is stated to be in an electronic communication state with the processor. The memory integrated in the processor is in an electronic communication state with the processor.

Hereinafter, an "image" may be a static image such as a still image of a video or may be a dynamic image such as a moving image, such as a video.

Hereinafter, a "sample" denotes data assigned to a sampling position of an image, e.g., data to be processed. For example, pixel values of an image in a spatial domain and transform coefficients on a transform domain may be samples. A unit including at least one such sample may be defined as a block. Hereinafter, the disclosure will now be described more fully with reference to the accompanying drawings for one of ordinary skill in the art to be able to perform the embodiments without any difficulty. In addition, portions irrelevant to the description will be omitted in the drawings for a clear description of the disclosure.

Hereinafter, an image encoding apparatus and an image decoding apparatus, and an image encoding method and an image decoding method according to an embodiment will be described with reference to FIGS. 1 to 19.

With reference to FIGS. 6 to 19, a method of determining a data unit of an image according to an embodiment will be described, and with reference to FIGS. 1A to 5B, an image encoding or decoding method and apparatus that efficiently arithmetic encode/arithmetic decode information about a coefficient included in a coding unit when performing residual encoding/decoding (hereinafter, 'residual encoding/decoding' will be also referred to as 'residual coding') according to a transform skip mode will be described.

Here, the transform skip mode refers to a mode in which an image encoding apparatus performs encoding on a coefficient by not performing a transformation operation on residual data (e.g., by skipping the transformation operation) and by performing quantization and arithmetic encoding, and an image decoding apparatus does not perform an inverse-transformation operation on the residual data and performs arithmetic decoding and inverse-quantization. Here, the residual data refers to data indicating a difference between data of an original image and data of a prediction image, and includes data of at least one coefficient. According to the transform skip mode, the transformation (inverse-transformation) operation is not performed, such that a coefficient included in the residual data may be a value of a spatial domain.

Hereinafter, with reference to FIGS. 1A to 5B, an image encoding or decoding method and apparatus that efficiently arithmetic encode/arithmetic decode information about a coefficient included in a coding unit when performing residual encoding/decoding according to the transform skip mode will be described.

FIG. 1A is a block diagram of an image decoding apparatus, according to various embodiments.

An image decoding apparatus 100 according to various embodiments may include an obtainer 105 and an image decoder 110. The obtainer 105 and the image decoder 110 may each include at least one processor. Also, the obtainer 105 and the image decoder 110 may each include at least one memory storing one or more instructions to be executed by the at least one processor.

The image decoder 110 and the obtainer 105 may be implemented as separate hardware components, or the image decoder 110 may include the obtainer 105. The image decoder 110 may include an arithmetic decoder, and the arithmetic decoder may perform arithmetic decoding on at least one bin of various parameter information related to residual data or an image. The image decoder 110 may obtain the residual data of the image, based on the arithmetic decoded bin obtained by the arithmetic decoder, or may obtain information (e.g., syntax element) of various parameters related to the image.

In this regard, the at least one bin of the various parameter information related to the residual data or the image may be parsed from a bitstream through the obtainer 105. Here, a bin may mean one bit indicating 0 or 1. In this regard, the arithmetic decoder may perform binary arithmetic decoding on the bin by using a context model (binary arithmetic decoding on the bin according to a regular mode) or may perform binary arithmetic decoding on the bin according to a bypass mode. Here, the context model may be information about an occurrence probability of the bin. The information about the occurrence probability of the bin may include information indicating one symbol of a least probable symbol (LPS) that is a symbol for which occurrence probability is relatively low from among two symbols of 0 and 1, and a most probable symbol (MPS) is a symbol for which occurrence probability is high, and information about an occurrence probability of one symbol. As information about an occurrence probability of remaining symbol is information about a probability obtained by subtracting the occurrence probability of one symbol from a total probability of 1, when the occurrence probability of one symbol is determined, the arithmetic decoder may determine the occurrence probability of remaining symbol. Here, the occurrence probability of one symbol which is first determined may be an occurrence probability of an LPS. Occurrence probabilities of a symbol corresponding to index values may be predetermined in a table, and occurrence probability information about the symbol may be information indicating an index indicating the occurrence probabilities of the symbol which are determined in the table. The context model may be determined based on a bin index indicating a position of a bin, an occurrence probability of a bin included in a neighboring block, and various elements of a current block or the neighboring block. A bypass mode may be a mode in which the context model is not used, and binary arithmetic decoding is performed with each of symbol occurrence probabilities fixed at 0.5 (or another predetermined probability).

According to a type of target information or a position of a bin, the arithmetic decoder may selectively perform binary arithmetic decoding on at least one bin of the target information by using the context model, or perform binary arithmetic decoding on the at least one bin of the target information, according to the bypass mode. That is, the arithmetic decoder may perform binary arithmetic decoding, according to a context-adaptive binary arithmetic coding (CABAC) technique. Hereinafter, with reference to FIG. 3A, the CABAC technique will now be described in detail.

Hereinafter, in the CABAC technique, a mode in which binary arithmetic decoding is performed by using a context model is referred to as a regular mode. The image decoder 110 may determine at least one coding unit by hierarchically splitting a current image. For example, the image decoder 110 may determine at least one coding unit by hierarchically splitting the current image, based on a split shape mode of the current image. Here, the split shape mode may indicate at least one of whether splitting is to be performed, a split direction, and a split type. The split type may indicate one of binary split, tri split, and quad split. The obtainer 105 may obtain information about the split shape mode of the current image, and the image decoder 110 may determine the at least one coding unit by hierarchically splitting the current image, based on the obtained information about the split shape mode of the current image.

The image decoder 110 may determine at least one transform unit included in a coding unit. For example, the image decoder 110 may determine a transform unit to have a same size as a coding unit, but the disclosure is not limited thereto, and when a size of the coding unit is greater than a predetermined size, the image decoder 110 may determine a plurality of transform units by splitting the coding unit.

The image decoder 110 may determine whether residual data is to be decoded according to the transform skip mode, with respect to the transform unit. For example, when a component of the transform unit is a luma component and if residual data for the transform unit is to be decoded according to a multiple transform selection scheme skip mode or decoded according to a block-based delta pulse code modulation (BDPCM) mode, the image decoder 110 may determine that the residual data is to be decoded according to the transform skip mode, with respect to the transform unit. In this regard, a multiple transform selection scheme (MTS) technique refers to a scheme of performing a (inverse) transformation operation by selecting transform kernels in horizontal direction/vertical direction from among various transform kernels, and for example, the various transform kernels may include, but not limited to, DCT-2, DST-7, and DCT-8. An MTS technique skip mode may indicate a mode in which the (inverse) transformation operation according to the MTS technique is skipped.

The BDPCM mode may indicate a mode in which a residual signal of a block is determined by performing intra prediction by using a reference sample of a neighboring block in a predetermined prediction direction (e.g., a vertical direction or a horizontal direction), the residual signal is quantized, and a difference between a current sample in the block and the quantized residual signal of a previously-encoded sample is encoded (DPCM) in a horizontal direction or a vertical direction. Even in the BDPCM mode, the (inverse) transformation operation may not be performed.

However, the disclosure is not limited to a case in which the component of the transform unit is the luma component, and when the transform unit is a chroma component, the image decoder 110 may determine that the residual data is to be decoded according to the transform skip mode, with respect to the transform unit.

When the residual data is to be decoded according to the transform skip mode, with respect to the transform unit, the obtainer 105 may obtain a significant subgroup flag (or a significant subblock flag or a significant coefficient group flag) about at least one subgroup included in the transform unit. Here, the subgroup includes a subblock but is not limited thereto, and thus may include a predetermined number (e.g., 16) of coefficients to be scanned according to a scan order. The subblock may be a block having a predetermined size which may be 4×4, but is not limited thereto, and thus, may have various sizes (e.g., its height and width are multiples of 4).

The significant subgroup flag may be a flag indicating whether a corresponding subgroup includes at least one non-zero significant coefficient. Here, the obtainer 105 may obtain a bin of the significant subgroup flag which is binary arithmetic encoded by using a context model.

When the significant subgroup flag indicates that the corresponding subgroup includes at least one non-zero significant coefficient, the obtainer 105 may scan information about coefficients of the subgroup according a predetermined scan order (e.g., an order includes, but not limited to, a predetermined scan pattern in a forward direction (diagonal scan, horizontal scan, vertical scan, etc.)), and thus, may obtain at least one first bin about at least one of a significant coefficient flag, a sign flag, a first flag, and a parity flag of a coefficient of a scan position. The at least one first bin may be equal to or smaller than a predetermined number of bins and may be arithmetic encoded by using the context model. The predetermined number of bins may be equal to 28 but is not limited thereto, and thus, may be determined based on a height and a width of the subgroup (in this case, the subblock). Also, the predetermined number of bins may be determined for each of subgroups. Alternatively, the predetermined number of bins may be determined for each of transform units according to sizes of the transform units. For example, the predetermined number of bins may be determined based on a width and a height of a transform unit. However, the disclosure is not limited thereto, and thus, the predetermined number of bins may be determined as various values.

For example, the obtainer 105 may set an initial number of remaining bins as the predetermined number of bins (e.g., 28 bins), and when at least one of a significant coefficient flag, a sign flag, a first flag, and a parity flag of a coefficient which is arithmetic encoded by using the context model is obtained, the obtainer 105 may deduct its value, and only when the number of remaining bins is equal to or greater than 4, the obtainer 105 may obtain at least one of a significant coefficient flag, a sign flag, a first flag, and a parity flag of a coefficient of a corresponding scan position which is arithmetic encoded by using the context model.

Here, scanning refers to an operation of obtaining data related to coefficients in a first-dimensional array and mapping the data to be positioned in a second-dimensional array (e.g., a block), and the data related to the coefficients of a first dimension may be mapped to coefficients of particular positions in a two-dimensional block.

A significant coefficient flag of a coefficient position being currently scanned may be a flag indicating whether a coefficient of a current scan position is a non-zero coefficient (e.g., whether the coefficient is a significant coefficient). A parity flag of the coefficient position being currently scanned may be a flag indicating whether the coefficient of the current scan position is an odd number or an even number. A first flag of the coefficient position being currently scanned may be a Greater Than 1 (GT1) flag that indicates whether an absolute value of the coefficient of the current scan position is greater than 1.

According to an embodiment, when the number of bins remaining from a predetermined number of bins after being decoded by using a context model before a current scan position is scanned is equal to or greater than 4, the obtainer 105 may obtain a first bin of at least one of a significant coefficient flag, a sign flag, a first flag, and a parity flag of the current scan position. When all of the significant coefficient flag, the sign flag, the first flag, and the parity flag are obtained with respect to the current scan position, 4 bins are may be used to the maximum degree, such that, when the number of remaining bins is smaller than 4, the obtainer 105 may not obtain a bin about the aforementioned flags at a corresponding scan position.

In a process of scanning the information about the coefficients of the subgroup according a predetermined scan order, the obtainer 105 may obtain only a bin about at least one of the significant coefficient flag, the sign flag, the first flag, and the parity flag, the bin being arithmetic encoded by using the context model. Therefore, in this case, the obtainer 105 may not obtain a bin which is about a significant coefficient flag, a first flag, and a parity flag and may perform arithmetic encoding in a bypass mode.

According to an embodiment, in a process of scanning the information about the coefficients of the subgroup according a predetermined scan order in a first scan pass, the obtainer 105 may not obtain a significant coefficient flag, a sign flag, a first flag, and a parity flag arithmetic encoded in the bypass mode. Here, a scan pass may indicate a series of processes of obtaining information of coefficients included in a subgroup by overall scanning the information of the coefficients included in the subgroup. For example, the first scan pass may indicate a series of processes of scanning information of a significant coefficient flag, a sign flag, a first flag, and a parity flag, a second scan pass may indicate a series of processes of scanning information of a second flag (e.g., a GTX flag described below), and a third scan pass may indicate a series of processes of scanning information of the remainder of an absolute value of a coefficient excluding the absolute value (e.g. a base level described below) of the coefficient expressed by the aforementioned flags. Here, a first bin may indicate at least one bin obtained from the first scan pass, and may be a bin about at least one of the significant coefficient flag, the sign flag, the first flag, and the parity flag.

However, the disclosure is not limited thereto, and the sign flag may be scanned according to a scan pass separate from the first scan pass.

The obtainer 105 may obtain (a bin about) a significant coefficient flag of a coefficient of a scan position, and when a value of the significant coefficient flag is 1 (e.g., when the value indicates that it is a significant coefficient), the obtainer 105 may additionally obtain (a bin about) a sign flag or a GT1 flag with respect to the corresponding scan position. Also, when a value of the GT1 flag is 1, the obtainer 105 may obtain (a bin about) a parity flag. The image decoder 110 may determine an absolute value (or a level) of the coefficient of the corresponding scan position, based on at least one value from among the aforementioned flags. For example, the image decoder 110 may determine the absolute value of the coefficient of the corresponding scan position, based on a value obtained by summing a value of the parity flag and the value of the GT1 flag, may determine a sign of the coefficient of the corresponding scan position based on a value of the sign flag, and may determine a value of the coefficient, based on the absolute value of the coefficient and the sign of the coefficient.

Here, the absolute value of the coefficient which is determined based on the aforementioned flags may be referred to as a base level. The base level indicates a level of a base and means an absolute value (or a level) determined based on a plurality of pieces of flag information about the coefficient. Here, when additional coefficient information is not obtained at the corresponding scan position, the base level may become a final absolute value, but, when the additional coefficient information is obtained, the base level is an intermediate value and may be updated based on additional coefficient flag information (e.g., a GTX flag). When the absolute value of the coefficient cannot be determined based on only flag information, a bin about the remainder of the absolute value excluding the base level may be obtained.

The image decoder 110 may obtain residual data including at least one coefficient included in a subgroup, based on at least one of the base level of the coefficient of the scan position and the remainder of the absolute value excluding the base level which are obtained by arithmetic decoding the first bin by using a context model. The image decoder 110 may obtain, by arithmetic decoding the first bin by using the context model, a syntax element about at least one of the significant coefficient flag, the sign flag, the first flag, and the parity flag of the coefficient of the corresponding scan position included in the subgroup, and may obtain the absolute value (the base level) of the coefficient of the scan position, based on a value of the syntax element. As described above, the base level may be updated based on the additional coefficient flag information, and when the absolute value of the coefficient cannot be determined based on only the base level, the remainder of the absolute value excluding the base level may be additionally obtained.

The image decoder 110 may obtain a reconstruction block of a coding unit, based on the residual data. The image decoder 110 may obtain a prediction block by performing inter prediction or intra prediction on the coding unit, may determine a reconstruction sample value of the reconstruction block of the coding unit by summing a value of a coefficient of a residual block (a residual sample value) included in the residual data and a prediction sample value of the prediction block, and may obtain the reconstruction block, based on the reconstruction sample value.

With respect to a coefficient of another scan position other than the coefficient of the scan position related to the first bin from among the coefficients included in the subgroup, the obtainer 105 may obtain at least one third bin that is arithmetic encoded with a bypass and indicates an absolute value of the coefficient. Here, the third bin may be a bin obtained from the third scan pass. In this regard, as flag information about a coefficient of an obtained scan position of the third bin is not obtained, a base level may be 0, and thus, the third bin may indicate the entirety of an absolute value.

That is, with respect to a coefficient of a scan position from which the first bin is not obtained, a bin that is arithmetic encoded in a bypass mode and is about a significant coefficient flag, a first flag, and a parity flag may not be obtained but at least one third bin that is arithmetic encoded with a bypass and indicates the entirety of a coefficient absolute value may be obtained. Here, a sign flag of the coefficient of the corresponding scan position which is arithmetic encoded with a bypass may be obtained from a scan pass equal to a scan pass from which the third bin is obtained or from a scan pass thereafter.

The image decoder 110 may obtain a syntax element about at least one of a significant coefficient flag, a sign flag, a first flag, and a parity flag of the coefficient of the corresponding scan position by arithmetic decoding the first bin by using the context model, and may obtain at least one first coefficient of the corresponding scan position, based on the obtained syntax element.

That is, the image decoder 110 may obtain a base level of a coefficient of the corresponding scan position, based on the aforementioned flags. The image decoder 110 may obtain the first coefficient of the corresponding scan position, based on at least one of the base level and the remainder of an absolute value, the remainder excluding the base level. Here, because residual decoding is performed according to a transform skip mode, the first coefficient may be obtained by performing inverse-quantization without an inverse-transformation operation. That is, the first coefficient may be a value of a spatial domain.

The image decoder 110 may obtain a syntax element about the entirety of an absolute value of a coefficient of the corresponding scan position by arithmetic decoding at least one third bin in a bypass mode, and may obtain at least one second coefficient of the corresponding scan position, based on the syntax element about the entirety of the absolute value. That is, the absolute value of the coefficient of the scan position from which the third bin is obtained may be determined without referring to a flag of the coefficient, and thus, a base level may be 0 and the remainder of the absolute value excluding the base level may be the entirety of the absolute value.

In particular, the image decoder 110 may obtain the entirety of a coefficient absolute value by performing Golomb-Rice inverse-binarization on a bin generated by arithmetic decoding at least one third bin in a bypass mode, and may obtain the at least one second coefficient of the corresponding scan position by inverse-quantizing an absolute value of the obtained coefficient, based on the entirety of the absolute value.

The image decoder 110 may obtain a reconstruction block of a coding unit, based on the at least one first coefficient and the at least one second coefficient. The image decoder 110 may obtain a residual block of the coding unit, based on the at least one first coefficient and the at least one second coefficient, and may obtain the construction block of the coding unit by summing a value of a coefficient of the residual block (a residual sample value) and a prediction sample value of a prediction block of the coding unit.

When a significant coefficient flag of a coefficient of a scan position which is arithmetic encoded by using the context model indicates that the coefficient of the corresponding scan position is a significant coefficient, the obtainer 105 may additionally scan flag information of the coefficient of the corresponding scan position, according to a predetermined scan order with respect to significant coefficients.

For example, when the number of remaining bins excluding the first bin from a predetermined number of bins is equal to or greater than 4, the obtainer 105 may obtain a bin which is about a second flag of a coefficient of a scan position and is arithmetic encoded at a first scan position by using the context model. When the number of remaining bins is smaller than 4, the bin about the second flag may not be obtained, and a base level may be determined based on a value of a flag obtained in a first scan pass. In this case, a second scan pass may be skipped, and a third bin about the remainder of an absolute value of the coefficient, the remainder excluding the base level, may be obtained in a third scan pass.

When the number of remaining bins is equal to or greater than 4, the obtainer 105 may obtain a bin which is about a second flag of a coefficient of a scan position and is arithmetic encoded in a second scan pass by using the context model.

When the number of bins remaining after the second flag obtained before a current scan position is scanned is additionally excluded from a predetermined number of bins is equal to or greater than 4, the obtainer 105 may obtain the bin which is about the second flag of the coefficient of the scan position and is arithmetic encoded at the corresponding scan position by using the context model. Here, the second flag may be a Greater Than X (GTX; where X is an odd number greater than 1) flag. That is, the second flag may indicate whether an absolute value of the coefficient of the scan position is greater than a first value, and the first value may be an odd number greater than 1 and more preferably, may be, but is not limited to, one of 3, 5, 7, and 9.

For example, when the number of remaining bins at the current scan position is equal to or greater than 4, the obtainer 105 may obtain at least one of GT3, GT5, GT7, and GT9 flags. In particular, the obtainer 105 may first obtain a bin about the GT3 flag at the current scan position, when a value of the GT3 flag is 1, the obtainer 105 may obtain a bin about the GT5 flag, and when the value is 0, the obtainer 105 may not additionally obtain a bin at the corresponding scan position. Also, when a value of the GT5 flag is 1, a bin about the GT7 flag may be obtained, when the value is 0, the bin about the GT7 flag may not be obtained. Equally, a bin about the GT9 flag may be obtained or may not be obtained. Here, the reason why a GTX flag of a corresponding scan position is obtained in a case where the number of remaining bin is equal to or greater than 4 is because a maximum number of bins of the GTX flag which are obtained at the corresponding scan position is equal to 4, and thus, when the number of remaining bin is smaller than 4, a bin of the GTX flag may not be obtained with respect to the corresponding scan position. Therefore, it will be understood by one of ordinary skill in the art that a condition for the number of remaining bins may vary according to types of the GTX flag.

For example, while the obtainer 105 scans significant coefficients according to a predetermined scan order, the obtainer 105 may obtain (a bin of) a GT3 flag with respect to the significant coefficients, and the image decoder 110 may determine a value of the GT3 flag by arithmetic decoding the GT3 flag by using the context model.

Here, when the value of the GT3 flag is 0, additional information of a coefficient of a corresponding scan position may not be obtained, and an absolute value of a coefficient level may be determined as an absolute value of the coefficient which is determined immediately before with respect to the corresponding scan position (a base level determined at a first scan pass).

When the value of the GT3 flag is 1, the obtainer 105 may obtain (a bin of) the GT5 flag which is additional information of the coefficient of the corresponding scan position. Here, the absolute value of the coefficient level may be determined by adding 2 to the absolute value of the coefficient which is determined immediately before with respect to the corresponding scan position (the base level determined at the first scan pass). That is, the base level may be updated by the GT5 flag.

When a value of the GT5 flag is 0, the image decoder 110 may operate similar to a case where the value of the GT3 flag is 0. When the value of the GT5 flag of the corresponding scan position is 1, the image decoder 110 may operate similar to a case where the value of the GT3 flag is 1. Here, (a bin of) the GT7 flag and (a bin of) the GT9 flag which are additional information may be obtained, and the base level may be updated or the absolute value of the coefficient may be determined as a base level that is determined immediately before.

Here, the obtainer 105 may deduct one from the number of remaining bins when the obtainer 105 additionally obtains a bin, and when the number of remaining bins is equal to or smaller than 0, the obtainer 105 may no longer obtain a bin arithmetic encoded by using the context model but may obtain a bin arithmetic encoded in a bypass mode, and the image decoder 110 may obtain a GTX flag by arithmetic decoding the bin in the bypass mode, but the image decoder 110 is not limited thereto, and thus, may obtain only a bin about a GTX flag, the bin being arithmetic encoded by using the context model, and may not obtain the bin about the GTX flag, the bin being arithmetic encoded in the bypass mode.

When an absolute value (base level) of a coefficient of a scan position which is updated through obtainment of a value of the GTX flag or an absolute value (base level) previously determined without obtaining the value of the GTX flag, is greater than or equal to predetermined second value, the obtainer 105 may obtain a bin about the remainder of an absolute value of a coefficient of a corresponding scan position, the bin being arithmetic encoded in the bypass mode in a third scan pass. Here, the predetermined second value may be a minimum value from among available absolute values of a coefficient of a case where a value of a flag whose X value is maximal (a maximum GTX flag) from among types of the GTX flag is 1. For example, in a case where the maximum flag X value from among the GTX flag is 9, an available absolute value of a coefficient may be equal to or greater than 10, and the predetermined second value may be 9 that is the minimum thereof. However, the disclosure is not limited thereto, and when the value of the GTX flag is not obtained, the predetermined second value may indicate a maximum base level that can be determined by only a flag obtained from the first scan pass. That is, in this case, it may be 2.

The image decoder 110 may obtain the remainder of a coefficient absolute value by performing Golomb-Rice inverse-binarization on a bin string generated by arithmetic decoding, in a bypass mode, a bin about the remainder of the absolute value of the at least one coefficient, and may determine the absolute value of the at least one coefficient, based on a base level and a value of the remainder of the coefficient absolute value. Here, the bin string indicates one or more bins.

For example, the obtainer 105 may obtain a bin about the remainder of an absolute value of a coefficient, the bin being arithmetic encoded in a bypass mode, and the image decoder 110 may obtain a value of the remainder of the coefficient absolute value by performing Golomb-Rice inverse-binarization on a bin string about the remainder of the absolute value of the coefficient, the bin string being generated by arithmetic decoding in a bypass mode, and may update the coefficient absolute value, based on a value obtained by multiplying 2 by the obtained value (preferably, a calculation of multiplication by 2 may be replaced by a calculation of left shifting by 1 bit).

In the above, an operation of decoding residual data according to a transform skip mode is described in detail. Hereinafter, an operation of not decoding residual data according to the transform skip mode (e.g., a normal case in which residual decoding is performed including an inverse-transformation operation) will now be described.

When residual data is not to be decoded according to the transform skip mode, with respect to a transform unit, the image decoder 110 may obtain the residual data by inverse-transforming at least one transform coefficient included in the transform unit. Here, the transform coefficient is a coefficient of a transform domain which is generated by performing a transformation operation on a coefficient of a spatial domain of a residual block, and in order to obtain the coefficient of the spatial domain, the image decoder 110 may perform an inverse-transformation operation.

The obtainer 105 may obtain, from a bitstream, last significant coefficient position information indicating a position of a last significant coefficient of the transform unit. The obtainer 105 may obtain a significant subgroup flag about at least one subgroup included in the transform unit, based on the last significant coefficient position information.

When the significant subgroup flag indicates that a corresponding subgroup includes at least one non-zero significant coefficient, the obtainer 105 may obtain, by scanning information about transform coefficients of the subgroup, a first bin about at least one of a significant coefficient flag, a first flag, a parity flag, and a second flag of a transform coefficient of a scan position, the first bin being arithmetic encoded by using the context model. Here, the first bin may be obtained in a first scan pass, and at least one first bin being equal to or smaller than a predetermined number of bins may be obtained.

The predetermined number of bins may be equal to that of the transform skip mode, but is not limited thereto, and thus may be separately determined. Here, a sign flag may be obtained in a scan pass separate from the first scan pass, but it will be understood by one of ordinary skill in the art that the sign flag may be obtained in the first scan pass, similar to the transform skip mode.

In this case, the obtainer 105 may obtain only a bin arithmetic encoded by using the context model, and may not obtain a bin arithmetic encoded in a bypass mode.

According to an embodiment, when the number of bins remaining from the predetermined number of bins after being decoded by using the context model before a current scan position is scanned is equal to or greater than 4, the obtainer 105 may obtain a first bin about at least one of a significant coefficient flag, a first flag, a parity flag, and a second flag of the current scan position. Here, the second flag may be a GT3 flag indicating whether an absolute value of a transform coefficient of a scan position is greater than 3, but is not limited thereto and may indicate whether the absolute value of the transform coefficient of the scan position is greater than an odd number greater than 1.

When all of the significant coefficient flag, the first flag, the parity flag, and the second flag are obtained with respect to the current scan position, 4 bins are required to the maximum degree, such that, when the number of remaining bins is smaller than 4, the obtainer 105 may not obtain a bin about the aforementioned flags at the corresponding scan position.

The image decoder 110 may obtain at least one transform coefficient included in the subgroup, by arithmetic decoding the first bin by using the context model.

For example, the image decoder 110 may obtain a base level of a coefficient of a scan position by arithmetic decoding the first bin by using the context model. The image decoder 110 may obtain the at least one transform coefficient included in the subgroup, based on at least one of the base level and the remainder of an absolute value excluding the base level.

The image decoder 110 may obtain residual data by inverse-transforming the at least one transform coefficient included in the subgroup.

Similar to residual decoding according to the transform skip mode, the obtainer 105 may obtain a bin of the significant coefficient flag and the first flag. When a value of the first flag is 1, the obtainer 105 may obtain a bin of a second flag along with the parity flag.

The image decoder 110 may determine the absolute value of the transform coefficient by adding a value of the second flag*2 to values of the first flag and the parity flag. Here, the absolute value of the transform coefficient may be the base level.

When a value of the GT3 flag is 1, the obtainer 105 may additionally obtain a bin indicating the remainder of the absolute value of the transform coefficient of the corresponding scan position. Here, the obtained bin may be a bin that is arithmetic encoded in a bypass mode.

The image decoder 110 may obtain the remainder of the absolute value of the transform coefficient by arithmetic decoding the bin indicating the remainder of the absolute value of the transform coefficient according to the bypass mode.

In detail, the image decoder 110 may obtain the remainder of the absolute value of the transform coefficient by performing Golomb-Rice inverse-binarization on a bin string generated by arithmetic decoding the bin indicating the remainder of the absolute value of the transform coefficient according to the bypass mode. The image decoder 110 may determine the absolute value of the transform coefficient as a value obtained by adding the base level to a value obtained by multiplying a value of the remainder of the absolute value by 2.

With respect to a transform coefficient of another scan position other than the transform coefficient of the scan position related to the first bin from among the transform coefficients included in the subgroup, the obtainer 105 may obtain at least one second bin that is arithmetic encoded in a bypass mode and indicates the entirety of the absolute value of the transform coefficient.

The image decoder 110 may obtain a value indicating the entirety of the absolute value by arithmetic decoding the second bin in the bypass mode, and may obtain at least one second transform coefficient, based on the value indicating the entirety of the absolute value. In particular, the image decoder 110 may obtain an absolute value of a transform coefficient by performing Golomb-Rice inverse-binarization on a bin generated by arithmetic decoding a bin indicating the entirety of an absolute value of a coefficient, according to the bypass mode.

As described above, the image decoder 110 may obtain the at least one transform coefficient (a first transform coefficient) by arithmetic decoding the first bin by using the context model.

The image decoder 110 may obtain residual data including the at least one first transform coefficient and the at least one second transform coefficient by inverse-transforming and inverse-quantizing the at least one first transform coefficient and the at least one second transform coefficient included in the subgroup. Here, the first transform coefficient and the second transform coefficient may be values of a spatial domain.

The image decoder 110 may obtain a reconstruction block of a coding unit, based on the at least one first transform coefficient and the at least one second transform coefficient.

Figure 1B:
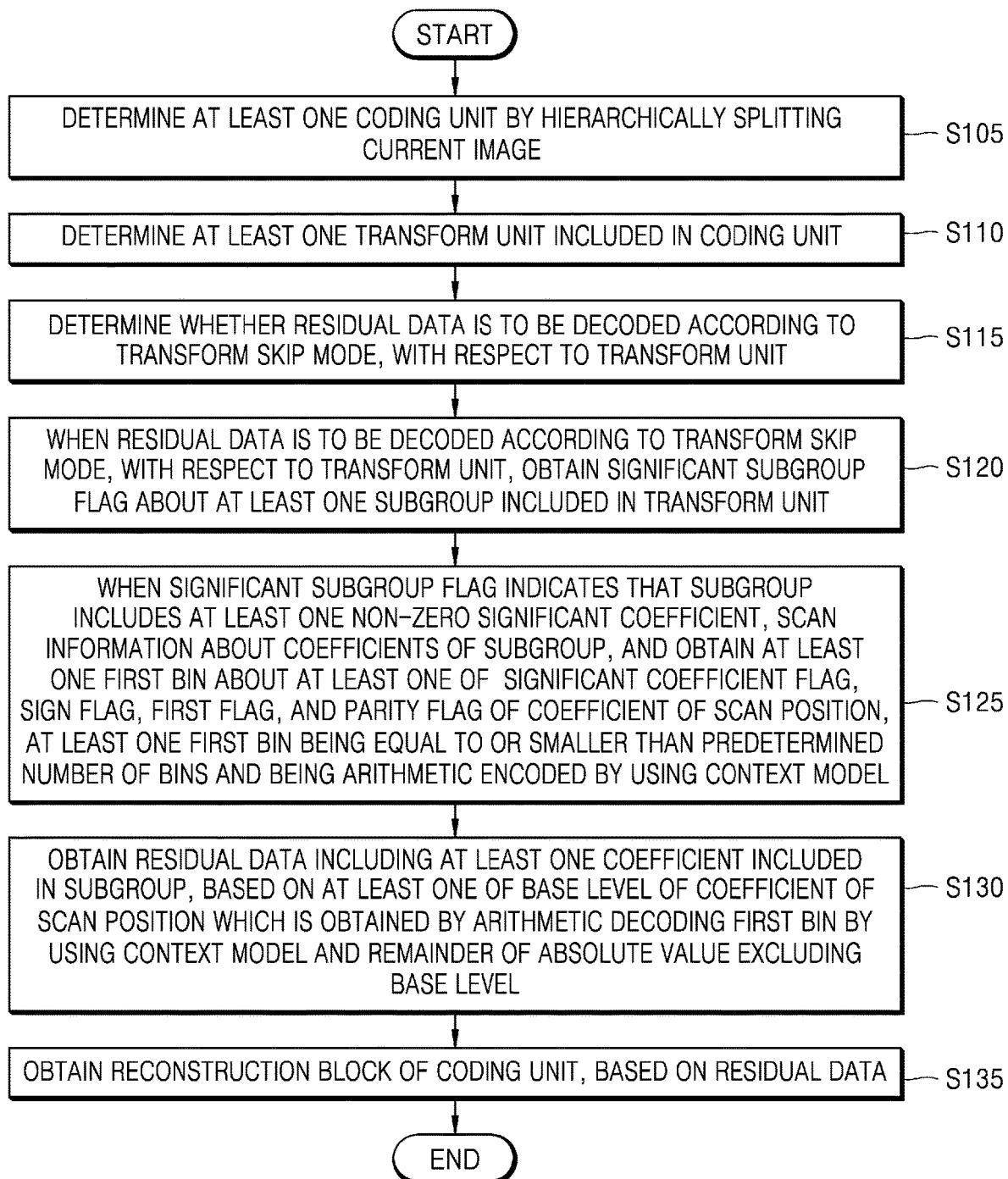
FIG. 1B illustrates a flowchart of an image decoding method according to various embodiments.

FIG. 1B illustrates a flowchart of an image decoding method according to various embodiments.

In operation S105, the image decoding apparatus 100 may determine at least one coding unit by hierarchically splitting a current image.

In operation S110, the image decoding apparatus 100 may determine at least one transform unit included in the coding unit.

In operation S115, the image decoding apparatus 100 may determine whether residual data is to be decoded according to a transform skip mode, with respect to the transform unit.

In operation S120, when the residual data is to be decoded according to the transform skip mode, with respect to the transform unit, the image decoding apparatus 100 may obtain a significant subgroup flag about at least one subgroup included in the transform unit. The significant subgroup flag may indicate whether the subgroup includes at least one non-zero significant coefficient.

In operation S125, when the significant subgroup flag indicates that the subgroup includes at least one non-zero significant coefficient, the image decoding apparatus 100 may scan information about coefficients of the subgroup, and thus, may obtain at least one first bin about at least one of a significant coefficient flag, a sign flag, a first flag, and a parity flag of a coefficient of a scan position, the at least one first bin being equal to or smaller than a predetermined number of bins and being arithmetic encoded by using a context model. Here, only a bin arithmetic encoded by using the context model may be obtained, and a bin arithmetic encoded in a bypass mode may not be obtained. Here, a maximum number of first bins to be obtained may be determined for each of subgroups or each of transform units.

Also, a significant coefficient flag of a current scan position may be a flag indicating whether a coefficient of the current scan position is a non-zero coefficient. The first flag may be a flag (GT1 flag) indicating whether an absolute value of the coefficient of the current scan position is greater than 1.

With respect to a coefficient of another scan position other than a coefficient of a scan position related to the first bin from among the coefficients included in the subgroup, the image decoding apparatus 100 may obtain at least one third bin that is arithmetic encoded in a bypass mode and indicates a coefficient absolute value.

When the number of bins remaining from a predetermined number of bins after being arithmetic decoded by using a context model before the current scan position is scanned is equal to or greater than 4, the image decoding apparatus 100 may obtain a significant coefficient flag, a sign flag, a first flag, and a parity flag of the current scan position.

When the number of bins remaining after the number of first bins and bins about a second flag obtained before the current scan position is scanned is deducted from a predetermined number of bins is equal to or greater than 4, the image decoding apparatus 100 may obtain a second bin about the second flag of the coefficient of the current scan position, the second bin being arithmetic encoded by using the context model.

Here, the second flag may indicate whether the absolute value of the coefficient of the scan position is greater than a first value, and the first value may be an odd number greater than 1.

In operation S130, the image decoding apparatus 100 may obtain residual data including at least one coefficient included in the subgroup, based on at least one of a base level of the coefficient of the scan position which is obtained by arithmetic decoding the first bin by using the context model and the remainder of the absolute value excluding the base level. The image decoding apparatus 100 may determine the base level of the scan position by arithmetic encoding the first bin by using the context model, and when the remainder of the absolute value excluding the base level exists, the image decoding apparatus 100 may obtain the remainder of the absolute value, and thus, may obtain at least one first coefficient, based on at least one of the base level and the remainder of the absolute value.

The image decoding apparatus 100 may obtain at least one second coefficient by arithmetic decoding in a bypass mode, and at least one third bin indicating the entirety of a coefficient absolute value by arithmetically encoding in the bypass mode.

In operation S135, the image decoding apparatus 100 may obtain a reconstruction block of the coding unit, based on the residual data. The image decoding apparatus 100 may obtain the reconstruction block of the coding unit, based on the obtained at least one first coefficient and second coefficient.

Figure 1C:
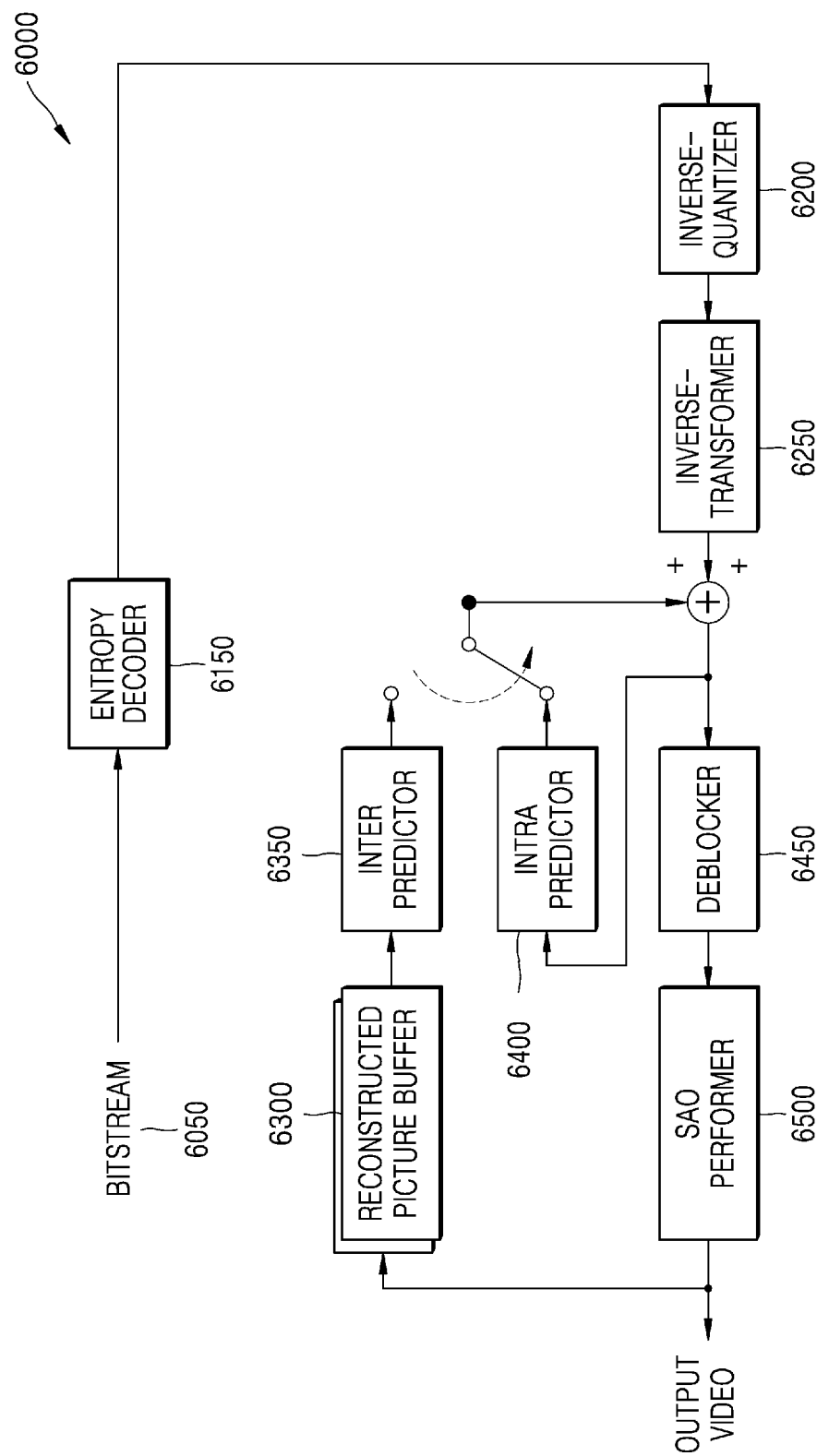
FIG. 1C is a block diagram of an image decoder according to various embodiments.

FIG. 1C is a block diagram of an image decoder 6000 according to various embodiments.

The image decoder 6000 according to various embodiments performs operations necessary for the obtainer 105 and the image decoder 110 of the image decoding apparatus 100 to decode image data.

Referring to FIG. 1C, an entropy decoder 6150 parses, from a bitstream 6050, encoded image data to be decoded, and encoding information necessary for decoding. The encoded image data is a quantized transform coefficient, and an inverse-quantizer 6200 and an inverse-transformer 6250 reconstruct residual data from the quantized transform coefficient.

An intra predictor 6400 performs intra prediction on each of blocks. An inter predictor 6350 performs inter prediction on each block by using a reference image obtained from a reconstructed picture buffer 6300. Data of a spatial domain for a block of a current image may be reconstructed by adding residual data and prediction data of each block which are generated by the intra predictor 6400 or the inter predictor 6350, and a deblocker 6450 and a sample adaptive offset (SAO) performer 6500 may perform loop filtering on the reconstructed data of the spatial domain, such that a filtered reconstructed image 6600 may be output. Reconstructed images stored in the reconstructed picture buffer 6300 may be output as a reference image.

In order for the obtainer 105 and the image decoder 110 of the image decoding apparatus 100 to encode the image data, the image decoder 6000 according to various embodiments may perform operations of each stage on each block.

For example, an operation of the entropy decoder 6150 may correspond to operations of the obtainer 105 and the arithmetic decoder included in the image decoder 110.

Figure 2A:
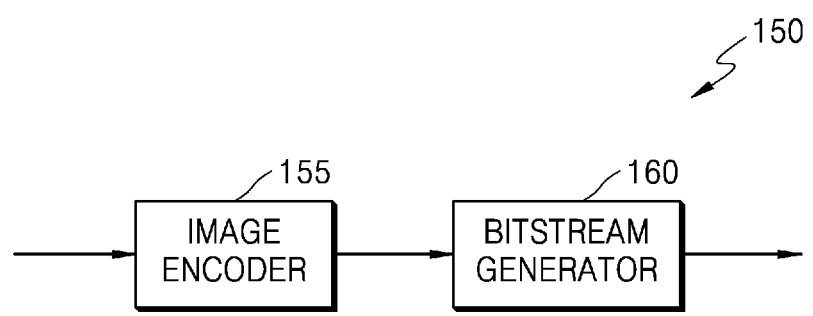
FIG. 2A is a block diagram of an image encoding apparatus, according to various embodiments.

FIG. 2A is a block diagram of an image encoding apparatus, according to various embodiments.

An image encoding apparatus 150 according to various embodiments may include an image encoder 155 and a bitstream generator 160.

The image encoder 155 and a bitstream generator 160 may each include at least one processor. Also, the image encoder 155 and a bitstream generator 160 may each include a memory storing one of more instructions to be executed by the at least one processor. The image encoder 155 and the bitstream generator 160 may be implemented as separate hardware components, or the image encoder 155 may include the bitstream generator 160.

The image encoder 155 may determine at least one coding unit by hierarchically splitting a current image. For example, the image encoder 155 may determine at least one coding unit by hierarchically splitting the current image, based on a split shape mode of the current image. Here, the split shape mode may indicate at least one of whether splitting is to be performed, a split direction, and a split type. The split type may indicate one of binary split, tri split, and quad split.

The image encoder 155 may encode information about the split shape mode of the current image, and the bitstream generator 160 may generate a bitstream including the encoded information about the split shape mode of the current image.

The image encoder 155 may include an arithmetic encoder, and the arithmetic encoder may generate a bin after performing binarization on a syntax element of various parameters related to residual data or an image, perform arithmetic encoding on the bin, and generate the arithmetic encoded bin. Here, the arithmetic encoder may perform binary arithmetic encoding on the binarized bin by using a context model, or may perform binary arithmetic encoding on the binarized bin according to a bypass mode.

According to a type of target information or a position of a bin, the arithmetic encoder may selectively perform binary arithmetic encoding by using the context model, or perform binary arithmetic encoding, according to the bypass mode. That is, the arithmetic encoder may perform arithmetic encoding, according to the CABAC technique. Hereinafter, with reference to FIG. 3A, the CABAC technique will now be described in detail.

The bitstream generator 160 may generate a bitstream including an arithmetic encoded bin.

The image encoder 155 may determine at least one transform unit included in a coding unit. For example, the image encoder 155 may determine a transform unit to have a same size as a coding unit, but the disclosure is not limited thereto, and when a size of the coding unit is greater than a predetermined size, the image encoder 155 may determine a plurality of transform units by splitting the coding unit.

The image encoder 155 may determine whether residual data is to be encoded according to a transform skip mode, with respect to the transform unit. For example, when a component of the transform unit is a luma component and, with respect to the transform unit, residual data is to be encoded according to a multiple transform selection scheme skip mode, or with respect to the transform unit, the residual data is to be encoded according to a BDPCM mode, the image encoder 155 may determine that the residual data is to be encoded according to the transform skip mode, with respect to the transform unit.

However, the disclosure is not limited to a case where the component of the transform unit is the luma component, and in a case of a chroma component, the image encoder 155 may determine that the residual data is to be encoded according to the transform skip mode, with respect to the transform unit.

When the residual data is to be encoded according to the transform skip mode, with respect to the transform unit, the image encoder 155 may generate a significant subgroup flag about at least one subgroup included in the transform unit.

When the subgroup includes at least one non-zero significant coefficient, the image encoder 155 may scan information about the subgroup, and thus may generate at least one first bin by arithmetic encoding at least one of a significant coefficient flag, a sign flag, a first flag, and a parity flag of a coefficient of a scan position by using a context model, the at least one first bin being equal to or less than a predetermined number of bins. Here, scanning refers to an operation of generating data related to coefficients in a second-dimensional array and the generated data may be mapped to particular positions in a first-dimensional array. As the data of the first-dimensional array is requested for arithmetic encoding, the scan operation is performed first.

Here, a significant coefficient flag of a coefficient position being currently scanned may be a flag indicating whether a coefficient of a current scan position is a non-zero coefficient. Also, a first flag of the coefficient position being currently scanned may be a GT1 flag that indicates whether an absolute value of the coefficient of the current scan position is greater than 1.

A parity flag may be a flag indicating whether the coefficient of the current scan position is an odd number or an even number. Here, the image encoder 155 may arithmetic encode only a bin about a flag of the aforementioned coefficient by using a context model, and may not arithmetic encode the bin about the flag of the aforementioned coefficient in a bypass mode.

Before the arithmetic encoding, binarization may be performed on a syntax element, and a first bin may be generated by arithmetic encoding the binarized bin. Before the binarization, quantization may be performed on a residual of a coefficient value.

The image encoder 155 may arithmetic encode at least one of a second flag for determining a base level and the remainder of an absolute value, the remainder excluding the base level, based on a value of a coefficient of a scan position, and thus, may obtain a bin about at least one of the second flag and the remainder of the absolute value.

When the number of bins remaining from a predetermined number of bins after being arithmetic encoded by using a context model before the current scan position is scanned is equal to or greater than 4, the image encoder 155 may generate the first bin by arithmetic encoding at least one of a significant coefficient flag, a sign flag, a first flag, and a parity flag of the coefficient of the current scan position by using the context model.

In a case where the coefficient of the current scan position (where the first bin is generated) is a significant coefficient, when the number of bins remaining after the number of first bins and bins about a second flag obtained before the current scan position is scanned are deducted from a predetermined number of bins is equal to or greater than 4, the image encoder 155 may generate a bin about the second flag by arithmetic encoding the second flag of the coefficient of the current scan position by using the context model. Here, the second flag may indicate whether the absolute value of the coefficient of the scan position is greater than a first value, and the first value may be an odd number greater than 1. For example, the first value may be, but is not limited to, one of 3, 5, 7, and 9.

According to an embodiment, the image encoder 155 may first generate a GT3 flag of the coefficient of the current scan position, and when a value of the GT3 flag is 1, the image encoder 155 may additionally generate a GT5 flag. The image encoder 155 may generate GT7 and GT9 flags in a manner similar to generation of the GT5 flag.

The bitstream generator 160 may generate a bitstream including residual data including the significant subgroup flag and the first bin. Here, a bitstream further including the second bin about at least one of the second flag and the remainder of the absolute value may be generated.

With respect to a coefficient of another scan position other than the coefficient of the scan position related to the first bin from among the coefficients included in the subgroup, the image encoder 155 may generate at least one third bin by arithmetic encoding a coefficient absolute value in a bypass mode. Here, before the arithmetic encoding, a binarized bin may be generated by performing Golomb-Rice binarization on the absolute value of the coefficient, and the arithmetic encoding may be performed on the binarized bin in the bypass mode. Here, the bitstream generator 160 may generate a bitstream including the significant subgroup flag, the first bin, and the third bin.

In order to express the absolute value of the coefficient of the scan position, the image encoder 155 may arithmetic encode additional information (e.g., the remainder of the coefficient absolute value) in addition to the second flag. When the absolute value (or base level) of the coefficient of the scan position is equal to or greater than a minimum value from among absolute values of the coefficient of a case where a value of a maximum GTX flag is 1, the image encoder 155 may arithmetic encode the remainder of the absolute value of the coefficient in a bypass mode. Here, before the arithmetic encoding, a binarized bin may be generated by performing Golomb-Rice binarization on the remainder of the absolute value of the coefficient, and the arithmetic encoding may be performed on the binarized bin in the bypass mode.

However, the disclosure is not limited thereto, and, when the number of bins remaining from a predetermined number of bins after obtainment of the first bin is less than 4, the image encoder 155 may not perform arithmetic encoding on the second flag, and in this case, a maximum base level may be 2, and in this case, when the absolute value of the coefficient of the scan position is equal to or greater than 2 (maximum base level), the image encoder 155 may arithmetic encode the remainder of the absolute value, the remainder excluding the maximum base level.

In the above, an operation of a case where residual data is encoded according to a transform skip mode is described in detail. Hereinafter, an operation of a case where residual data is not encoded according to the transform skip mode (e.g., a normal case in which encoding is performed including a transformation operation) will now be described.

When residual data is not encoded according to the transform skip mode, with respect to a transform unit, the image encoder 155 may generate the residual data by transforming at least one coefficient included in the transform unit. For example, the image encoder 155 may generate at least one transform coefficient by transforming at least one coefficient included in the transform unit. The image encoder 155 may generate last significant coefficient position information indicating a position of a last significant coefficient of the transform unit.

The image encoder 155 may generate a significant subgroup flag about at least one subgroup included in the transform unit. When the subgroup includes at least one non-zero significant coefficient, the image encoder 155 may scan information about coefficients of the subgroup, and thus may generate at least one first bin by arithmetic encoding at least one of a significant coefficient flag, a first flag, a parity flag, and a second flag of a coefficient of a scan position by using a context model, the at least one first bin being equal to or less than a predetermined number of bins. Here, the second flag may indicate whether an absolute value of the coefficient of the scan position is greater than a first value, and the first value may be an odd number greater than 1, more preferably, 3, but is not limited thereto.

Here, at least one of a significant coefficient flag, a first flag, a parity flag, and a second flag of a transform coefficient of the scan position may be arithmetic encoded by using the context model, and the significant coefficient flag, the first flag, the parity flag, and the second flag may not be arithmetic encoded in a bypass mode.

When the second flag indicates that the absolute value of the coefficient of the scan position is greater than the first value, the image encoder 155 may generate a bin about the remainder of the absolute value by arithmetic encoding the remainder of the absolute value of the coefficient of the scan position in the bypass mode. Here, before the arithmetic encoding, a binarized bin may be generated by performing Golomb-Rice binarization on the remainder of the absolute value of the coefficient, and the arithmetic encoding may be performed on the binarized bin in the bypass mode.

The bitstream generator 160 may generate a bitstream including position information of a last significant coefficient, the significant subgroup flag, and at least one of the generated various bins.

Figure 2B:
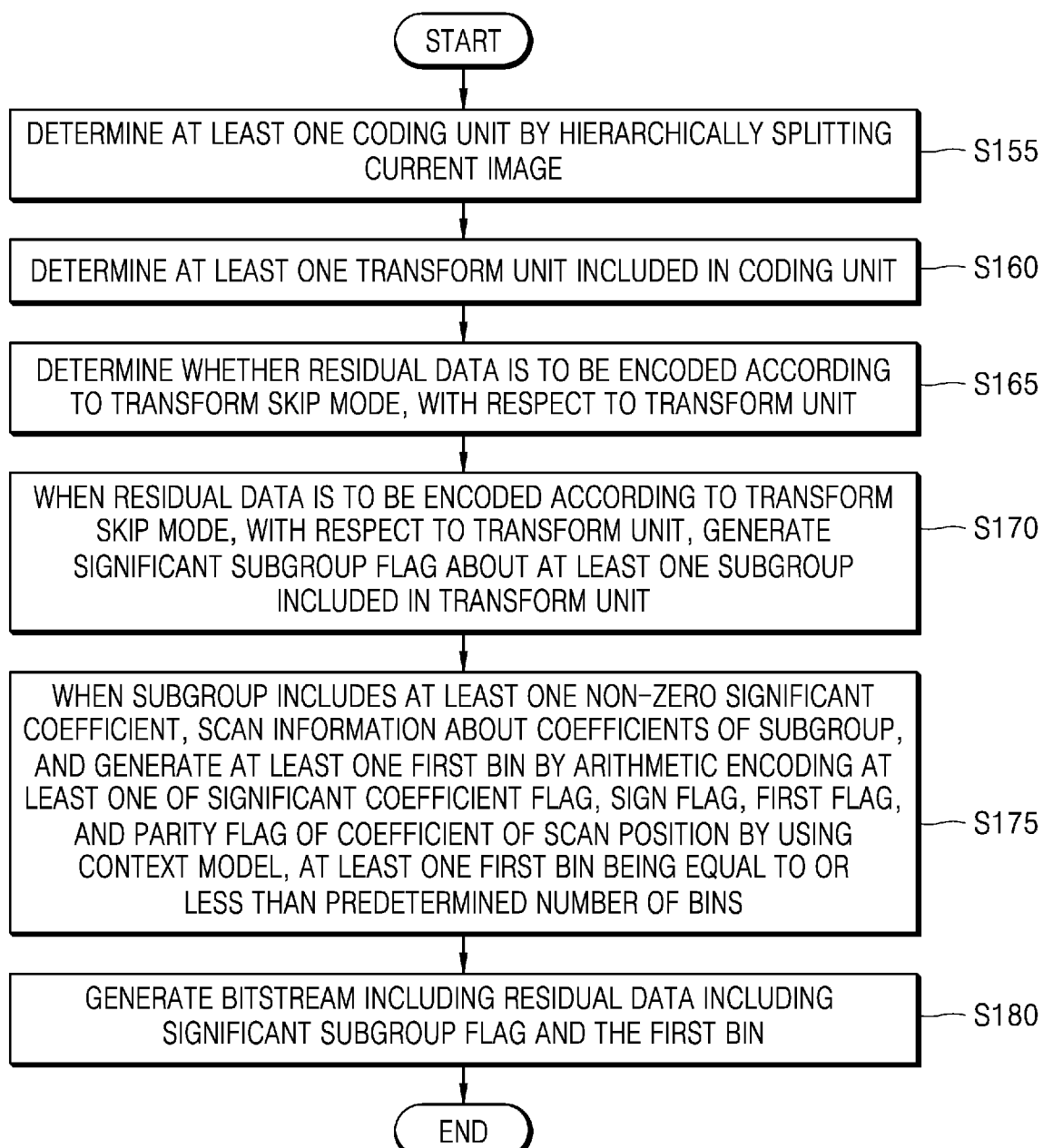
FIG. 2B illustrates a flowchart of an image encoding method according to various embodiments.

FIG. 2B illustrates a flowchart of an image encoding method according to various embodiments.

In operation S155, the image encoding apparatus 150 may determine at least one coding unit by hierarchically splitting a current image.

In operation S160, the image encoding apparatus 150 may determine a transform unit included in the coding unit.

In operation S165, the image encoding apparatus 150 may determine whether residual data is to be encoded according to a transform skip mode, with respect to the transform unit.

In operation S170, when the residual data is to be encoded according to the transform skip mode, with respect to the transform unit, the image encoding apparatus 150 may generate a significant subgroup flag (or a sub-block flag) about at least one subgroup included in the transform unit.

In operation S175, when the subgroup includes at least one non-zero significant coefficient, the image encoding apparatus 150 may scan information about coefficients of the subgroup, and thus may generate at least one first bin by arithmetic encoding at least one of a significant coefficient flag, a sign flag, a first flag, and a parity flag of a coefficient of a scan position by using a context model, the at least one first bin being equal to or less than a predetermined number of bins.

With respect to a coefficient of another scan position other than the coefficient of the scan position related to the first bin from among the coefficients included in the subgroup, the image encoding apparatus 150 may generate at least one second bin by arithmetic encoding a coefficient absolute value in a bypass mode.

In a case where the coefficient of the current scan position related to the first bin is a significant coefficient, when the number of bins remaining after the number of first bins and bins about a second flag obtained before the current scan position is scanned is deducted from a predetermined number of bins is equal to or greater than 4, the image encoding apparatus 150 may generate a second bin about the second flag by arithmetic encoding the second flag of the coefficient of the scan position by using the context model.

In operation S180, the image encoding apparatus 150 may generate a bitstream including residual data including the significant subgroup flag and the first bin. For example, the image encoding apparatus 150 may generate a bitstream including residual data including at least one of the significant subgroup flag, the first bin, the second bin, and a third bin.

Figure 2C:
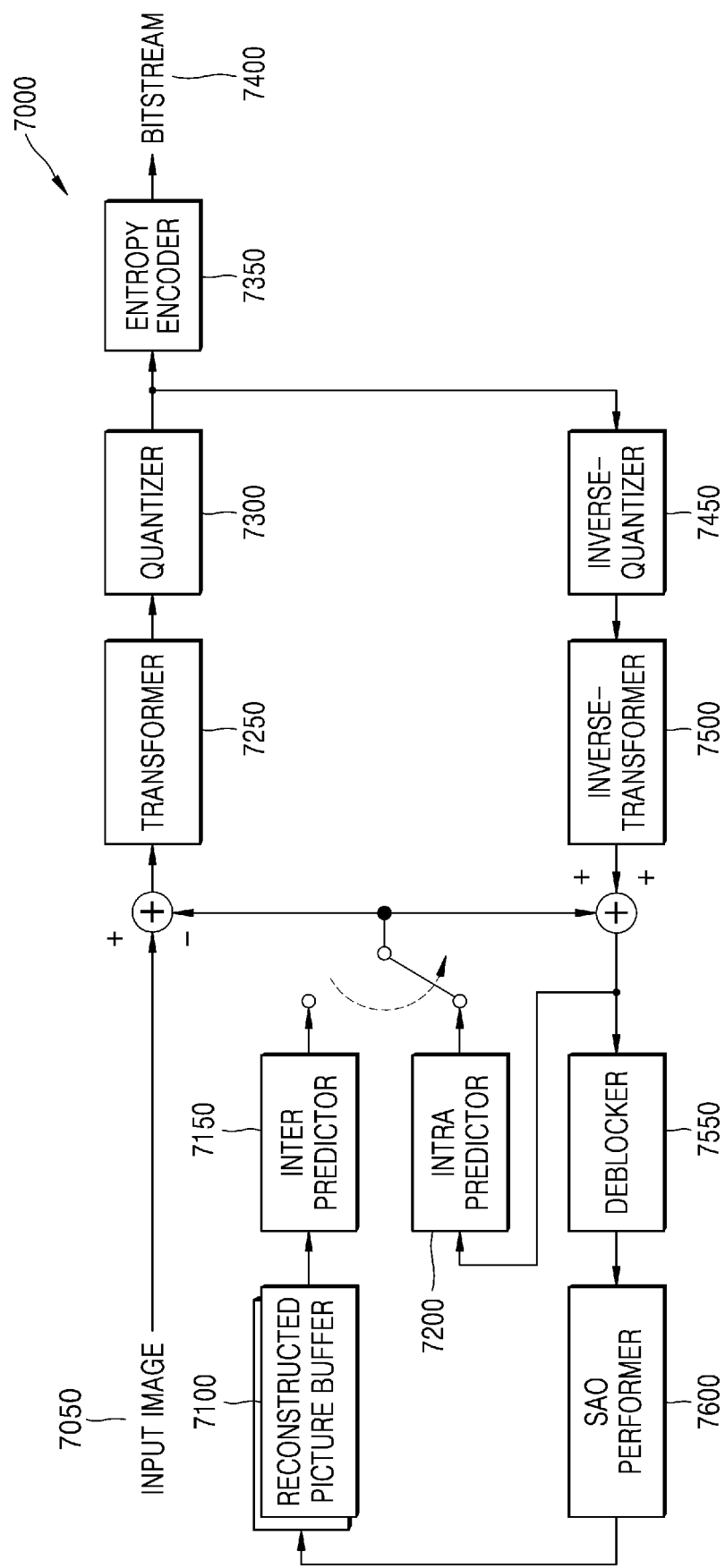
FIG. 2C is a block diagram of an image encoder according to various embodiments.

FIG. 2C is a block diagram of an image encoder according to various embodiments.

An image encoder 7000 according to various embodiments performs operations necessary for the image encoder 155 and the bitstream generator 160 of the image encoding apparatus 150 to encode image data.

That is, an intra predictor 7200 performs intra prediction on each of the blocks of a current image 7050, and an inter predictor 7150 performs inter prediction on each of the blocks by using the current image 7050 and a reference image obtained from a reconstructed picture buffer 7100.

Prediction data is subtracted from data of a block to be encoded in the current image 7050, wherein the prediction data is related to each block and is output from the intra predictor 7200 or the inter predictor 7150, and the transformer 7250 and the quantizer 7300 may output a quantized transform coefficient of each block by performing transformation and quantization on the residual data. An inverse-quantizer 7450 and an inverse-transformer 7500 may reconstruct residual data of a spatial domain by performing inverse-quantization and perform inverse-transformation on the quantized transform coefficient. The reconstructed residual data of the spatial domain may be added to the prediction data that is related to each block and is output from the intra predictor 7200 or the inter predictor 7150, and thus may be reconstructed as data of a spatial domain with respect to a block of the current image 7050. A deblocker 7550 and a SAO performer 7600 generate a filtered reconstructed image by performing in-loop filtering on the reconstructed data of the spatial domain. The generated reconstructed image is stored in the reconstructed picture buffer 7100. Reconstructed images stored in the reconstructed picture buffer 7100 may be used as a reference image for inter prediction with respect to another image. An entropy encoder 7350 may entropy encode the quantized transform coefficient, and the entropy encoded coefficient may be output as a bitstream 7400.

In order for the image encoder 7000 according to various embodiments to be applied to the image encoding apparatus 150, the image encoder 7000 according to various embodiments may perform operations of each stage on each block. For example, an operation of the entropy encoder 7350 may correspond to operations of the arithmetic encoder included in the image encoder 155 and the bitstream generator 160.

Figure 3A:
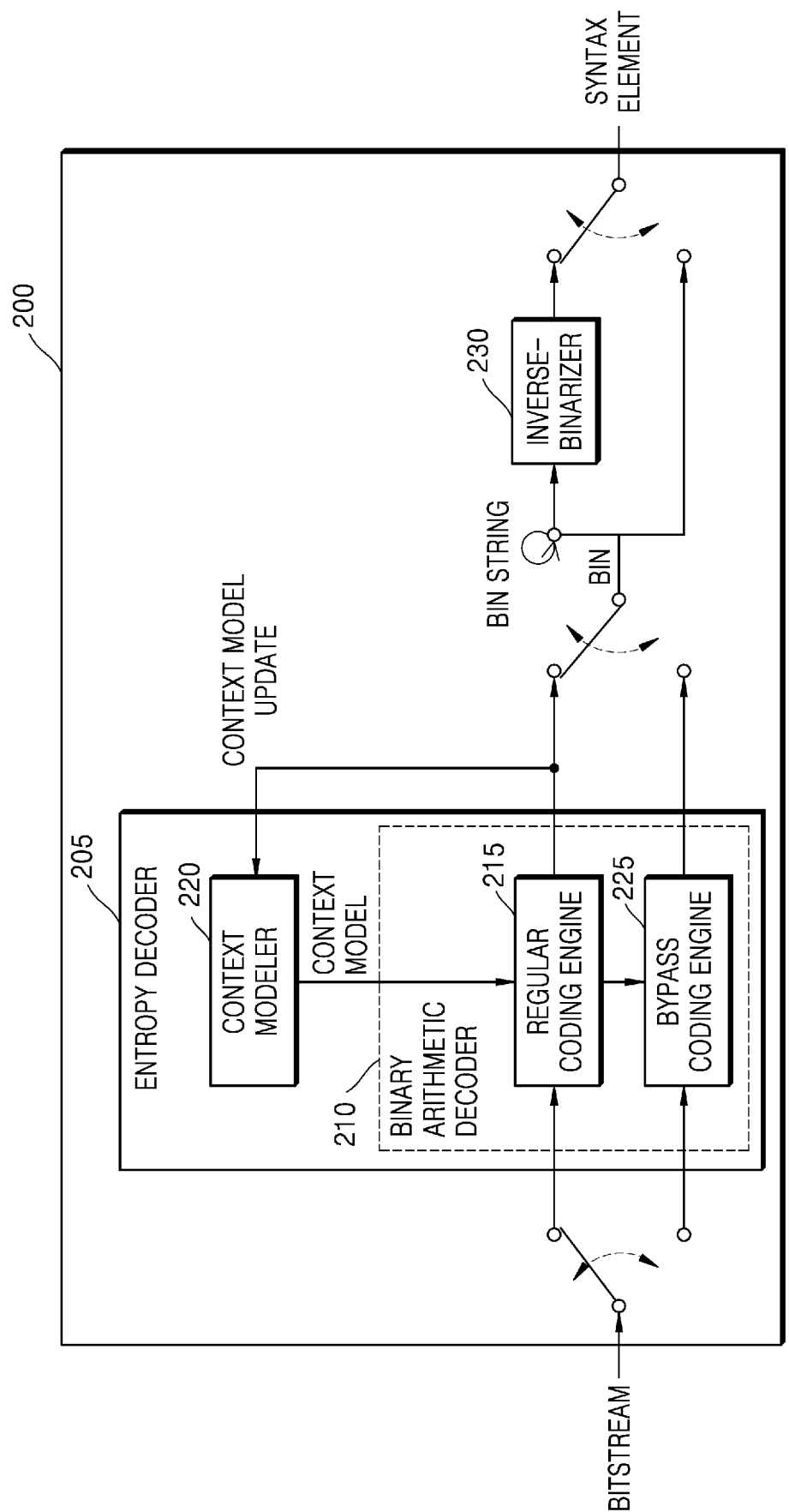
FIG. 3A is a diagram for describing a context-adaptive binary arithmetic coding (CABAC) technique according to an embodiment.

FIG. 3A is a diagram for describing the CABAC technique according to an embodiment of the disclosure.

Referring to FIG. 3A, a binary arithmetic decoder 210 included in an entropy decoder 205 of the image decoding apparatus 100 may selectively perform binary arithmetic decoding on a bin (referred to as the regular encoded bin) through a regular coding engine 215 by using a context model, the bin being obtained from a bitstream according to a regular mode, and may obtain the binary arithmetic decoded bin (or, referred to as the regular decoded bin or the context decoded bin). A context modeler 220 may update the context model, based on a previously regular decoded bin. An initial context model or a predetermined context model may be determined based on a bin index indicating a position of a bin, an occurrence probability of a bin included in an adjacent block, and various elements of a current block or the adjacent block.

The binary arithmetic decoder 210 included in the entropy decoder 205 of the image decoding apparatus 100 may selectively perform binary arithmetic decoding on a bin (referred to as the bypass encoded bin) through a bypass coding engine 225, the bin being obtained from a bitstream according to a bypass mode, and may obtain the binary arithmetic decoded bin (or, referred to as the bypass decoded bin).

An inverse-binarizer 230 of the image decoding apparatus 100 may obtain a value of a predetermined syntax element by performing inverse-binarization on a bin string including at least one binary arithmetic decoded bin. Here, a predetermined inverse-binarization method may be used. For example, a Golomb-Rice inverse-binarization may be performed, but the disclosure is not limited thereto. Alternatively, the image decoding apparatus 100 may selectively obtain the value of the predetermined syntax element, based on at least one binary arithmetic decoded bin, without passing through the inverse-binarizer 230.

In the above, descriptions in which the image decoding apparatus 100 entropy decodes information of a bitstream based on the CABAC technique are provided, and it will be understood by one of ordinary skill in the art that it is possible to generate a bitstream including a binary arithmetic encoded bin by entropy encoding a value of a syntax element by inversely performing the aforementioned process based on the CABAC technique.

FIG. 3B is a diagram illustrating pseudo-code of normal coefficient coding according to an embodiment.

Referring to the pseudo-code of FIG. 3B, the image decoding apparatus 100 may obtain, from a bitstream, position information (Last_pos) of a last significant coefficient from among coefficients included in a current transform unit. Here, the last significant coefficient indicates a significant coefficient positioned at the end of the transform unit, based on a scan order in a forward direction (a direction from the upper-left to the lower-right), and actually, coefficient information may be scanned starting from the last significant coefficient in a scan order in an inverse direction.

The image decoding apparatus 100 may obtain, from the bitstream, a significant flag (sigCGflag) about at least one coefficient group (CG), based on the position information of the last significant coefficient. A coefficient group may be referred to as a subblock in that the coefficient group is at least one block included in the transform unit, but is not limited thereto, and thus, may be referred to as a subgroup.

The image decoding apparatus 100 may scan information about a coefficient k included in a significant coefficient group according to a predetermined scan order in a first scan pass, and thus, may obtain, from a bitstream, a bin about at least one of a significant coefficient flag (sig_flag[k]), a GT1 flag (gt1_flag[k]), a parity flag (par_flag[k]), and a GT3 flag (gt3_flag[k]) about the coefficient k included in the significant coefficient group. Here, the bin may be a bin binary arithmetic encoded by using a context model, and a maximum number of bins (Max_CtxBin) binary arithmetic encoded by using the context model may be limited in each of coefficient group. For example, Max_CtxBin may be 32 bins in each coefficient group, but is not limited thereto. When one bin among the coefficient flag (sig_flag[k]), the GT1 flag (gt1_flag[k]), the parity flag (par_flag[k]), and the GT3 flag (gt3_flag[k]) is obtained, the number of bins may be deducted by 1 from the maximum number of bins, and only when the number of bins is equal to or greater than 4 that is the number of remaining bins (remBin), a bin of flags of the coefficient k of a corresponding scan position may be obtained.

The image decoding apparatus 100 may obtain an absolute value (coeff[k]) of the coefficient k of a current scan position, based on a parity flag (par_flag), a GT1 flag (gt1_flag), and a GT3 flag (gt3_flag).

The image decoding apparatus 100 may scan information about a coefficient k (where, k ... k1) for which a bin of a significant coefficient flag is obtained from among coefficients included in a significant coefficient group according to a predetermined scan order in a second scan pass, and thus, may obtain equal probability (EP) bins (i.e., bins that are binary arithmetic encoded in a bypass mode) (rem[k]) about the remainder of an absolute value of the coefficient, based on a value of a GT3 flag (gt3_flag[k]).

The image decoding apparatus 100 may obtain an absolute value (coeff[k]) of the coefficient k of a current scan position, based on the EP bins (rem[k]) about the remainder of the absolute value of the coefficient.

The image decoding apparatus 100 may scan information about a coefficient k (where, k1 ... ) for which a bin of a significant coefficient flag is not obtained from among coefficients included in a significant coefficient group according to a predetermined scan order in a third scan pass, and thus, may obtain EP bins (e.g., bins that are binary arithmetic encoded in a bypass mode) (rem[k]) about the entirety of an absolute value of the coefficient. In the above, descriptions in which the EP bins about the coefficient absolute value (the entirety or the remainder) are obtained in the second and third scan passes are provided, but the disclosure is not limited thereto, and the EP bins about the coefficient absolute value (the entirety or the remainder) may be obtained in an integrated scan pass (i.e., the second scan pass) according to a predetermined condition.

The image decoding apparatus 100 may obtain the absolute value (coeff[k]) of the coefficient k of the current scan position, based on the EP bins (rem[k]) about the entirety of the absolute value of the coefficient and pos0. Here, pos0 may be determined based on a Golomb-Rice parameter used in binarization and a quantization state (Qstate) of a dependent quantization process. The dependent quantization process and its quantization state (Qstate) will be described below with reference to FIGS. 4A to 4C. For example, when the entirety (level) of the absolute value is binarized by using the Golomb-Rice parameter, the level may be remapped by using pos0 that is a threshold value, and then finally, binarization may be performed. That is, a level greater than pos0 may be binarized in a normal scheme, 0 may be remapped by pos0, and a level equal to or less than pos0 may be remapped by −1 and then may be binarized. For example, when pos0 is 2 and a value of a level is 3 and 4, the level is binarized as it is, but, when the value of the level is 0, 1, and 2, the level may be remapped to 2, 0, and 1 and then may be binarized.

The image decoding apparatus 100 may scan information about the coefficient k included in the significant coefficient group according to a predetermined scan order, and thus, may obtain a sign flag (sign[k]) from a bitstream.

The image decoding apparatus 100 may obtain a value of the coefficient k, based on the absolute value (coeff[k]) and the sign flag (sign[k]) of the coefficient k.

The image decoding apparatus 100 may inverse-quantize and then inverse-transform the coefficient k, and thus, may generate a coefficient (the coefficient of a spatial domain) of a residual block.

In the above, the pseudo-code realized in the image decoding apparatus 100 is described, and it will be understood by one of ordinary skill in the art that the pseudo-code may be realized in a similar manner (obtainment of information from a bitstream by the image decoding apparatus corresponds to generation of information of a coefficient in an encoding apparatus) in the image encoding apparatus 150.

As described above, when the image decoding apparatus 100 performs an inverse-transformation operation according to a normal transformation mode (a mode in which the inverse-transformation operation is performed), not a transform skip mode, the image decoding apparatus 100 may decrease complexity of entropy decoding according to the CABAC technique by limiting the number of bins of a significant coefficient flag, a GT1 flag, a GT3 flag, and a parity flag, the bins being decoded using a context model, in a case of a coefficient of a scan position from which a significant coefficient flag and the like are not obtained, may not binary arithmetic decode a bin of a significant coefficient flag, a GT1 flag, a GT3 flag, and a parity flag according to a bypass mode, but may binary arithmetic decode only the entirety of a coefficient absolute value, and thus, may effectively decode the coefficient absolute value without a delay that occurs in a process of parsing an unnecessary bin of a significant coefficient flag, a GT1 flag, a GT3 flag, and a parity flag. In particular, coefficients from which a significant coefficient flag and the like are not obtained are generally coefficients of a low frequency domain (coefficients positioned adjacent to a last coefficient in a scan direction of an inverse-direction), and their absolute values are generally large, such that a parsing delay may be effectively decreased without much difference in a decoding efficiency, compared to a case where a bin of a significant coefficient flag, a GT1 flag, a GT3 flag, and a parity flag is binary arithmetic decoded.

FIG. 3C is a diagram illustrating pseudo-code of coefficient coding in a transform skip mode according to an embodiment.

Referring to the pseudo-code of FIG. 3C, the image decoding apparatus 100 may obtain, from a bitstream, a significant flag (sigCGflag) about at least one coefficient group (CG). Here, a maximum number of bins (Max_CtxBin) arithmetic decoded by using a context model may not be determined for each of coefficient groups but may be determined for each of transform units, and a value thereof may be determined as 2*TU_height*TU_width. However, the value is not limited thereto, and thus, may be determined to be proportional to TU_height and TU_width, as in 1.75*TU_height*TU_width. Here, TU_height and TU_width indicate a height and a width of a transform unit.

The image decoding apparatus 100 may decrease the maximum number of bins (Max_CtxBin) by 1 whenever the image decoding apparatus 100 obtains a bin binary arithmetic encoded by using the context model, and when the number of remaining bins (remBin) is greater than 0, the image decoding apparatus 100 may obtain a bin binary arithmetic encoded by using a context model (ctxModel). Alternatively, the image decoding apparatus 100 may obtain a bin binary arithmetic encoded according to a bypass mode.

The image decoding apparatus 100 may scan information about a coefficient k included in a significant coefficient group according to a predetermined scan order in a first scan pass, and thus, may obtain, from a bitstream, a bin about at least one of a significant coefficient flag (sig_flag[k]), a sign flag (sig_flag[k]), a GT1 flag (gt1_flag[k]), and a parity flag (par_flag[k]) about the coefficient k included in the significant coefficient group. Here, the image decoding apparatus 100 may obtain the bin binary arithmetic encoded by using the context model only when remBin is greater than 0, and otherwise, may obtain the bin binary arithmetic encoded according to the bypass mode.

The image decoding apparatus 100 may obtain an absolute value (coeff[k]) of the coefficient k of a current scan position, based on a parity flag (par_flag) and a GT1 flag (gt1_flag) of the coefficient k of the current scan position.

The image decoding apparatus 100 may scan information about the coefficient k according to a predetermined scan order in a second scan pass, and thus, may obtain a GTX flag (gtX_flag[k]). Here, X may be 3, 5, 7, and 9. Here, the image decoding apparatus 100 may obtain the bin binary arithmetic encoded by using the context model only when remBin is greater than 0, and otherwise, may obtain the bin binary arithmetic encoded according to the bypass mode.

The image decoding apparatus 100 may obtain the absolute value (coeff[k]) of the coefficient k of the current scan position, based on a GTX flag (gtX_flag[k]).

The image decoding apparatus 100 may scan information about the coefficient k according to a predetermined scan order in a third scan pass, and thus, may obtain EP bins (e.g., bins that are binary arithmetic encoded in a bypass mode) (rem[k]) about the remainder of the absolute value of the coefficient.

In the above, the pseudo-code realized in the image decoding apparatus 100 is described, and it will be understood by one of ordinary skill in the art that the pseudo-code may be realized in a similar manner in the image encoding apparatus 150.

As described above, when the image decoding apparatus 100 obtains a bin of a syntax element about a coefficient, according to a transform skip mode, the image decoding apparatus 100 obtains a bin about at least one of a significant coefficient flag, a sign flag, a GT1 flag, and a parity flag at all scan positions of a first scan pass, such that complexity may be significantly increased. That is, unlike FIG. 3A, a great number of bins that are binary arithmetic encoded in a bypass mode are obtained, such that a parsing delay may occur, and complexity due to binary arithmetic decoding in the bypass mode may be increased. Also, the image decoding apparatus 100 obtains a bin about a GTX flag without a limit in the number of bins in a second scan pass, such that complexity may be significantly increased. Therefore, when the number is limited in the second scan pass, complexity may be decreased.

That is, unlike FIG. 3A, because a great number of bins (a bin arithmetic encoded by using a context model and a bin binary arithmetic encoded according to a bypass mode) are obtained, a parsing delay may occur and complexity due to binary arithmetic decoding may be increased.

FIG. 3D is a diagram illustrating pseudo-code of coefficient coding in a transform skip mode according to an embodiment.

Referring to FIG. 3D, the image decoding apparatus 100 may obtain, from a bitstream, a significant flag (sigCGflag) about at least one coefficient group (CG). Here, a bin of the significant flag (sigCGflag) may be a bin that is binary arithmetic encoded by using a context model.

The image decoding apparatus 100 may scan information about a coefficient k included in a significant coefficient group according to a predetermined scan order in a first scan pass, and thus, may obtain, from a bitstream, a bin about at least one of a significant coefficient flag (sig_flag[k]), a sign flag (sig_flag[k]), a GT1 flag (gt1_flag[k]), and a parity flag (par_flag[k]) about the coefficient k included in the significant coefficient group. Here, the bin may be a bin binary arithmetic encoded by using a context model, and a maximum number of bins (Max_CtxBin) binary arithmetic encoded by using the context model may be limited in each of coefficient group. For example, Max_CtxBin may be 32 bins in each coefficient group, but is not limited thereto.

When one bin among the significant coefficient flag (sig_flag[k]), the sign flag (sig_flag[k]), the GT1 flag (gt1_flag[k]), and the parity flag (par_flag[k]) is obtained, the number of bins may be deducted by 1 from the maximum number of bins, and only when the number of bins is equal to or greater than 4 that is the number of remaining bins (remBin), a bin of the flags may be obtained with respect to the coefficient k of a current scan position.

The image decoding apparatus 100 may obtain an absolute value (coeff[k]) of the coefficient k of the current scan position, based on a parity flag (par_flag) and a GT1 flag (gt1_flag).

The image decoding apparatus 100 may scan information about the coefficient k for which a bin of a significant coefficient flag is obtained from among coefficients included in the significant coefficient group according to a predetermined scan order in a second scan pass, and thus, when the absolute value (coeff[k]) of the current coefficient is equal to or greater than X−1 (where, X is 3, 5, 7, and 9), may obtain a bin of a GTX flag (gtX_flag[k]).

Here, a bin binary arithmetic encoded by using the context model may be obtained as the GTX flag (gtX_flag[k]) when the number of remaining bins (remBin) binary arithmetic encoded by using the context model is greater than 0, and otherwise, a bin binary arithmetic encoded according to a bypass mode may be obtained as the GTX flag (gtX_flag[k]). However, the disclosure is not limited thereto, and the bin binary arithmetic encoded according to the bypass mode may be no longer obtained. In this case, the number of bins arithmetic decoded according to the bypass mode is decreased such that a parsing delay therefrom may be decreased and complexity of binary arithmetic decoding for processing the bins may be decreased.

The image decoding apparatus 100 may obtain the absolute value (coeff[k]) of the coefficient k of the current scan position, based on a value of a GTX flag (gtX_flag) of the coefficient k of the current scan position.

The image decoding apparatus 100 may obtain EP bins (i.e., bins that are binary arithmetic encoded in a bypass mode) (rem[k]) about the remainder of the absolute value of the coefficient, based on the absolute value (coeff[k]) of the coefficient k of the current scan position in a third scan pass. Referring to FIG. 3C, when the absolute value (coeff[k]) of the current coefficient is equal to or greater than 10, the image decoding apparatus 100 may obtain EP bins (i.e., bins that are binary arithmetic encoded in a bypass mode) (rem[k]) about the remainder of the absolute value of the coefficient.

However, due to the limit in the number as described above, the GTX flag may not be obtained, and in this case, when the absolute value (coeff[k]) of the current coefficient is equal to or greater than 2, the EP bins (i.e., the bins that are binary arithmetic encoded in the bypass mode) (rem[k]) about the remainder of the absolute value of the coefficient may be obtained.

The image decoding apparatus 100 may scan information about the coefficient k for which a bin of a significant coefficient flag is not obtained from among the coefficients included in the significant coefficient group according to a predetermined scan order in a fourth scan pass, and thus, may obtain EP bins (i.e., bins that are binary arithmetic encoded in a bypass mode) (rem[k]) about the entirety of an absolute value of the coefficient. Here, it will be understood by one of ordinary skill in the art that the third scan pass and the fourth scan pass may be integrated into one scan pass, and in the integrated scan pass (e.g., the third scan pass), the EP bins about the coefficient absolute value (the entirety or the remainder) may be generated according to a predetermined condition.

The image decoding apparatus 100 may obtain the absolute value (coeff[k]) of the coefficient k of the current scan position, based on the EP bins (rem[k]) about the entirety of the absolute value of the coefficient and pos0.

When the image decoding apparatus 100 scans the information about the coefficient k for which the bin of the significant coefficient flag is not obtained from among the coefficients included in the significant coefficient group, the image decoding apparatus 100 may additionally obtain a sign flag (sign[k]) from the bitstream.

The image decoding apparatus 100 may obtain a value of the coefficient k, based on the absolute value (coeff[k]) of the coefficient k and the sign flag (sign[k]).

The image decoding apparatus 100 may inverse-quantize the coefficient k, and then may skip an inverse-transformation operation and may generate a coefficient (the coefficient of a spatial domain) of a residual block.

In the above, the pseudo-code realized in the image decoding apparatus 100 is described, and it will be understood by one of ordinary skill in the art that the pseudo-code may be realized in a similar manner in the image encoding apparatus 150.

As described above, when the image decoding apparatus 100 performs coefficient coding according to a transform skip mode, the image decoding apparatus 100 may limit the number of bins arithmetic encoded by using a context model for each of coefficient groups in the first scan pass in a similar manner to FIG. 3A, and may not obtain a bin arithmetic encoded according to a bypass mode in the first scan pass, such that complexity of binary arithmetic decoding may be decreased and a parsing delay due to the bin arithmetic encoded according to the bypass mode may be decreased.

Also, even in the second scan pass, the number of bins arithmetic encoded by using the context model is limited for each of the coefficient groups, such that complexity of binary arithmetic decoding using the context model may be decreased. In this case, a bin arithmetic encoded according to a bypass mode is also not obtained, such that complexity of binary arithmetic decoding may be decreased and a parsing delay due to the bin arithmetic encoded according to the bypass mode may be decreased.

Also, with respect to a coefficient of a scan position from which a significant coefficient flag and the like are not obtained, a bin of a significant coefficient flag, a GT1 flag, a parity flag, and a GTX flag is not binary arithmetic decoded according to the bypass mode and only the entirety of a coefficient absolute value is binary arithmetic decoded according to the bypass mode, such that the coefficient absolute value may be effectively decoded without a parsing delay that occurs in a process of parsing an unnecessary bin of the significant coefficient flag, the GT1 flag, the parity flag, and the GTX flag. In particular, in a case of coefficient coding according to the transform skip mode, values of a coefficient are not biased to one side and their absolute values are generally large, such that a parsing delay may be effectively decreased without much difference in a decoding efficiency, compared to a case where a bin, which is arithmetic encoded in the bypass mode, of the significant coefficient flag, the GT1 flag, the parity flag, and the GTX flag is binary arithmetic decoded.

Figure 4A:
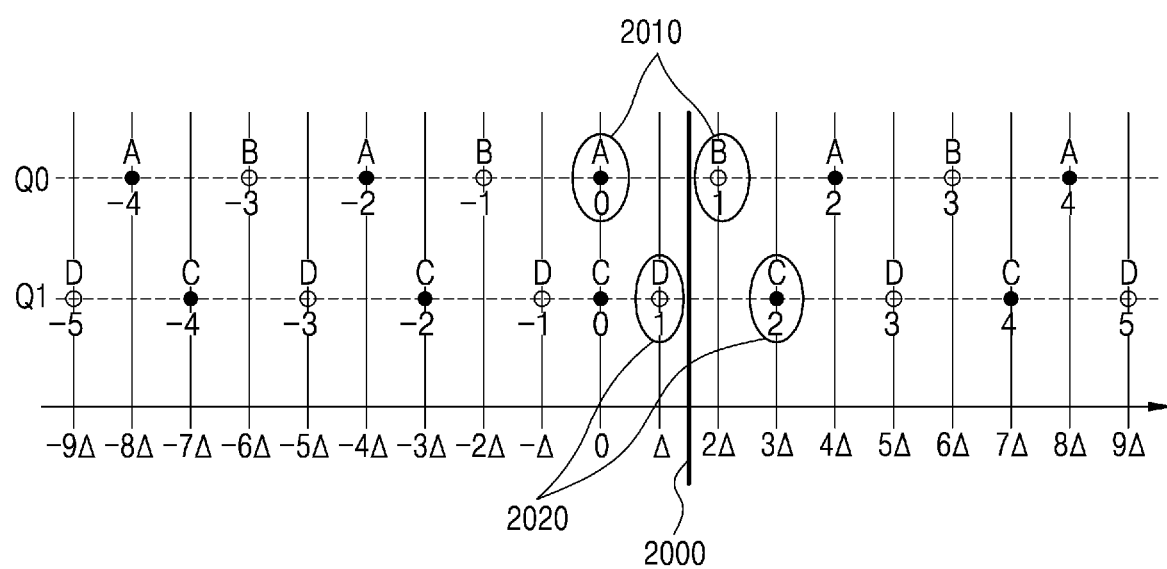

FIG. 4A is a diagram for describing a process of quantizing a current transform coefficient, based on a dependent quantization process according to an embodiment.

Referring to FIG. 4A, the image encoding apparatus 150 may determine candidates A and B 2010 with respect to a quantizer Q0 and candidates C and D 2020 with respect to a quantizer Q1, based on a value of an original transform coefficient 2000 generated through a transformation process.

The image encoding apparatus 150 may calculate RD COST, based on a state based on parity of transform coefficients and the candidates 2010 and 2020, and may determine a quantizer to be used for the current transform coefficient and a value of a quantization coefficient of the current transform coefficient. The image encoding apparatus 150 may modify a value of parity of a current original transform coefficient or a value of parity of a previous original transform coefficient, based on the RD COST, may determine a quantizer to be used for a modified coefficient, and may perform quantization on a value of a modified current transform coefficient. The state (Qstate) based on the parity of the transform coefficients will be described below with reference to FIGS. 4B and 4C.

A reconstruction level t' corresponding to the quantizer Q0 may be determined based on Equation 1 below.

[Equation 1]

$$t' = 2*k*\Delta \qquad (1)$$

Here, k refers to a related transform coefficient level and may be a coefficient absolute value obtained through coefficient coding (coefficient). $\Delta$ may refer to a quantization step size.

A reconstruction level t' corresponding to the quantizer Q1 may be determined based on Equation 2 below.

[Equation 2]

$$t' = (2*k - \text{sgn}(k))*\Delta \qquad (2)$$

Here, sgn(k) may be determined based on Equation 3 below.

[Equation 3]

$$\text{sgn}(k = (k == 0?0:(k<0?-1:1)) \qquad (3)$$

Figure 4B:
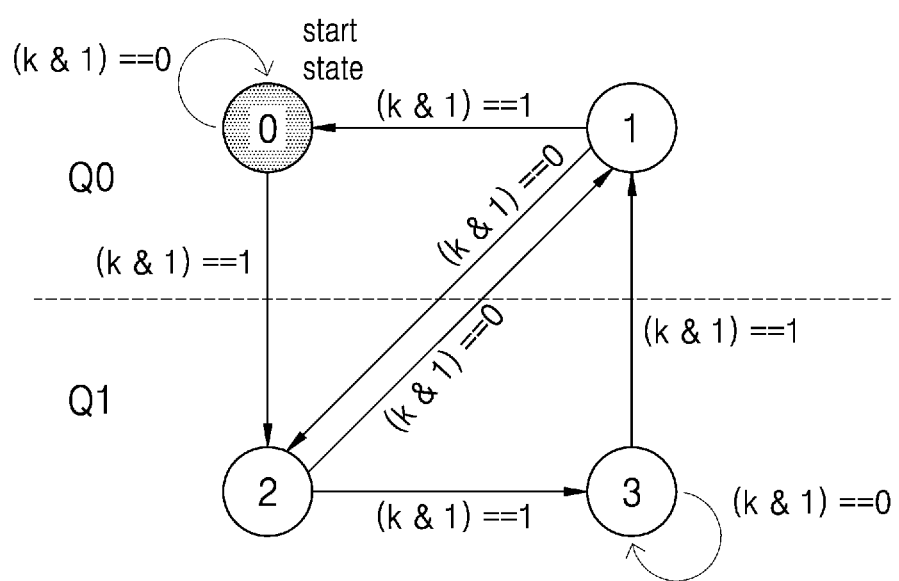

FIGS. 4B and 4C are diagrams illustrating a state machine diagram of a parity-based state machine and a state table of a coefficient used to perform a dependent quantization process.

Referring to FIGS. 4B and 4C, the image encoding apparatus 150 may determine an initial state as 0, and when parity of a level k of a coefficient to be currently encoded is 0 ((k&1)==0), a next state may be determined to be state 0. When parity of the level k of the coefficient to be currently encoded is 1 ((k&1)==1), the image encoding apparatus 150 may determine a next state to be state 2.

When a current state is state 2 and parity of the level k of the coefficient to be currently encoded is 0 ((k&1)==0), the image encoding apparatus 150 may determine a next state to be state 1.

When the current state is state 2 and parity of the level k of the coefficient to be currently encoded is 1 ((k&1)==1), the image encoding apparatus 150 may determine a next state to be state 3.

When the current state is state 1 and parity of the level k of the coefficient to be currently encoded is 0 ((k&1)==0), the image encoding apparatus 150 may determine a next state to be state 2.

When the current state is state 1 and parity of the level k of the coefficient to be currently encoded is 1 ((k&1)==1), the image encoding apparatus 150 may determine a next state to be state 0.

When the current state is state 3 and parity of the level k of the coefficient to be currently encoded is 0 ((k&1)==0), the image encoding apparatus 150 may determine a next state to be state 3.

When the current state is state 3 and parity of the level k of the coefficient to be currently encoded is 1 ((k&1)==1), the image encoding apparatus 150 may determine a next state to be state 1.

Also, the image encoding apparatus 150 may determine one of the quantizers Q0 and Q1, based on the state. When the state is state 0 or 1, the image encoding apparatus 150 may determine the quantizer Q0 as a quantizer for the current transform coefficient. When the state is state 2 or 3, the image encoding apparatus 150 may determine the quantizer Q1 as a quantizer for the current transform coefficient.

Figure 5A:
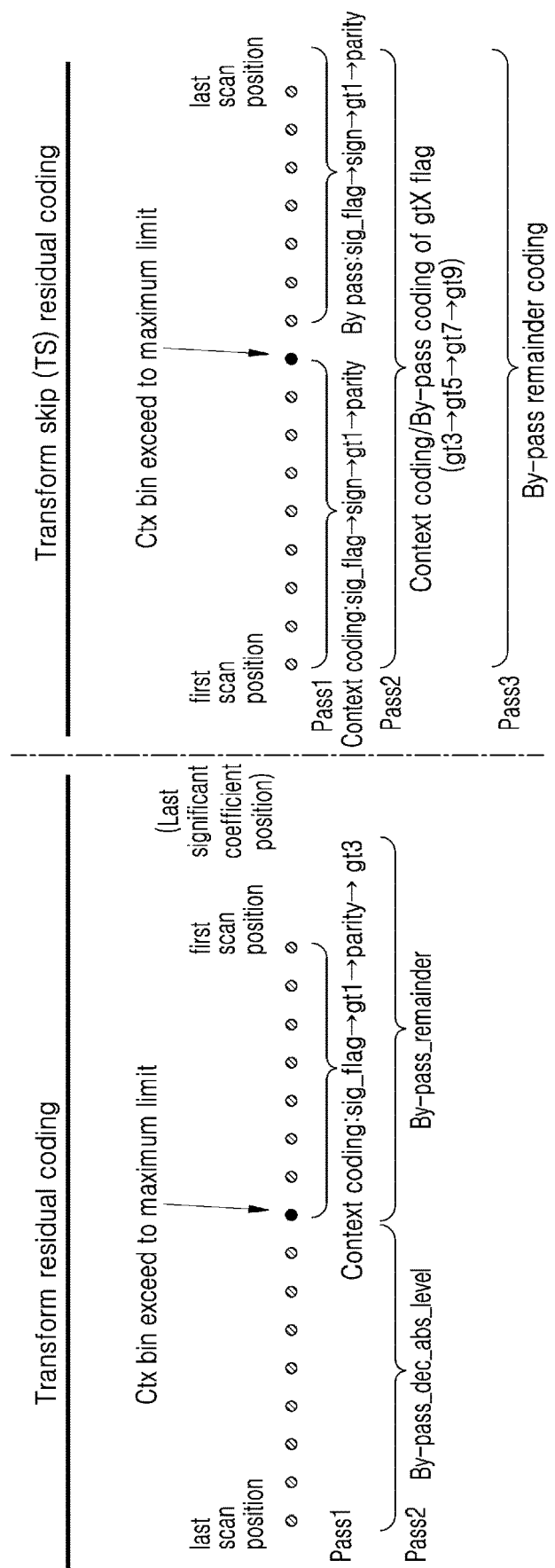
FIG. 5A is a diagram for describing a method by which an image decoding apparatus performs residual coding according to an embodiment.

FIG. 5A is a diagram for describing a method by which the image decoding apparatus 100 performs residual coding according to an embodiment.

Referring to FIG. 5A, in transform residual coding, the image decoding apparatus 100 may obtain context-encoded bins of a significant coefficient flag (sig_flag), a GT1 flag (gt1), a GT3 flag (gt3), and a parity flag (parity) from a first scan position until the number of context bins obtained from a bitstream does not exceed a maximum limit in a first scan pass (pass 1), and may obtain a bypass-mode encoded bin of the remainder (abs_remainder) of a coefficient absolute value in a second scan pass (pass 2).

When the number of context bins obtained from the bitstream in the second scan pass (pass 2) exceeds the maximum limit, the image decoding apparatus 100 may obtain a bypass-mode encoded bin (dec_abs_level) with respect to the entirety of a coefficient absolute value of a next scan position.

In transform skip residual coding, the image decoding apparatus 100 may obtain context-encoded bins of a significant coefficient flag (sig_flag), a sign flag (sign), a GT1 flag (gt1), and a parity flag (parity) until the number of context bins obtained from a bitstream does not exceed a maximum limit in a first scan pass (pass 1), and when the number of context bins obtained from the bitstream exceeds the maximum limit, the image decoding apparatus 100 may obtain a bypass-mode encoded bin with respect to a coefficient of a next scan position.

Afterward, when a value of a previous GTX flag (a GT1 flag when a GTX flag to be currently obtained is a GT3 flag) is 1 in a second scan pass (pass 2), the image decoding apparatus 100 may obtain a value of a current GTX flag (e.g., the GT3 flag), and until the number of context-encoded bins obtained from a bitstream does not exceed a maximum limit, the GTX flag (where, X is 3, 5, 7, and 9) may be obtained as a context-encoded bin, and remaining flags may be obtained as a bypass-mode encoded bin.

When a value of a GT9 flag of a coefficient of a current scan position is 1 in a third scan pass (pass 3), the image decoding apparatus 100 may obtain a bypass-mode encoded bin with respect to the remainder (abs_remainder) of a coefficient absolute value of the current scan position.

As described above, the image decoding apparatus 100 passes through a scan pass (pass 2) that is highly inconvenient, in transform skip coding, such that a considerable parsing delay may occur and an operation for binary arithmetic decoding a corresponding bin may become more complex. Therefore, in order to decrease the parsing delay, the image decoding apparatus 100 may be configured to decrease a scan pass and decrease bins from being unnecessarily obtained according to a bypass mode.

It will be understood by one of ordinary skill in the art that descriptions of operations of the image decoding apparatus 100 provided with reference to FIG. 5A correspond to descriptions of the pseudo-code described above with reference to FIGS. 3B and 3C.

Figure 5B:
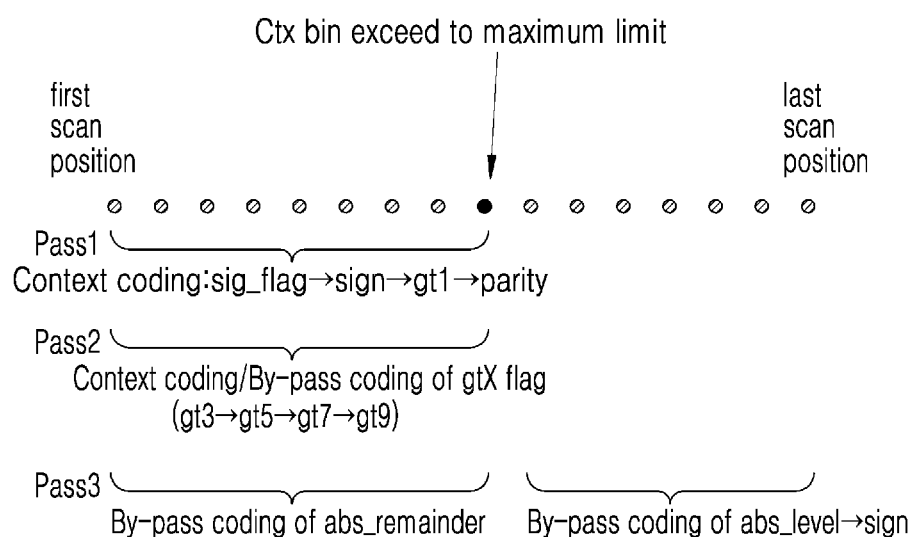
FIG. 5B illustrates a diagram for describing a method by which the image decoding apparatus performs transform skip residual coding according to an embodiment.

FIG. 5B illustrates a diagram for describing a method by which the image decoding apparatus 100 performs transform skip residual coding according to an embodiment.

Referring to FIG. 5B, the image decoding apparatus 100 may obtain context-encoded bins of a significant coefficient flag (sig_flag), a sign flag (sign), a GT1 flag (gt1), and a parity flag (parity) until the number of context bins obtained from a bitstream does not exceed a maximum limit in a first scan pass (pass 1).

The image decoding apparatus 100 may obtain a context-encoded bin of a GTX flag (gtX_flag) with respect to coefficients of which value of a significant coefficient flag (sig_flag) is 1, according to a scan order, in a second scan pass (pass 2). Here, the number of context bins with respect to the second scan pass may be limited, and afterward, a bin of the GTX flag (gtX_flag) may not be obtained.

The image decoding apparatus 100 may obtain, according to a scan order in a third scan pass (pass 3), bins of abs_remainder at a scan position where a value of gtX_flag (e.g., gt9_flag) being finally obtained in a previous second scan pass is 1 (or a scan position where gt1_flag is 1 when the second scan pass is not performed). Here, the bins may be all bypass-mode encoded bins.

The image decoding apparatus 100 may obtain, according to a scan order in the third scan pass (pass 3), bins of the entirety of an absolute value (dec_abs_level) and a sign flag (sign) with respect to coefficients of a scan position from which a value of a significant coefficient flag (sig_flag) is not obtained in the first scan pass. Here, the bins may be all bypass-mode encoded bins.

Unlike residual encoding in a transform skip mode of FIG. 5A, the image decoding apparatus 100 may obtain context-encoded bins of the significant flag sig_flag), the sign flag (sign), the GT1 flag (gt1), and the parity flag (parity) by only a limited number in the first scan pass, and may not obtain bypass-encoded bins (the significant flag sig_flag), the sign flag (sign), the GT1 flag (gt1), and the parity flag (parity)) from remaining scan positions, such that an unnecessary parsing delay may be decreased and complexity of arithmetic decoding for processing bins may be decreased.

It will be understood by one of ordinary skill in the art that descriptions of operations of the image decoding apparatus 100 provided with reference to FIG. 5B correspond to descriptions of the pseudo-code described above with reference to FIG. 3D.

In the above, with reference to FIGS. 1A to 5B, the image encoding or decoding method and apparatus that efficiently arithmetic encode/arithmetic decode information about a coefficient included in a coding unit when performing residual encoding/decoding according to the transform skip mode are described.

Hereinafter, splitting of a coding unit will be described in detail according to an embodiment of the disclosure.

An image may be split into largest coding units. A size of each largest coding unit may be determined based on information obtained from a bitstream. A shape of each largest coding unit may be a square shape of the same size. However, the disclosure is not limited thereto. Also, a largest coding unit may be hierarchically split into coding units based on split shape mode information obtained from the bitstream. The split shape mode information may include at least one of information indicating whether splitting is to be performed, split direction information, and split type information. The information indicating whether splitting is to be performed indicates whether a coding unit is to be split. The split direction information indicates that splitting is to be performed in one of a horizontal direction or a vertical direction. The split type information indicates that a coding unit is to be split by using one of binary split, tri split, or quad split.

For convenience of description, in the disclosure, it is assumed that the split shape mode information includes the information indicating whether splitting is to be performed, the split direction information, and the split type information, but the disclosure is not limited thereto. The image decoding apparatus 100 may obtain, from a bitstream, the split shape mode information as one bin string. The image decoding apparatus 100 may determine whether to split a coding unit, a split direction, and a split type, based on the one bin string.

The coding unit may be equal to or smaller than a largest coding unit. For example, when the split shape mode information indicates that splitting is not to be performed, the coding unit has a same size as the largest coding unit. When the split shape mode information indicates that splitting is to be performed, the largest coding unit may be split into lower-depth coding units. When split shape mode information about the lower-depth coding units indicates splitting, the lower-depth coding units may be split into smaller coding units. However, the splitting of the image is not limited thereto, and the largest coding unit and the coding unit may not be distinguished. The splitting of the coding unit will be described in detail with reference to FIGS. 6 to 19.

Also, the coding unit may be split into prediction units for prediction of the image. The prediction units may each be equal to or smaller than the coding unit. Also, the coding unit may be split into transform units for transformation of the image. The transform units may each be equal to or smaller than the coding unit. Shapes and sizes of the transform unit and the prediction unit may not be related to each other. The coding unit may be distinguished from the prediction unit and the transform unit, or the coding unit, the prediction unit, and the transform unit may be equal to each other. Splitting of the prediction unit and the transform unit may be performed in a same manner as splitting of the coding unit. The splitting of the coding unit will be described in detail with reference to FIGS. 6 to 19. A current block and a neighboring block of the disclosure may indicate one of the largest coding unit, the coding unit, the prediction unit, and the transform unit. Also, the current block of the current coding unit is a block that is currently being decoded or encoded or a block that is currently being split. The neighboring block may be a block reconstructed prior to the current block. The neighboring block may be spatially or temporally adjacent to the current block. The neighboring block may be located at one of the lower-left, left, upper-left, top, upper-right, right, lower-right from the current block.

Figure 6:
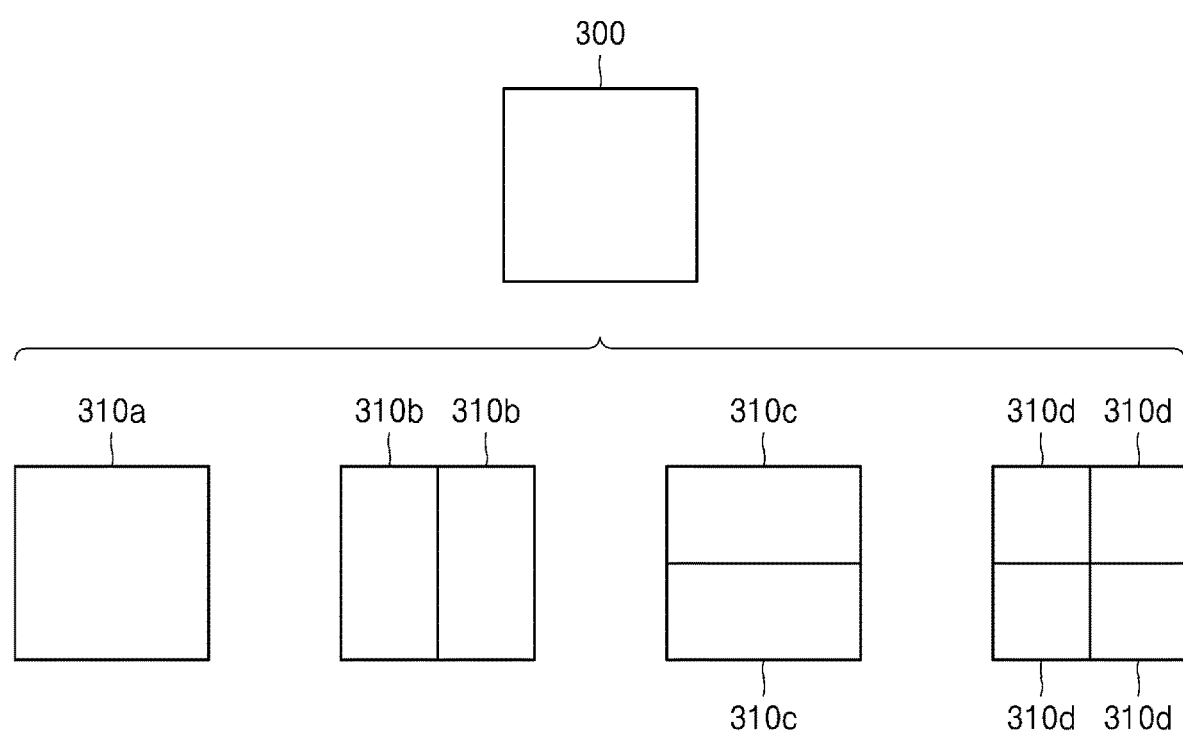
FIG. 6 illustrates a process, performed by an image decoding apparatus, of determining at least one coding unit by splitting a current coding unit, according to an embodiment.

FIG. 6 illustrates a process, performed by the image decoding apparatus 100, of determining at least one coding unit by splitting a current coding unit, according to an embodiment.

A block shape may include 4N×4N, 4N×2N, 2N×4N, 4N×N, or N×4N. Here, N may be a positive integer. Block shape information is information indicating at least one of a shape, direction, a ratio of a width and height, or sizes.

The shape of the coding unit may include a square and a non-square. When the lengths of the width and height of the coding unit are equal (e.g., when the block shape of the coding unit is 4N×4N), the image decoding apparatus 100 may determine the block shape information of the coding unit as a square. The image decoding apparatus 100 may determine the shape of the coding unit to be a non-square.

When the width and the height of the coding unit are different from each other (e.g., when the block shape of the coding unit is 4N×2N, 2N×4N, 4N×N, or N×4N), the image decoding apparatus 100 may determine the block shape information of the coding unit as a non-square shape. When the shape of the coding unit is non-square, the image decoding apparatus 100 may determine the ratio of the width and height in the block shape information of the coding unit to be at least one of 1:2, 2:1, 1:4, 4:1, 1:8, or 8:1. Also, the image decoding apparatus 100 may determine whether the coding unit is in a horizontal direction or a vertical direction, based on the length of the width and the length of the height of the coding unit. Also, the image decoding apparatus 100 may determine the size of the coding unit, based on at least one of the length of the width, the length of the height, or the area of the coding unit.

According to an embodiment, the image decoding apparatus 100 may determine the shape of the coding unit by using the block shape information, and may determine a splitting method of the coding unit by using the split shape mode information. That is, a coding unit splitting method indicated by the split shape mode information may be determined based on a block shape indicated by the block shape information used by the image decoding apparatus 100.

The image decoding apparatus 100 may obtain the split shape mode information from a bitstream. However, an embodiment is not limited thereto, and the image decoding apparatus 100 and the image encoding apparatus 150 may obtain pre-agreed split shape mode information, based on the block shape information. The image decoding apparatus 100 may obtain the pre-agreed split shape mode information with respect to a largest coding unit or a smallest coding unit. For example, the image decoding apparatus 100 may determine split shape mode information with respect to the largest coding unit to be a quad split. Also, the image decoding apparatus 100 may determine split shape mode information regarding the smallest coding unit to be "not to perform splitting". In particular, the image decoding apparatus 100 may determine the size of the largest coding unit to be 256×256. The image decoding apparatus 100 may determine the pre-agreed split shape mode information to be a quad split. The quad split is a split shape mode in which both the width and the height of the coding unit are bisected. The image decoding apparatus 100 may obtain a coding unit of a 128×128 size from the largest coding unit of a 256×256 size, based on the split shape mode information. Also, the image decoding apparatus 100 may determine the size of the smallest coding unit to be 4×4. The image decoding apparatus 100 may obtain split shape mode information indicating "not to perform splitting" with respect to the smallest coding unit.

According to an embodiment, the image decoding apparatus 100 may use the block shape information indicating that the current coding unit has a square shape. For example, the image decoding apparatus 100 may determine whether to split a square coding unit, whether to vertically split the square coding unit, whether to horizontally split the square coding unit, or whether to split the square coding unit into four coding units, based on the split shape mode information. Referring to FIG. 6, when the block shape information of a current coding unit 300 indicates a square shape, the image decoder 110 may not split a coding unit 310*a* having the same size as the current coding unit 300, based on the split shape mode information indicating not to perform splitting, or may determine coding units 310*b*, 310*c*, or 310*d* split based on the split shape mode information indicating a predetermined splitting method.

Referring to FIG. 6, according to an embodiment, the image decoding apparatus 100 may determine two coding units 310*b* obtained by splitting the current coding unit 300 in a vertical direction, based on the split shape mode information indicating to perform splitting in a vertical direction. The image decoding apparatus 100 may determine two coding units 310*c* obtained by splitting the current coding unit 300 in a horizontal direction, based on the split shape mode information indicating to perform splitting in a horizontal direction. The image decoding apparatus 100 may determine four coding units 310*d* obtained by splitting the current coding unit 300 in vertical and horizontal directions, based on the split shape mode information indicating to perform splitting in vertical and horizontal directions. However, splitting methods of the square coding unit are not limited to the aforementioned methods, and may include various methods that may be indicated by the split shape mode information. Predetermined splitting methods of splitting the square coding unit will be described in detail below in relation to various embodiments.

Figure 7:
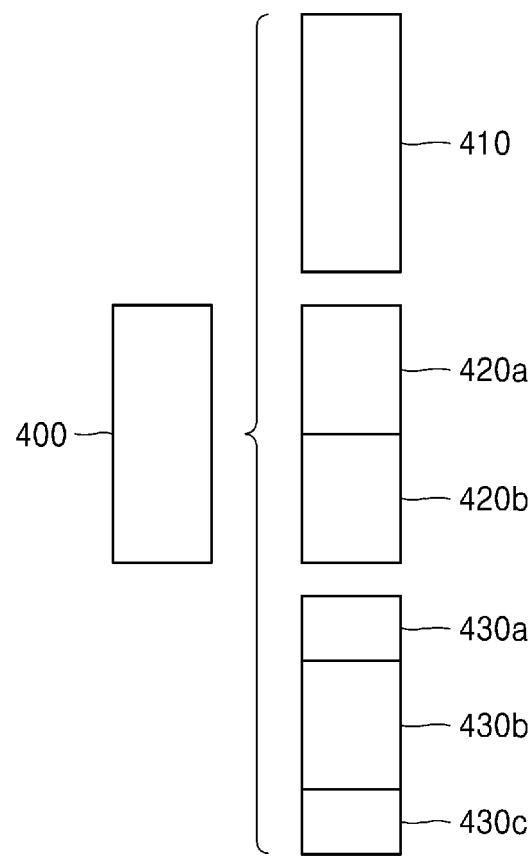
FIG. 7 illustrates a process, performed by the image decoding apparatus, of determining at least one coding unit by splitting a non-square coding unit, according to an embodiment.
Figure 7:
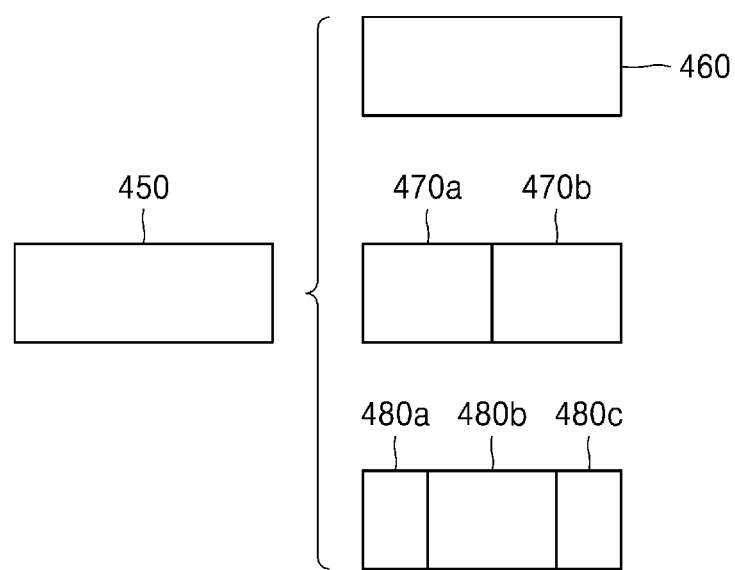

FIG. 7 illustrates a process, performed by the image decoding apparatus 100, of determining at least one coding unit by splitting a non-square coding unit, according to an embodiment.

According to an embodiment, the image decoding apparatus 100 may use block shape information indicating that a current coding unit has a non-square shape. The image decoding apparatus 100 may determine whether not to split the non-square current coding unit or whether to split the non-square current coding unit by using a predetermined splitting method, based on split shape mode information. Referring to FIG. 7, when the block shape information of a current coding unit 400 or 450 indicates a non-square shape, the image decoding apparatus 100 may determine that a coding unit 410 or 460 having the same size as the current coding unit 400 or 450, based on the split shape mode information indicating not to perform splitting, or may determine coding units 420*a* and 420*b*, 430*a*, 430*b*, and 430*c*, 470*a* and 470*b*, or 480*a*, 480*b*, and 480*c* which are split based on the split shape mode information indicating a predetermined splitting method. Predetermined splitting methods of splitting a non-square coding unit will be described in detail below in relation to various embodiments.

According to an embodiment, the image decoding apparatus 100 may determine a splitting method of a coding unit by using the split shape mode information and, in this case, the split shape mode information may indicate the number of one or more coding units generated by splitting a coding unit. Referring to FIG. 7, when the split shape mode information indicates to split the current coding unit 400 or 450 into two coding units, the image decoding apparatus 100 may determine two coding units 420*a* and 420*b*, or 470*a* and 470*b* included in the current coding unit 400 or 450, by splitting the current coding unit 400 or 450 based on the split shape mode information.

According to an embodiment, when the image decoding apparatus 100 splits the non-square current coding unit 400 or 450 based on the split shape mode information, the image decoding apparatus 100 may split a current coding unit, in consideration of the location of a long side of the non-square current coding unit 400 or 450. For example, the image decoding apparatus 100 may determine a plurality of coding units by splitting the current coding unit 400 or 450 by splitting a long side of the current coding unit 400 or 450, in consideration of the shape of the current coding unit 400 or 450.

According to an embodiment, when the split shape mode information indicates to split (tri-split) a coding unit into an odd number of blocks, the image decoding apparatus 100 may determine an odd number of coding units included in the current coding unit 400 or 450. For example, when the split shape mode information indicates to split the current coding unit 400 or 450 into three coding units, the image decoding apparatus 100 may split the current coding unit 400 or 450 into three coding units 430*a*, 430*b*, and 430*c*, or 480*a*, 480*b*, and 480*c*.

According to an embodiment, a ratio of the width and height of the current coding unit 400 or 450 may be 4:1 or 1:4. When the ratio of the width and height is 4:1, the block shape information may indicate a horizontal direction because the length of the width is longer than the length of the height. When the ratio of the width and height is 1:4, the block shape information may indicate a vertical direction because the length of the width is shorter than the length of the height. The image decoding apparatus 100 may determine to split a current coding unit into the odd number of blocks, based on the split shape mode information. Also, the image decoding apparatus 100 may determine a split direction of the current coding unit 400 or 450, based on the block shape information of the current coding unit 400 or 450. For example, when the current coding unit 400 is in the vertical direction, the image decoding apparatus 100 may determine the coding units 430*a*, 430*b*, and 430*c* by splitting the current coding unit 400 in the horizontal direction. Also, when the current coding unit 450 is in the horizontal direction, the image decoding apparatus 100 may determine the coding units 480*a*, 480*b*, and 480*c* by splitting the current coding unit 450 in the vertical direction.

According to an embodiment, the image decoding apparatus 100 may determine the odd number of coding units included in the current coding unit 400 or 450, and not all the determined coding units may have the same size. For example, a predetermined coding unit 430*b* or 480*b* from among the determined odd number of coding units 430*a*, 430*b*, and 430*c*, or 480*a*, 480*b*, and 480*c* may have a size different from the size of the other coding units 430*a* and 430*c*, or 480*a* and 480*c*. That is, coding units which may be determined by splitting the current coding unit 400 or 450 may have multiple sizes and, in some cases, all of the odd number of coding units 430*a*, 430*b*, and 430*c*, or 480*a*, 480*b*, and 480*c* may have different sizes.

According to an embodiment, when the split shape mode information indicates to split a coding unit into the odd number of blocks, the image decoding apparatus 100 may determine the odd number of coding units included in the current coding unit 400 or 450, and in addition, may put a predetermined restriction on at least one coding unit from among the odd number of coding units generated by splitting the current coding unit 400 or 450. Referring to FIG. 7, the image decoding apparatus 100 may allow a decoding process of the coding unit 430*b* or 480*b* to be different from that of the other coding units 430*a* and 430*c*, or 480*a* or 480*c*, wherein coding unit 430*b* or 480*b* is at a center location from among the three coding units 430*a*, 430*b*, and 430*c* or 480*a*, 480*b*, and 480*c* generated by splitting the current coding unit 400 or 450. For example, the image decoding apparatus 100 may restrict the coding unit 430*b* or 480*b* at the center location to be no longer split or to be split only a predetermined number of times, unlike the other coding units 430*a* and 430*c*, or 480*a* and 480*c*.

Figure 8:
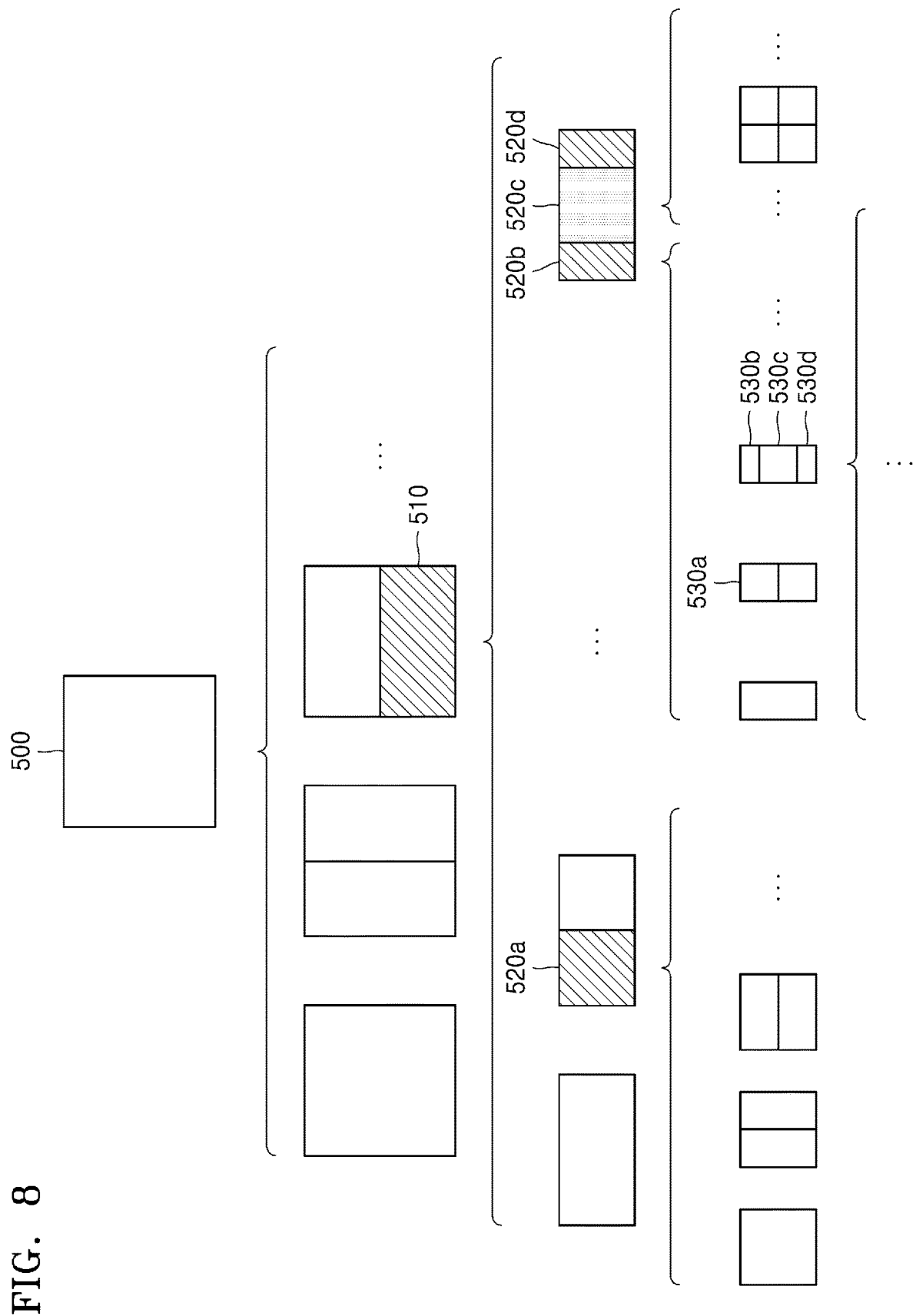
FIG. 8 illustrates a process, performed by the image decoding apparatus, of splitting a coding unit based on at least one of block shape information and split shape mode information, according to an embodiment.

FIG. 8 illustrates a process, performed by the image decoding apparatus 100, of splitting a coding unit based on at least one of block shape information and split shape mode information, according to an embodiment.

According to an embodiment, the image decoding apparatus 100 may determine to split or not to split a square first coding unit 500 into coding units, based on at least one of the block shape information and the split shape mode information. According to an embodiment, when the split shape mode information indicates to split the first coding unit 500 in a horizontal direction, the image decoding apparatus 100 may determine a second coding unit 510 by splitting the first coding unit 500 in a horizontal direction. A first coding unit, a second coding unit, and a third coding unit used according to an embodiment are terms used to understand a relation before and after splitting a coding unit. For example, the second coding unit may be determined by splitting the first coding unit, and the third coding unit may be determined by splitting the second coding unit. It will be understood that the structure of the first coding unit, the second coding unit, and the third coding unit follows the above descriptions.

According to an embodiment, the image decoding apparatus 100 may determine to split the determined second coding unit 510 into coding units, based on at least one of the block shape information and the split shape mode information, or may determine to not split the determined second coding unit 510. Referring to FIG. 8, the image decoding apparatus 100 may split the non-square second coding unit 510, which is determined by splitting the first coding unit 500, into one or more third coding units 520*a*, or 520*b*, 520*c*, and 520*d* at least one of the block shape information and the split shape mode information, or may not split the non-square second coding unit 510. The image decoding apparatus 100 may obtain at least one of the block shape information and the split shape mode information, and may split a plurality of various-shaped second coding units (e.g., 510) by splitting the first coding unit 500, based on at least one of the obtained block shape information and the obtained split shape mode information, and the second coding unit 510 may be split by using a splitting method of the first coding unit 500 based on at least one of the block shape information and the split shape mode information. According to an embodiment, when the first coding unit 500 is split into the second coding units 510 based on at least one of block shape information and split shape mode information about the first coding unit 500, the second coding unit 510 may also be split into the third coding units 520*a*, or 520*b*, 520*c*, and 520*d* based on at least one of block shape information and split shape mode information about the second coding unit 510. That is, a coding unit may be recursively split based on at least one of block shape information and split shape mode information about each coding unit. Therefore, a square coding unit may be determined by splitting a non-square coding unit, and a non-square coding unit may be determined by recursively splitting the square coding unit.

Referring to FIG. 8, a predetermined coding unit (e.g., a coding unit located at a center location or a square coding unit) from among the odd number of third coding units 520*b*, 520*c*, and 520*d* determined by splitting the non-square second coding unit 510 may be recursively split. According to an embodiment, the non-square third coding unit 520*b* from among the odd number of third coding units 520*b*, 520c, and 520d may be split in a horizontal direction into a plurality of fourth coding units. A non-square fourth coding unit 530b or 530d from among a plurality of fourth coding units 530a, 530b, 530c, and 530d may be re-split into a plurality of coding units again. For example, the non-square fourth coding unit 530b or 530d may be split into the odd number of coding units again. A method that may be used to recursively split a coding unit will be described below in relation to various embodiments.

According to an embodiment, the image decoding apparatus 100 may split each of the third coding units 520a, or 520b, 520c, and 520d into coding units, based on at least one of block shape information and split shape mode information. Also, the image decoding apparatus 100 may determine not to split the second coding unit 510 based on at least one of block shape information and split shape mode information. According to an embodiment, the image decoding apparatus 100 may split the non-square second coding unit 510 into the odd number of third coding units 520b, 520c, and 520d. The image decoding apparatus 100 may put a predetermined restriction on a predetermined third coding unit from among the odd number of third coding units 520b, 520c, and 520d. For example, the image decoding apparatus 100 may restrict the third coding unit 520c at a center location from among the odd number of third coding units 520b, 520c, and 520d to be no longer split or to be split according a preset number of times.

Referring to FIG. 8, the image decoding apparatus 100 may restrict the third coding unit 520c, which is at the center location from among the odd number of third coding units 520b, 520c, and 520d included in the non-square second coding unit 510, to be no longer split, to be split by using a predetermined splitting method (e.g., split into only four coding units or split by using a splitting method of the second coding unit 510), or to be split only a predetermined number of times (e.g., split only n times (where n>0)). However, the restrictions on the third coding unit 520c at the center location are not limited to the aforementioned examples, and it should be understood that the restrictions may include various restrictions for decoding the third coding unit 520c at the center location differently from the other third coding units 520b and 520d.

According to an embodiment, the image decoding apparatus 100 may obtain at least one of block shape information and split shape mode information, which is used to split a current coding unit, from a predetermined location in the current coding unit.

Figure 9:
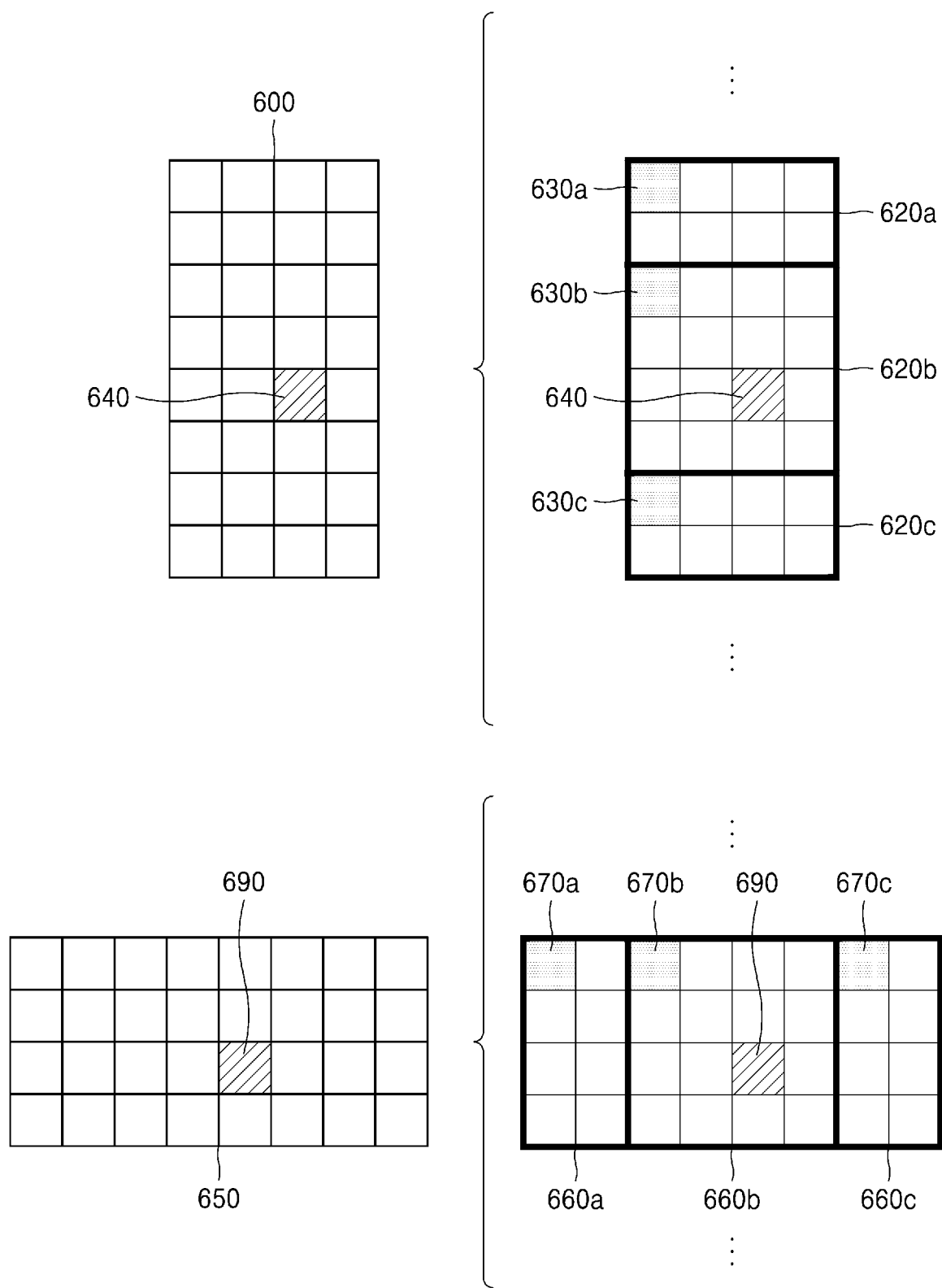
FIG. 9 illustrates a method, performed by the image decoding apparatus, of determining a predetermined coding unit from among an odd number of coding units, according to an embodiment.

FIG. 9 illustrates a method, performed by the image decoding apparatus 100, of determining a predetermined coding unit from among an odd number of coding units, according to an embodiment.

Referring to FIG. 9, at least one of block shape information and split shape mode information about a current coding unit 600 or 650 may be obtained from a sample of a predetermined location (e.g., a sample 640 or 690 of a center location) from among a plurality of samples included in the current coding unit 600 or 650. However, the predetermined location in the current coding unit 600, from which at least one of the block shape information and the split shape mode information may be obtained, is not limited to the center location in FIG. 9, and may include various locations included in the current coding unit 600 (e.g., top, bottom, left, right, upper-left, lower-left, upper-right, and lower-right locations). The image decoding apparatus 100 may obtain at least one of the block shape information and the split shape mode information from the predetermined location and may determine to split or not to split the current coding unit into various-shaped and various-sized coding units.

According to an embodiment, when the current coding unit is split into a predetermined number of coding units, the image decoding apparatus 100 may select one of the coding units. Various methods may be used to select one of a plurality of coding units, as will be described below in relation to various embodiments.

According to an embodiment, the image decoding apparatus 100 may split the current coding unit into a plurality of coding units, and may determine a coding unit at a predetermined location.

According to an embodiment, the image decoding apparatus 100 may use information indicating locations of the odd number of coding units, so as to determine a coding unit at a center location from among the odd number of coding units. Referring to FIG. 9, the image decoding apparatus 100 may determine the odd number of coding units 620a, 620b, and 620c or the odd number of coding units 660a, 660b, and 660c by splitting the current coding unit 600 or the current coding unit 650. The image decoding apparatus 100 may determine the middle coding unit 620b or the middle coding unit 660b by using information about the locations of the odd number of coding units 620a, 620b, and 620c or the odd number of coding units 660a, 660b, and 660c. For example, the image decoding apparatus 100 may determine the coding unit 620b at the center location by determining the locations of the coding units 620a, 620b, and 620c based on information indicating locations of predetermined samples included in the coding units 620a, 620b, and 620c. Specifically, the image decoding apparatus 100 may determine the coding unit 620b at the center location by determining the locations of the coding units 620a, 620b, and 620c based on information indicating locations of top-left samples 630a, 630b, and 630c of the coding units 620a, 620b, and 620c.

According to an embodiment, the information indicating the locations of the top-left samples 630a, 630b, and 630c, which are included in the coding units 620a, 620b, and 620c, respectively, may include information about locations or coordinates of the coding units 620a, 620b, and 620c in a picture. According to an embodiment, the information indicating the locations of the top-left samples 630a, 630b, and 630c, which are included in the coding units 620a, 620b, and 620c, respectively, may include information indicating widths or heights of the coding units 620a, 620b, and 620c included in the current coding unit 600, and the widths or heights may correspond to information indicating differences between the coordinates of the coding units 620a, 620b, and 620c in the picture. That is, the image decoding apparatus 100 may determine the coding unit 620b at the center location by directly using the information about the locations or coordinates of the coding units 620a, 620b, and 620c in the picture, or by using the information about the widths or heights of the coding units, which correspond to the difference values between the coordinates.

According to an embodiment, information indicating the location of the top-left sample 630a of the upper coding unit 620a may include coordinates (xa, ya), information indicating the location of the top-left sample 630b of the middle coding unit 620b may include coordinates (xb, yb), and information indicating the location of the top-left sample 630c of the lower coding unit 620c may include coordinates (xc, yc). The image decoding apparatus 100 may determine the middle coding unit 620b by using the coordinates of the top-left samples 630a, 630b, and 630c which are included in the coding units 620a, 620b, and 620c, respectively. For example, when the coordinates of the top-left samples 630a, 630b, and 630c are sorted in an ascending or descending order, the coding unit 620b including the coordinates (xb, yb) of the sample 630b at a center location may be determined as a coding unit at a center location from among the coding units 620a, 620b, and 620c determined by splitting the current coding unit 600. However, the coordinates indicating the locations of the top-left samples 630a, 630b, and 630c may include coordinates indicating absolute locations in the picture, or may use coordinates (dxb, dyb) indicating a relative location of the top-left sample 630b of the middle coding unit 620b and coordinates (dxc, dyc) indicating a relative location of the top-left sample 630c of the lower coding unit 620c with reference to the location of the top-left sample 630a of the upper coding unit 620a. A method of determining a coding unit at a predetermined location by using coordinates of a sample included in the coding unit, as information indicating a location of the sample, is not limited to the aforementioned method, and may include various arithmetic methods capable of using the coordinates of the sample.

According to an embodiment, the image decoding apparatus 100 may split the current coding unit 600 into a plurality of coding units 620a, 620b, and 620c, and may select one of the coding units 620a, 620b, and 620c based on a predetermined criterion. For example, the image decoding apparatus 100 may select the coding unit 620b, which has a size different from that of the others, from among the coding units 620a, 620b, and 620c.

According to an embodiment, the image decoding apparatus 100 may determine the width or height of each of the coding units 620a, 620b, and 620c by using the coordinates (xa, ya) that is the information indicating the location of the top-left sample 630a of the upper coding unit 620a, the coordinates (xb, yb) that is the information indicating the location of the top-left sample 630b of the middle coding unit 620b, and the coordinates (xc, yc) that is the information indicating the location of the top-left sample 630c of the lower coding unit 620c. The image decoding apparatus 100 may determine the respective sizes of the coding units 620a, 620b, and 620c by using the coordinates (xa, ya), (xb, yb), and (xc, yc) indicating the locations of the coding units 620a, 620b, and 620c. According to an embodiment, the image decoding apparatus 100 may determine the width of the upper coding unit 620a to be the width of the current coding unit 600. The image decoding apparatus 100 may determine the height of the upper coding unit 620a to be yb-ya. According to an embodiment, the image decoding apparatus 100 may determine the width of the middle coding unit 620b to be the width of the current coding unit 600. The image decoding apparatus 100 may determine the height of the middle coding unit 620b to be yc-yb. According to an embodiment, the image decoding apparatus 100 may determine the width or height of the lower coding unit 620c by using the width or height of the current coding unit 600 or the widths or heights of the upper and middle coding units 620a and 620b. The image decoding apparatus 100 may determine a coding unit, which has a size different from that of the others, based on the determined widths and heights of the coding units 620a, 620b, and 620c. Referring to FIG. 9, the image decoding apparatus 100 may determine the middle coding unit 620b, which has a size different from the size of the upper and lower coding units 620a and 620c, as the coding unit of the predetermined location. However, the aforementioned method, performed by the image decoding apparatus 100, of determining a coding unit having a size different from the size of the other coding units merely corresponds to an example of determining a coding unit at a predetermined location by using the sizes of coding units, which are determined based on coordinates of samples, and thus various methods of determining a coding unit at a predetermined location by comparing the sizes of coding units, which are determined based on coordinates of predetermined samples, may be used.

The image decoding apparatus 100 may determine the width or height of each of the coding units 660a, 660b, and 660c by using the coordinates (xd, yd) that is information indicating the location of a top-left sample 670a of the left coding unit 660a, the coordinates (xe, ye) that is information indicating the location of a top-left sample 670b of the middle coding unit 660b, and the coordinates (xf, yf) that is information indicating a location of the top-left sample 670c of the right coding unit 660c. The image decoding apparatus 100 may determine the respective sizes of the coding units 660a, 660b, and 660c by using the coordinates (xd, yd), (xe, ye), and (xf, yf) indicating the locations of the coding units 660a, 660b, and 660c.

According to an embodiment, the image decoding apparatus 100 may determine the width of the left coding unit 660a to be xe-xd. The image decoding apparatus 100 may determine the height of the left coding unit 660a to be the height of the current coding unit 650. According to an embodiment, the image decoding apparatus 100 may determine the width of the middle coding unit 660b to be xf-xe. The image decoding apparatus 100 may determine the height of the middle coding unit 660b to be the height of the current coding unit 650. According to an embodiment, the image decoding apparatus 100 may determine the width or height of the right coding unit 660c by using the width or height of the current coding unit 650 or the widths or heights of the left and middle coding units 660a and 660b. The image decoding apparatus 100 may determine a coding unit, which has a size different from that of the others, based on the determined widths and heights of the coding units 660a, 660b, and 660c. Referring to FIG. 9, the image decoding apparatus 100 may determine the middle coding unit 660b, which has a size different from the sizes of the left and right coding units 660a and 660c, as the coding unit of the predetermined location. However, the aforementioned method, performed by the image decoding apparatus 100, of determining a coding unit having a size different from the size of the other coding units merely corresponds to an example of determining a coding unit at a predetermined location by using the sizes of coding units, which are determined based on coordinates of samples, and thus various methods of determining a coding unit at a predetermined location by comparing the sizes of coding units, which are determined based on coordinates of predetermined samples, may be used.

However, locations of samples considered to determine locations of coding units are not limited to the aforementioned top-left locations, and information about arbitrary locations of samples included in the coding units may be used.

According to an embodiment, the image decoding apparatus 100 may select a coding unit at a predetermined location from among an odd number of coding units determined by splitting the current coding unit, in consideration of the shape of the current coding unit. For example, when the current coding unit has a non-square shape, a width of which is longer than its height, the image decoding apparatus 100 may determine the coding unit at the predetermined location in a horizontal direction. That is, the image decoding apparatus 100 may determine one of the coding units at different locations in a horizontal direction and may put a restriction on the coding unit. For example, when the current coding unit has a non-square shape, a height of which is longer than its width, the image decoding apparatus 100 may determine the coding unit at the predetermined location in a vertical direction. That is, the image decoding apparatus 100 may determine one of coding units at different locations in a vertical direction and may put a restriction on the coding unit.

According to an embodiment, the image decoding apparatus 100 may use information indicating respective locations of an even number of coding units, so as to determine the coding unit at the predetermined location from among the even number of coding units. The image decoding apparatus 100 may determine an even number of coding units by splitting (e.g., bi-split) the current coding unit, and may determine the coding unit at the predetermined location by using the information about the locations of the even number of coding units. An operation related thereto may correspond to the operation of determining a coding unit at a predetermined location (e.g., a center location) from among an odd number of coding units, which is described in detail above with reference to FIG. 9, and thus detailed descriptions thereof are not provided here.

According to an embodiment, when a non-square current coding unit is split into a plurality of coding units, predetermined information about a coding unit at a predetermined location may be used in a splitting process to determine the coding unit at the predetermined location from among the plurality of coding units. For example, the image decoding apparatus 100 may use at least one of block shape information and split shape mode information, which is stored in a sample included in a middle coding unit, in a splitting process to determine a coding unit at a center location from among the plurality of coding units determined by splitting the current coding unit.

Referring to FIG. 9, the image decoding apparatus 100 may split the current coding unit 600 into the plurality of coding units 620a, 620b, and 620c based on at least one of the block shape information and the split shape mode information, and may determine the coding unit 620b at a center location from among the plurality of the coding units 620a, 620b, and 620c. Furthermore, the image decoding apparatus 100 may determine the coding unit 620b at the center location, in consideration of a location from which based on at least one of the block shape information and the split shape mode information is obtained. That is, at least one of block shape information and split shape mode information about the current coding unit 600 may be obtained from the sample 640 at a center location of the current coding unit 600 and, when the current coding unit 600 is split into the plurality of coding units 620a, 620b, and 620c based on at least one of the block shape information and the split shape mode information, the coding unit 620b including the sample 640 may be determined as the coding unit at the center location. However, information used to determine the coding unit at the center location is not limited to at least one of block shape information and split shape mode information, and various types of information may be used to determine the coding unit at the center location.

According to an embodiment, predetermined information for identifying the coding unit at the predetermined location may be obtained from a predetermined sample included in a coding unit to be determined. Referring to FIG. 9, the image decoding apparatus 100 may use at least one of the block shape information and the split shape mode information, which is obtained from a sample at a predetermined location in the current coding unit 600 (e.g., a sample at a center location of the current coding unit 600), to determine a coding unit at a predetermined location from among the plurality of the coding units 620a, 620b, and 620c determined by splitting the current coding unit 600 (e.g., a coding unit at a center location from among a plurality of split coding units). That is, the image decoding apparatus 100 may determine the sample at the predetermined location by considering a block shape of the current coding unit 600, may determine the coding unit 620b including a sample, from which predetermined information (e.g., at least one of the block shape information and the split shape mode information) is obtainable, from among the plurality of coding units 620a, 620b, and 620c determined by splitting the current coding unit 600, and may put a predetermined restriction on the coding unit 620b. Referring to FIG. 9, according to an embodiment, the image decoding apparatus 100 may determine the sample 640 at the center location of the current coding unit 600 as the sample from which the predetermined information is obtainable, and may put a predetermined restriction on the coding unit 620b including the sample 640, in a decoding operation. However, the location of the sample from which the predetermined information is obtainable is not limited to the aforementioned location, and may include arbitrary locations of samples included in the coding unit 620b to be determined for a restriction.

According to an embodiment, the location of the sample from which the predetermined information is obtainable may be determined based on the shape of the current coding unit 600. According to an embodiment, the block shape information may indicate whether the current coding unit has a square or non-square shape, and the location of the sample from which the predetermined information is obtainable may be determined based on the shape. For example, the image decoding apparatus 100 may determine a sample located on a boundary for splitting at least one of a width and height of the current coding unit in half, as the sample from which the predetermined information is obtainable, by using at least one of information about the width of the current coding unit and information about the height of the current coding unit. As another example, when the block shape information of the current coding unit indicates a non-square shape, the image decoding apparatus 100 may determine one of samples adjacent to a boundary for splitting a long side of the current coding unit in half, as the sample from which the predetermined information is obtainable.

According to an embodiment, when the current coding unit is split into a plurality of coding units, the image decoding apparatus 100 may use at least one of the block shape information and the split shape mode information so as to determine a coding unit at a predetermined location from among the plurality of coding units. According to an embodiment, the image decoding apparatus 100 may obtain at least one of the block shape information and the split shape mode information from a sample at a predetermined location in a coding unit, and may split the plurality of coding units, which are generated by splitting the current coding unit, by using at least one of the block shape information and the split shape mode information, which is obtained from the sample of the predetermined location in each of the plurality of coding units. That is, a coding unit may be recursively split based on at least one of the block shape information and the split shape mode information, which is obtained from the sample at the predetermined location in each coding unit. An operation of recursively splitting a coding unit is described above with reference to FIG. 8, and thus detailed descriptions thereof are not provided here.

According to an embodiment, the image decoding apparatus 100 may determine one or more coding units by splitting the current coding unit, and may determine an order of decoding the one or more coding units, based on a predetermined block (e.g., the current coding unit).

Figure 10:
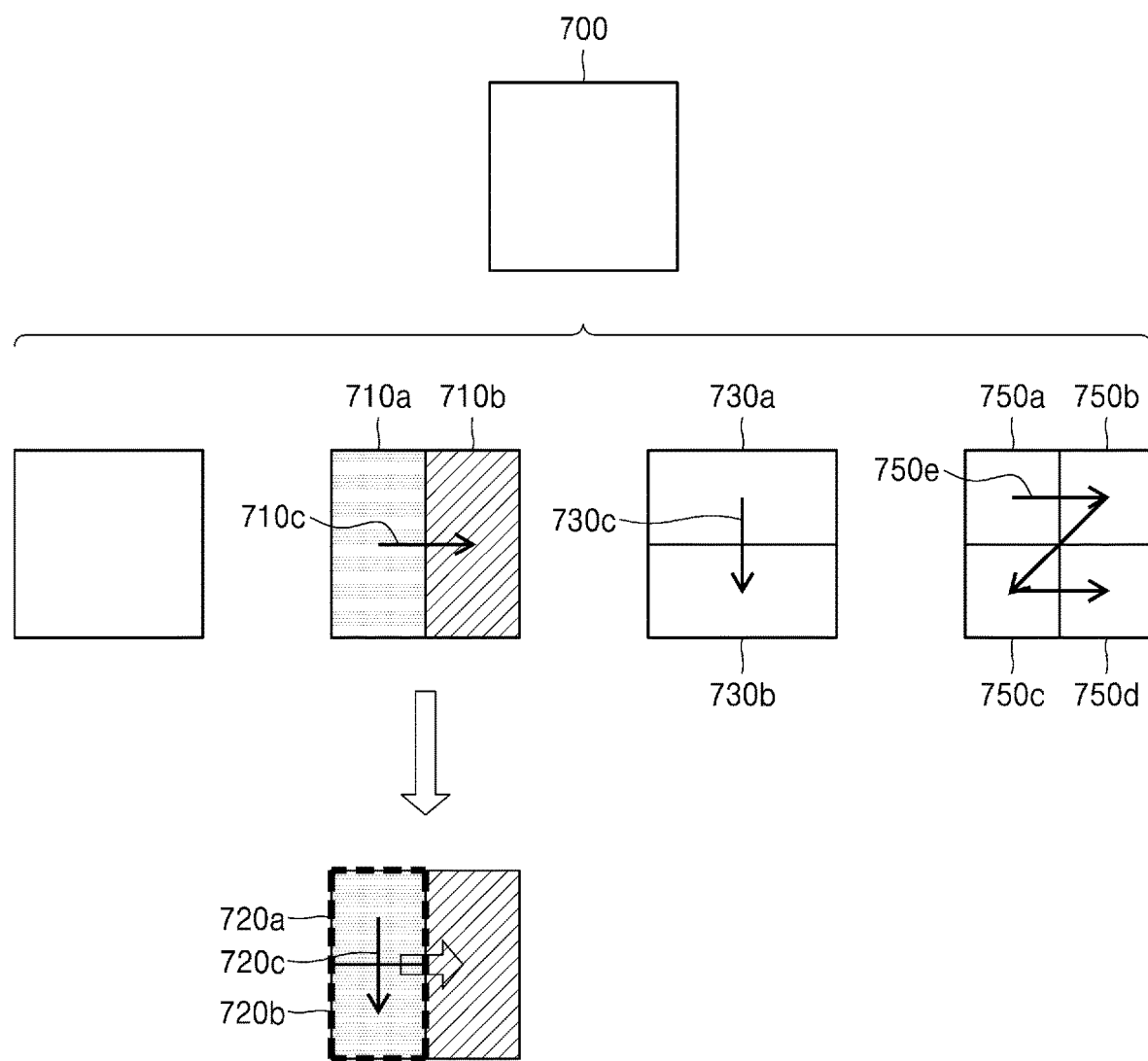
FIG. 10 illustrates an order of processing a plurality of coding units when the image decoding apparatus determines a plurality of coding units by splitting a current coding unit, according to an embodiment.

FIG. 10 illustrates an order of processing a plurality of coding units when the image decoding apparatus 100 determines the plurality of coding units by splitting a current coding unit, according to an embodiment.

According to an embodiment, the image decoding apparatus 100 may determine second coding units 710a and 710b by splitting a first coding unit 700 in a vertical direction, may determine second coding units 730a and 730b by splitting the first coding unit 700 in a horizontal direction, or may determine second coding units 750a to 750d by splitting the first coding unit 700 in vertical and horizontal directions, based on at least one of block shape information and split shape mode information.

Referring to FIG. 10, the image decoding apparatus 100 may determine to process the second coding units 710a and 710b in a horizontal direction order 710c, the second coding units 710a and 710b being determined by splitting the first coding unit 700 in a vertical direction. The image decoding apparatus 100 may determine to process the second coding units 730a and 730b in a vertical direction order 730c, the second coding units 730a and 730b being determined by splitting the first coding unit 700 in a horizontal direction. The image decoding apparatus 100 may determine to process the second coding units 750a, 750b, 750c, and 750d, which are determined by splitting the first coding unit 700 in vertical and horizontal directions, in a predetermined order for processing coding units in a row and then processing coding units in a next row (e.g., in a raster scan order or Z-scan order 750e).

According to an embodiment, the image decoding apparatus 100 may recursively split coding units. Referring to FIG. 10, the image decoding apparatus 100 may determine the plurality of coding units 710a and 710b, 730a and 730b, or 750a, 750b, 750c, and 750d by splitting the first coding unit 700, and may recursively split each of the determined plurality of coding units 710b, 730a and 730b, or 750a, 750b, 750c, and 750d. A splitting method of the plurality of coding units 710a and 710b, 730a and 730b, or 750a, 750b, 750c, and 750d may correspond to a splitting method of the first coding unit 700. Accordingly, each of the plurality of coding units 710a and 710b, 730a and 730b, or 750a, 750b, 750c, and 750d may be independently split into a plurality of coding units. Referring to FIG. 10, the image decoding apparatus 100 may determine the second coding units 710a and 710b by splitting the first coding unit 700 in a vertical direction, and may determine to independently split each of the second coding units 710a and 710b or not to split the second coding units 710a and 710b.

According to an embodiment, the image decoding apparatus 100 may determine third coding units 720a and 720b by splitting the left second coding unit 710a in a horizontal direction, and may not split the right second coding unit 710b.

According to an embodiment, a processing order of coding units may be determined based on an operation of splitting a coding unit. In other words, a processing order of split coding units may be determined based on a processing order of coding units immediately before being split. The image decoding apparatus 100 may determine a processing order of the third coding units 720a and 720b determined by splitting the left second coding unit 710a, independently of the right second coding unit 710b. Because the third coding units 720a and 720b are determined by splitting the left second coding unit 710a in a horizontal direction, the third coding units 720a and 720b may be processed in a vertical direction order 720c. Because the left and right second coding units 710a and 710b are processed in the horizontal direction order 710c, the right second coding unit 710b may be processed after the third coding units 720a and 720b included in the left second coding unit 710a are processed in the vertical direction order 720c. An operation of determining a processing order of coding units based on a coding unit before being split is not limited to the aforementioned example, and various methods may be used to independently process coding units, which are split and determined to various shapes, in a predetermined order.

Figure 11:
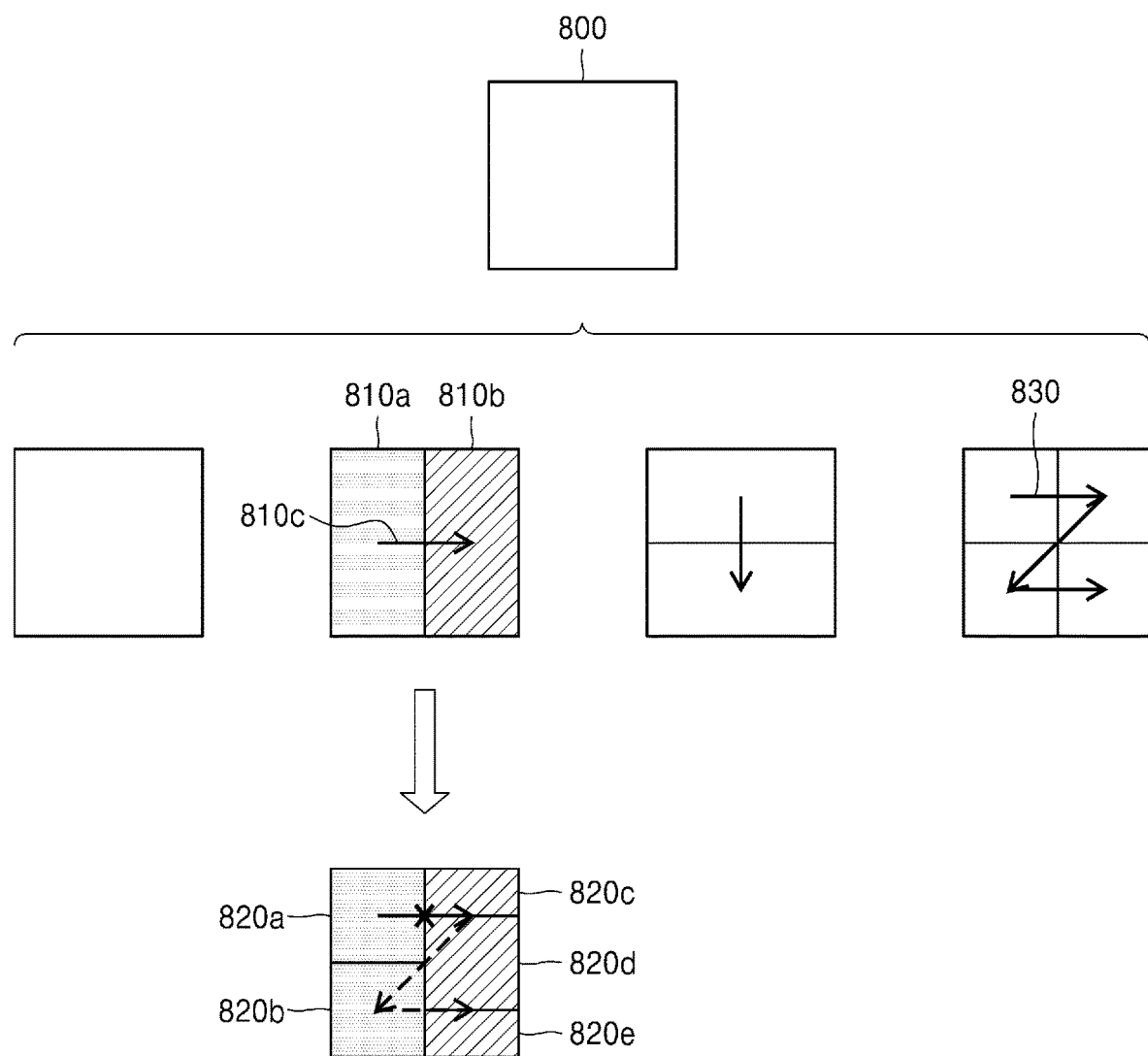
FIG. 11 illustrates a process, performed by the image decoding apparatus, of determining that a current coding unit is to be split into an odd number of coding units when the coding units are not processable in a predetermined order, according to an embodiment.

FIG. 11 illustrates a process, performed by the image decoding apparatus 100, of determining that a current coding unit is to be split into an odd number of coding units, when the coding units are not processable in a predetermined order, according to an embodiment.

According to an embodiment, the image decoding apparatus 100 may determine that the current coding unit is to be split into an odd number of coding units, based on obtained block shape information and split shape mode information. Referring to FIG. 11, a square first coding unit 800 may be split into non-square second coding units 810a and 810b, and the second coding units 810a and 810b may be independently split into third coding units 820a and 820b, and 820c, 820d, and 820e. According to an embodiment, the image decoding apparatus 100 may determine the plurality of third coding units 820a and 820b by splitting the left second coding unit 810a in a horizontal direction, and may split the right second coding unit 810b into the odd number of third coding units 820c, 820d, and 820e.

According to an embodiment, the image decoding apparatus 100 may determine whether there are an odd number of split coding units, by determining whether the third coding units 820a and 820b, and 820c, 820d, and 820e are processable in a predetermined order. Referring to FIG. 11, the image decoding apparatus 100 may determine the third coding units 820a and 820b, and 820c, 820d, and 820e by recursively splitting the first coding unit 800. The image decoding apparatus 100 may determine whether any of the first coding unit 800, the second coding units 810a and 810b, or the third coding units 820a and 820b, and 820c, 820d, and 820e is to be split into an odd number of coding units, based on at least one of the block shape information and the split shape mode information. For example, the second coding unit 810b located in the right from among the second coding units 810a and 810b may be split into an odd number of third coding units 820c, 820d, and 820e. A processing order of a plurality of coding units included in the first coding unit 800 may be a predetermined order (e.g., a Z-scan order 830), and the image decoding apparatus 100 may determine whether the third coding units 820c, 820d, and 820e, which are determined by splitting the right second coding unit 810b into an odd number of coding units, satisfy a condition for processing in the predetermined order.

According to an embodiment, the image decoding apparatus 100 may determine whether the third coding units 820a and 820b, and 820c, 820d, and 820e included in the first coding unit 800 satisfy the condition for processing in the predetermined order, and the condition relates to whether at least one of a width and height of the second coding units 810a and 810b is to be split in half along a boundary of the third coding units 820a and 820b, and 820c, 820d, and 820e. For example, the third coding units 820a and 820b determined when the height of the left second coding unit 810a of the non-square shape is split in half may satisfy the condition. It may be determined that the third coding units 820c, 820d, and 820e do not satisfy the condition because the boundaries of the third coding units 820c, 820d, and 820e determined when the right second coding unit 810b is split into three coding units are unable to split the width or height of the right second coding unit 810b in half. When the condition is not satisfied as described above, the image decoding apparatus 100 may determine disconnection of a scan order, and may determine that the right second coding unit 810b is to be split into an odd number of coding units, based on a result of the determination. According to an embodiment, when a coding unit is split into an odd number of coding units, the image decoding apparatus 100 may put a predetermined restriction on a coding unit at a predetermined location from among the split coding units. The restriction or the predetermined location is described above in relation to various embodiments, and thus detailed descriptions thereof are not provided herein.

Figure 12:
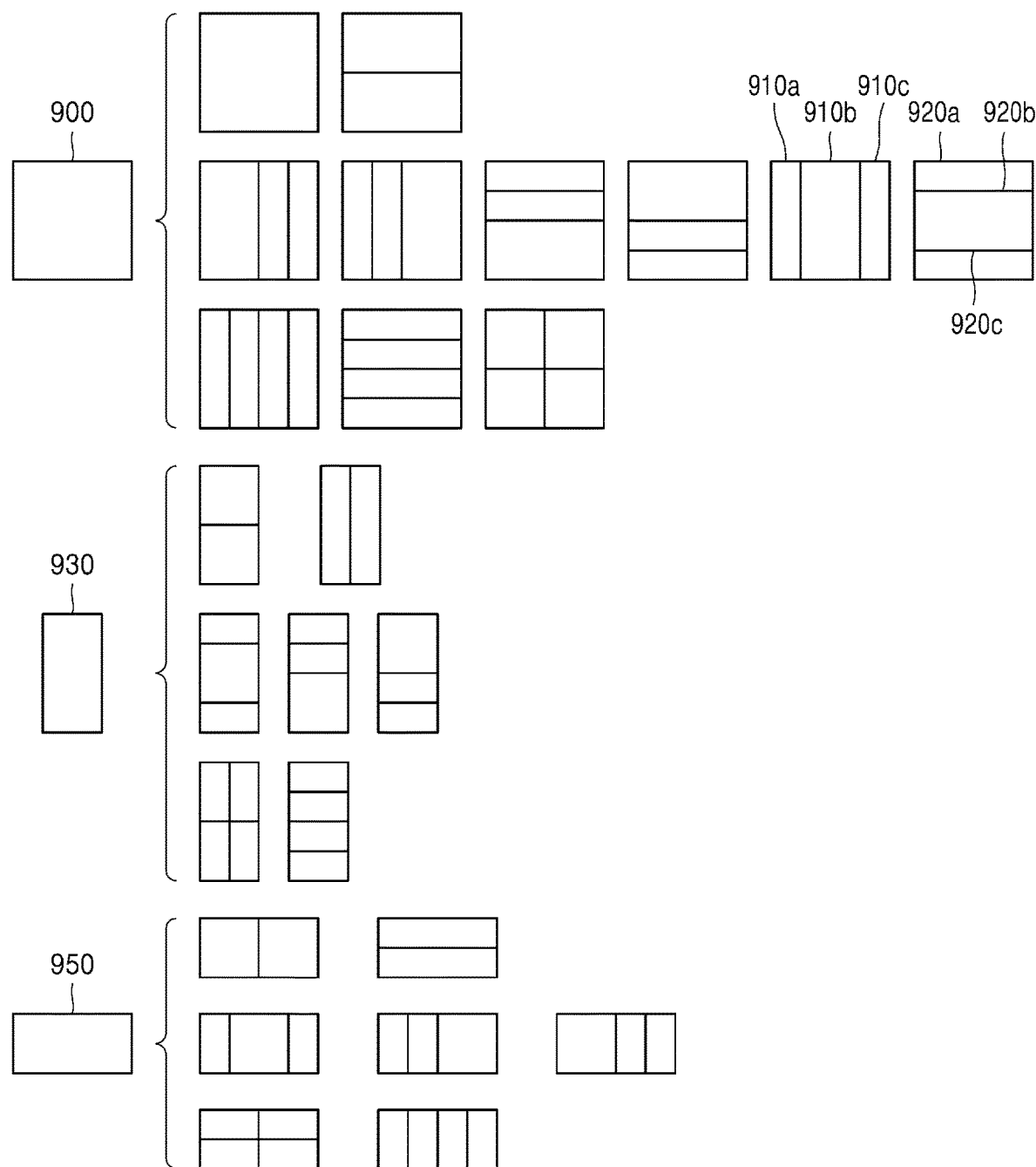
FIG. 12 illustrates a process, performed by the image decoding apparatus, of determining at least one coding unit by splitting a first coding unit, according to an embodiment.

FIG. 12 illustrates a process, performed by the image decoding apparatus 100, of determining at least one coding unit by splitting a first coding unit 900, according to an embodiment.

According to an embodiment, the image decoding apparatus 100 may split the first coding unit 900, based on at least one of block shape information and split shape mode information that is obtained through the obtainer 105. The square first coding unit 900 may be split into four square coding units, or may be split into a plurality of non-square coding units. For example, referring to FIG. 12, when the block shape information indicates that the first coding unit 900 is a square and the split shape mode information indicates to split the first coding unit 900 into non-square coding units, the image decoding apparatus 100 may split the first coding unit 900 into a plurality of non-square coding units. Specifically, when the split shape mode information indicates to determine an odd number of coding units by splitting the first coding unit 900 in a horizontal direction or a vertical direction, the image decoding apparatus 100 may split the square first coding unit 900 into an odd number of coding units, e.g., second coding units 910a, 910b, and 910c determined by splitting the square first coding unit 900 in a vertical direction or second coding units 920a, 920b, and 920c determined by splitting the square first coding unit 900 in a horizontal direction.

According to an embodiment, the image decoding apparatus 100 may determine whether the second coding units 910a, 910b, 910c, 920a, 920b, and 920c included in the first coding unit 900 satisfy a condition for processing in a predetermined order, and the condition relates to whether at least one of a width and height of the first coding unit 900 is to be split in half along a boundary of the second coding units 910a, 910b, 910c, 920a, 920b, and 920c. Referring to FIG. 12, because boundaries of the second coding units 910a, 910b, and 910c determined by splitting the square first coding unit 900 in a vertical direction do not split the width of the first coding unit 900 in half, it may be determined that the first coding unit 900 does not satisfy the condition for processing in the predetermined order. In addition, because boundaries of the second coding units 920a, 920b, and 920c determined by splitting the square first coding unit 900 in a horizontal direction do not split the height of the first coding unit 900 in half, it may be determined that the first coding unit 900 does not satisfy the condition for processing in the predetermined order. When the condition is not satisfied as described above, the image decoding apparatus 100 may determine disconnection of a scan order, and may determine that the first coding unit 900 is to be split into an odd number of coding units, based on a result of the determination. According to an embodiment, when a coding unit is split into an odd number of coding units, the image decoding apparatus 100 may put a predetermined restriction on a coding unit at a predetermined location from among the split coding units. The restriction or the predetermined location is described above in relation to various embodiments, and thus detailed descriptions thereof are not provided herein.

According to an embodiment, the image decoding apparatus 100 may determine various-shaped coding units by splitting a first coding unit.

Referring to FIG. 12, the image decoding apparatus 100 may split the square first coding unit 900 or a non-square first coding unit 930 or 950 into various-shaped coding units.

Figure 13:
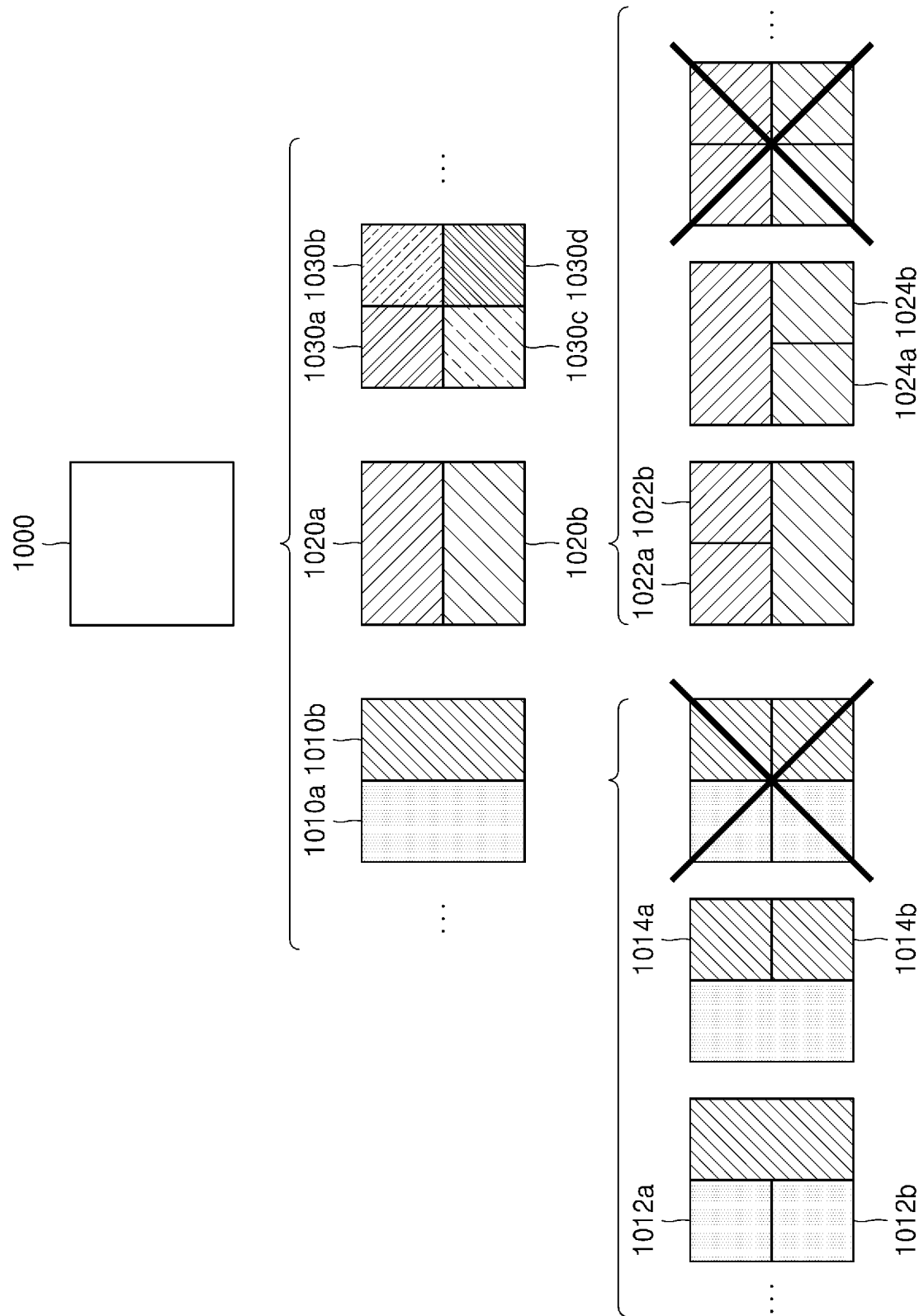
FIG. 13 illustrates that a shape into which a second coding unit is splittable is restricted when the second coding unit having a non-square shape, which is determined as the image decoding apparatus splits a first coding unit, satisfies a predetermined condition, according to an embodiment.

FIG. 13 illustrates that a shape into which a second coding unit is splittable is restricted when the second coding unit having a non-square shape, which is determined as the image decoding apparatus 100 splits a first coding unit 1000, satisfies a predetermined condition, according to an embodiment.

According to an embodiment, the image decoding apparatus 100 may determine to split the square first coding unit 1000 into non-square second coding units 1010a and 1010b or 1020a and 1020b, based on at least one of block shape information and split shape mode information which is obtained by the obtainer 105. The second coding units 1010a and 1010b or 1020a and 1020b may be independently split. Accordingly, the image decoding apparatus 100 may determine to split or not to split each of the second coding units 1010a and 1010b or 1020a and 1020b into a plurality of coding units, based on at least one of block shape information and split shape mode information about each of the second coding units 1010a and 1010b or 1020a and 1020b. According to an embodiment, the image decoding apparatus 100 may determine third coding units 1012a and 1012b by splitting the non-square left second coding unit 1010a, which is determined by splitting the first coding unit 1000 in a vertical direction, in a horizontal direction. However, when the left second coding unit 1010a is split in a horizontal direction, the image decoding apparatus 100 may restrict the right second coding unit 1010b to not be split in a horizontal direction in which the left second coding unit 1010a is split. When third coding units 1014a and 1014b are determined by splitting the right second coding unit 1010b in a same direction, because the left second coding unit 1010a and the right second coding unit 1010b are independently split in a horizontal direction, the third coding units 1012a and 1012b or 1014a and 1014b may be determined. This example is similar to an example in which the image decoding apparatus 100 splits the first coding unit 1000 into four square second coding units 1030a, 1030b, 1030c, and 1030d, based on at least one of the block shape information and the split shape mode information, and may be inefficient in terms of image decoding.

According to an embodiment, the image decoding apparatus 100 may determine third coding units 1022a and 1022b or 1024a and 1024b by splitting the non-square second coding unit 1020a or 1020b, which is determined by splitting the first coding unit 1000 in a horizontal direction, in a vertical direction. However, when a second coding unit (e.g., the upper second coding unit 1020a) is split in a vertical direction, for the aforementioned reason, the image decoding apparatus 100 may restrict the other second coding unit (e.g., the lower second coding unit 1020b) to not be split in a vertical direction in which the upper second coding unit 1020a is split.

Figure 14:
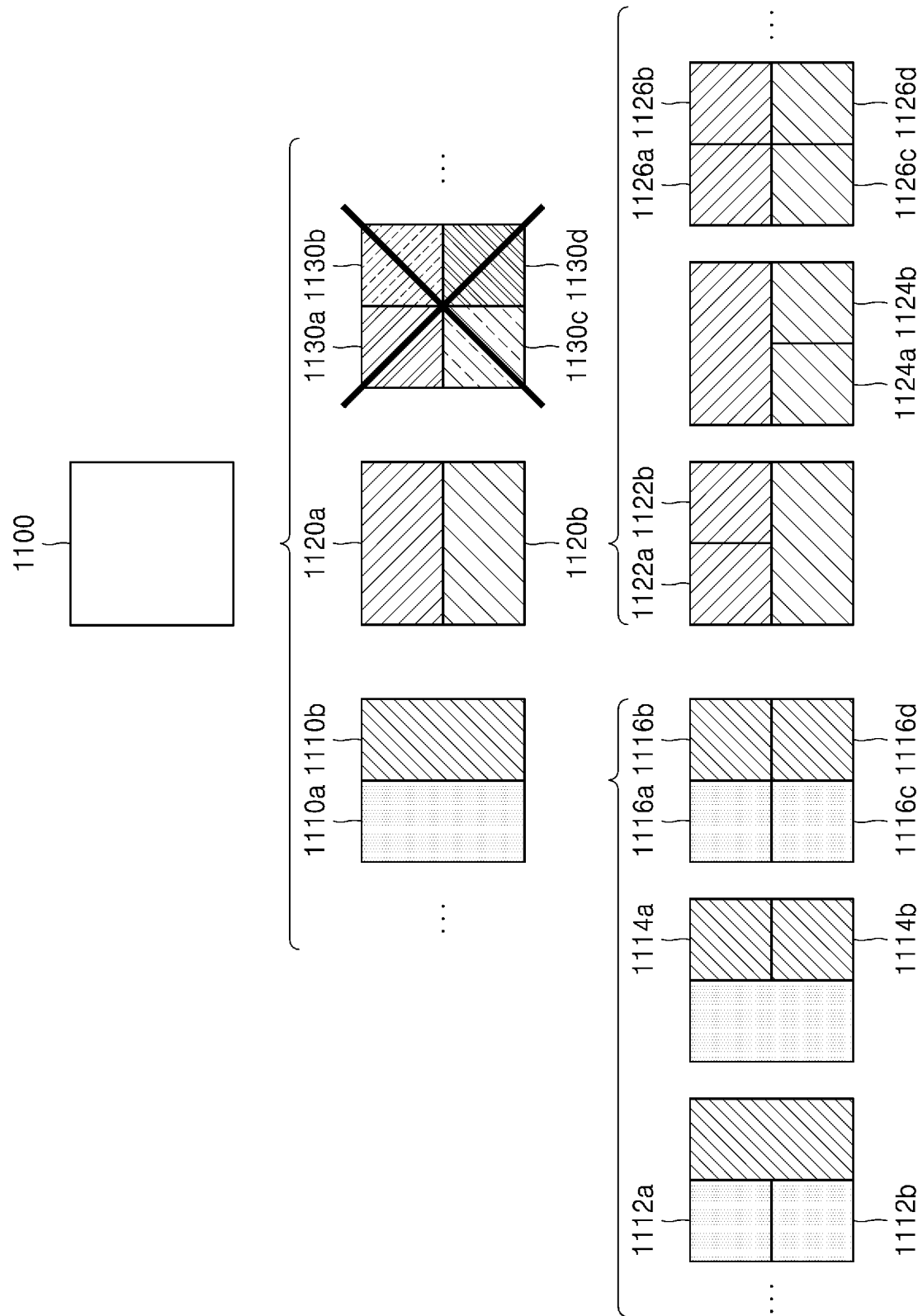
FIG. 14 illustrates a process, performed by the image decoding apparatus, of splitting a square coding unit when split shape mode information indicates that the square coding unit is to not be split into four square coding units, according to an embodiment.

FIG. 14 illustrates a process, performed by the image decoding apparatus 100, of splitting a square coding unit when split shape mode information indicates that the square coding unit is to not be split into four square coding units, according to an embodiment.

According to an embodiment, the image decoding apparatus 100 may determine second coding units 1110a and 1110b or 1120a and 1120b, etc. by splitting a first coding unit 1100, based on at least one of block shape information and split shape mode information. The split shape mode information may include information about various methods of splitting a coding unit, but the information about various splitting methods may not include information for splitting a coding unit into four square coding units. Based on the split shape mode information, the image decoding apparatus 100 does not split the square first coding unit 1100 into four square second coding units 1130a, 1130b, 1130c, and 1130d. The image decoding apparatus 100 may determine the non-square second coding units 1110a and 1110b or 1120a and 1120b, etc., based on the split shape mode information.

According to an embodiment, the image decoding apparatus 100 may independently split the non-square second coding units 1110a and 1110b or 1120a and 1120b, etc. Each of the second coding units 1110a and 1110b or 1120a and 1120b, etc. may be recursively split in a predetermined order, and this splitting method may correspond to a method of splitting the first coding unit 1100, based on at least one of the block shape information and the split shape mode information.

For example, the image decoding apparatus 100 may determine square third coding units 1112a and 1112b by splitting the left second coding unit 1110a in a horizontal direction, and may determine square third coding units 1114a and 1114b by splitting the right second coding unit 1110b in a horizontal direction. Furthermore, the image decoding apparatus 100 may determine square third coding units 1116a, 1116b, 1116c, and 1116d by splitting both the left second coding unit 1110a and the right second coding unit 1110b in a horizontal direction. In this case, coding units having the same shape as the four square second coding units 1130a, 1130b, 1130c, and 1130d split from the first coding unit 1100 may be determined.

As another example, the image decoding apparatus 100 may determine square third coding units 1122a and 1122b by splitting the upper second coding unit 1120a in a vertical direction, and may determine square third coding units 1124a and 1124b by splitting the lower second coding unit 1120b in a vertical direction. Furthermore, the image decoding apparatus 100 may determine square third coding units 1126a, 1126b, 1126c, and 1126d by splitting both the upper second coding unit 1120a and the lower second coding unit 1120b in a vertical direction. In this case, coding units having the same shape as the four square second coding units 1130a, 1130b, 1130c, and 1130d split from the first coding unit 1100 may be determined.

Figure 15:
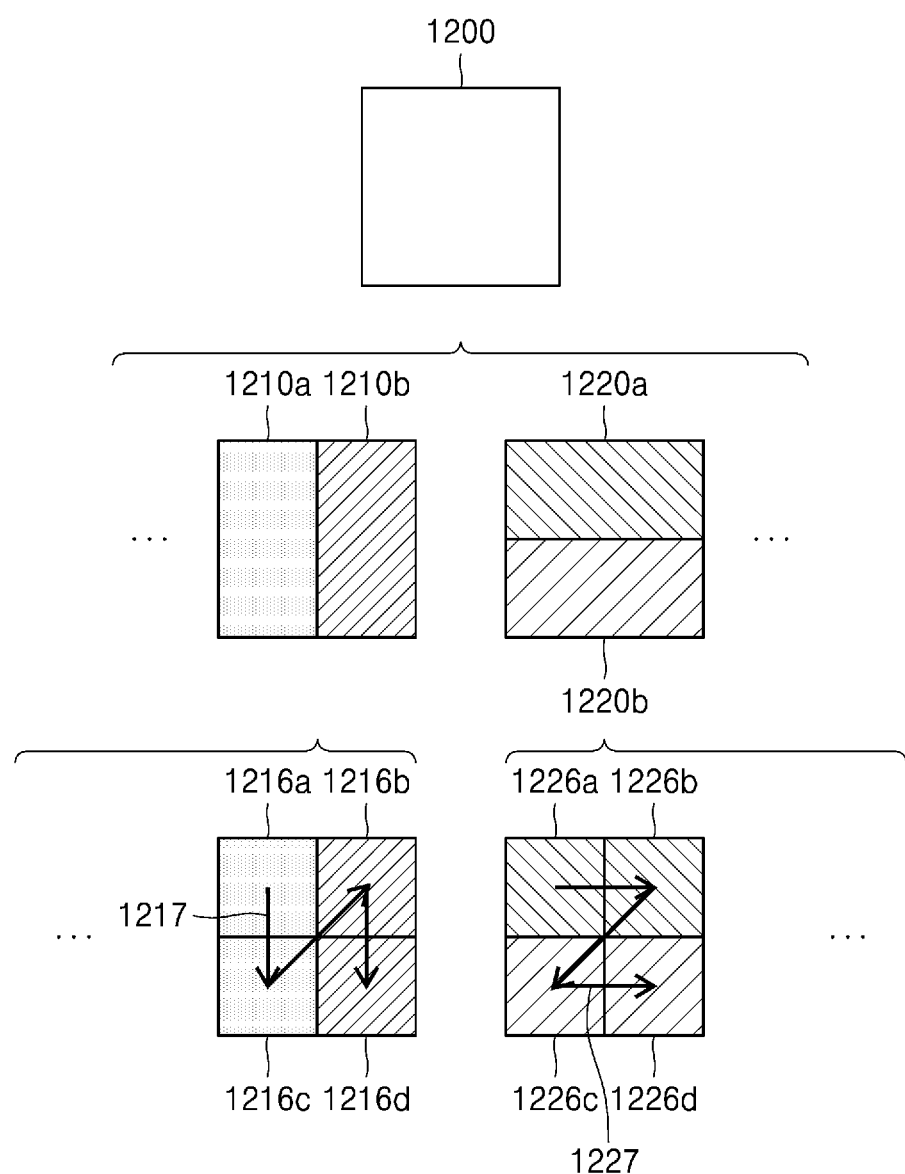
FIG. 15 illustrates that a processing order between a plurality of coding units may be changed depending on a process of splitting a coding unit, according to an embodiment.

FIG. 15 illustrates that a processing order between a plurality of coding units may be changed depending on a process of splitting a coding unit, according to an embodiment.

According to an embodiment, the image decoding apparatus 100 may split a first coding unit 1200, based on at least one of block shape information and split shape mode information. When the block shape information indicates a square shape and the split shape mode information indicates to split the first coding unit 1200 in at least one of horizontal and vertical directions, the image decoding apparatus 100 may determine second coding units 1210a and 1210b or 1220a and 1220b, etc. by splitting the first coding unit 1200. Referring to FIG. 15, the non-square second coding units 1210a and 1210b or 1220a and 1220b determined by splitting the first coding unit 1200 in a horizontal direction or vertical direction and may be independently split based on at least one of block shape information and split shape mode information about each coding unit. For example, the image decoding apparatus 100 may determine third coding units 1216a, 1216b, 1216c, and 1216d by splitting the second coding units 1210a and 1210b, which are generated by splitting the first coding unit 1200 in a vertical direction, in a horizontal direction, and may determine third coding units 1226a, 1226b, 1226c, and 1226d by splitting the second coding units 1220a and 1220b, which are generated by splitting the first coding unit 1200 in a horizontal direction, in a vertical direction. An operation of splitting the second coding units 1210a and 1210b or 1220a and 1220b is described above with reference to FIG. 15, and thus detailed descriptions thereof are not provided herein.

According to an embodiment, the image decoding apparatus 100 may process coding units in a predetermined order. An operation of processing coding units in a predetermined order is described above with reference to FIG. 10, and thus detailed descriptions thereof are not provided herein. Referring to FIG. 15, the image decoding apparatus 100 may determine four square third coding units 1216a, 1216b, 1216c, and 1216d, or four square third coding units 1226a, 1226b, 1226c, and 1226d by splitting the square first coding unit 1200. According to an embodiment, the image decoding apparatus 100 may determine processing orders of the third coding units 1216a, 1216b, 1216c, and 1216d, and 1226a, 1226b, 1226c, and 1226d based on a splitting method of the first coding unit 1200.

According to an embodiment, the image decoding apparatus 100 may determine the third coding units 1216a, 1216b, 1216c, and 1216d by splitting the second coding units 1210a and 1210b in a horizontal direction, and may process the third coding units 1216a, 1216b, 1216c, and 1216d in a processing order 1217 for initially processing the third coding units 1216a and 1216c, which are included in the left second coding unit 1210a, in a vertical direction and then processing the third coding unit 1216b and 1216d, which are included in the right second coding unit 1210b, in a vertical direction.

According to an embodiment, the image decoding apparatus 100 may determine the third coding units 1226a, 1226b, 1226c, and 1226d by splitting the second coding units 1220a and 1220b in a vertical direction, and may process the third coding units 1226a, 1226b, 1226c, and 1226d in a processing order 1227 for initially processing the third coding units 1226a and 1226b, which are included in the upper second coding unit 1220a, in a horizontal direction and then processing the third coding unit 1226c and 1226d, which are included in the lower second coding unit 1220b, in a horizontal direction.

Referring to FIG. 15, the square third coding units 1216a, 1216b, 1216c, and 1216d, and 1226a, 1226b, 1226c, and 1226d may be determined by splitting the second coding units 1210a and 1210b, and 1220a and 1220b, respectively. Although the second coding units 1210a and 1210b are determined by splitting the first coding unit 1200 in a vertical direction differently from the second coding units 1220a and 1220b which are determined by splitting the first coding unit 1200 in a horizontal direction, the third coding units 1216*a*, 1216*b*, 1216*c*, and 1216*d*, and 1226*a*, 1226*b*, 1226*c*, and 1226*d* split therefrom eventually show same-shaped coding units split from the first coding unit 1200. Accordingly, by recursively splitting a coding unit in different manners based on at least one of block shape information and split shape mode information, the image decoding apparatus 100 may process a plurality of coding units in different orders even when the coding units are eventually determined to have the same shape.

FIG. 16 illustrates a process of determining a depth of a coding unit as a shape and size of the coding unit change when the coding unit is recursively split such that a plurality of coding units are determined, according to an embodiment.

According to an embodiment, the image decoding apparatus 100 may determine the depth of the coding unit, based on a predetermined criterion. For example, the predetermined criterion may be the length of a long side of the coding unit. When the length of a long side of a coding unit before being split is 2n times (n>0) the length of a long side of a split current coding unit, the image decoding apparatus 100 may determine that a depth of the current coding unit is increased from a depth of the coding unit before being split, by n. In the following descriptions, a coding unit having an increased depth is expressed as a coding unit of a deeper depth.

Referring to FIG. 16, according to an embodiment, the image decoding apparatus 100 may determine a second coding unit 1302 and a third coding unit 1304 of deeper depths by splitting a square first coding unit 1300 based on block shape information indicating a square shape (for example, the block shape information may be expressed as '0: SQUARE'). Assuming that the size of the square first coding unit 1300 is 2N×2N, the second coding unit 1302 determined by splitting a width and height of the first coding unit 1300 in ½ may have a size of N×N. Furthermore, the third coding unit 1304 determined by splitting a width and height of the second coding unit 1302 in ½ may have a size of N/2×N/2. In this case, a width and height of the third coding unit 1304 are ¼ times those of the first coding unit 1300. When a depth of the first coding unit 1300 is D, a depth of the second coding unit 1302, the width and height of which are ½ times those of the first coding unit 1300, may be D+1, and a depth of the third coding unit 1304, the width and height of which are ¼ times those of the first coding unit 1300, may be D+2.

According to an embodiment, the image decoding apparatus 100 may determine a second coding unit 1312 or 1322 and a third coding unit 1314 or 1324 of deeper depths by splitting a non-square first coding unit 1310 or 1320 based on block shape information indicating a non-square shape (for example, the block shape information may be expressed as '1: NS_VER' indicating a non-square shape, a height of which is longer than its width, or as '2: NS_HOR' indicating a non-square shape, a width of which is longer than a height).

The image decoding apparatus 100 may determine a second coding unit 1302, 1312, or 1322 by splitting at least one of a width and height of the first coding unit 1310 having a size of N×2N. That is, the image decoding apparatus 100 may determine the second coding unit 1302 having a size of N×N or the second coding unit 1322 having a size of N×N/2 by splitting the first coding unit 1310 in a horizontal direction, or may determine the second coding unit 1312 having a size of N/2×N by splitting the first coding unit 1310 in horizontal and vertical directions.

According to an embodiment, the image decoding apparatus 100 may determine the second coding unit 1302, 1312, or 1322 by splitting at least one of a width and height of the first coding unit 1320 having a size of 2N×N. That is, the image decoding apparatus 100 may determine the second coding unit 1302 having a size of N×N or the second coding unit 1312 having a size of N/2×N by splitting the first coding unit 1320 in a vertical direction, or may determine the second coding unit 1322 having a size of N×N/2 by splitting the first coding unit 1320 in horizontal and vertical directions.

According to an embodiment, the image decoding apparatus 100 may determine a third coding unit 1304, 1314, or 1324 by splitting at least one of a width and height of the second coding unit 1302 having a size of N×N. That is, the image decoding apparatus 100 may determine the third coding unit 1304 having a size of N/2×N/2, the third coding unit 1314 having a size of N/4×N/2, or the third coding unit 1324 having a size of N/2×N/4 by splitting the second coding unit 1302 in vertical and horizontal directions.

According to an embodiment, the image decoding apparatus 100 may determine the third coding unit 1304, 1314, or 1324 by splitting at least one of a width and height of the second coding unit 1312 having a size of N/2×N. That is, the image decoding apparatus 100 may determine the third coding unit 1304 having a size of N/2×N/2 or the third coding unit 1324 having a size of N/2×N/4 by splitting the second coding unit 1312 in a horizontal direction, or may determine the third coding unit 1314 having a size of N/4×N/2 by splitting the second coding unit 1312 in vertical and horizontal directions.

According to an embodiment, the image decoding apparatus 100 may determine the third coding unit 1304, 1314, or 1324 by splitting at least one of a width and height of the second coding unit 1322 having a size of N×N/2. That is, the image decoding apparatus 100 may determine the third coding unit 1304 having a size of N/2×N/2 or the third coding unit 1314 having a size of N/4×N/2 by splitting the second coding unit 1322 in a vertical direction, or may determine the third coding unit 1324 having a size of N/2×N/4 by splitting the second coding unit 1322 in vertical and horizontal directions.

According to an embodiment, the image decoding apparatus 100 may split the square coding unit 1300, 1302, or 1304 in a horizontal or vertical direction. For example, the image decoding apparatus 100 may determine the first coding unit 1310 having a size of N×2N by splitting the first coding unit 1300 having a size of 2N×2N in a vertical direction, or may determine the first coding unit 1320 having a size of 2N×N by splitting the first coding unit 1300 in a horizontal direction. According to an embodiment, when a depth is determined based on the length of the longest side of a coding unit, a depth of a coding unit determined by splitting the first coding unit 1300 having a size of 2N×2N in a horizontal or vertical direction may be the same as the depth of the first coding unit 1300.

According to an embodiment, a width and height of the third coding unit 1314 or 1324 may be ¼ times of those of the first coding unit 1310 or 1320. When a depth of the first coding unit 1310 or 1320 is D, a depth of the second coding unit 1312 or 1322, the width and height of which are ½ times of those of the first coding unit 1310 or 1320, may be D+1, and a depth of the third coding unit 1314 or 1324, the width and height of which are ¼ times of those of the first coding unit 1310 or 1320, may be D+2.

Figure 17:
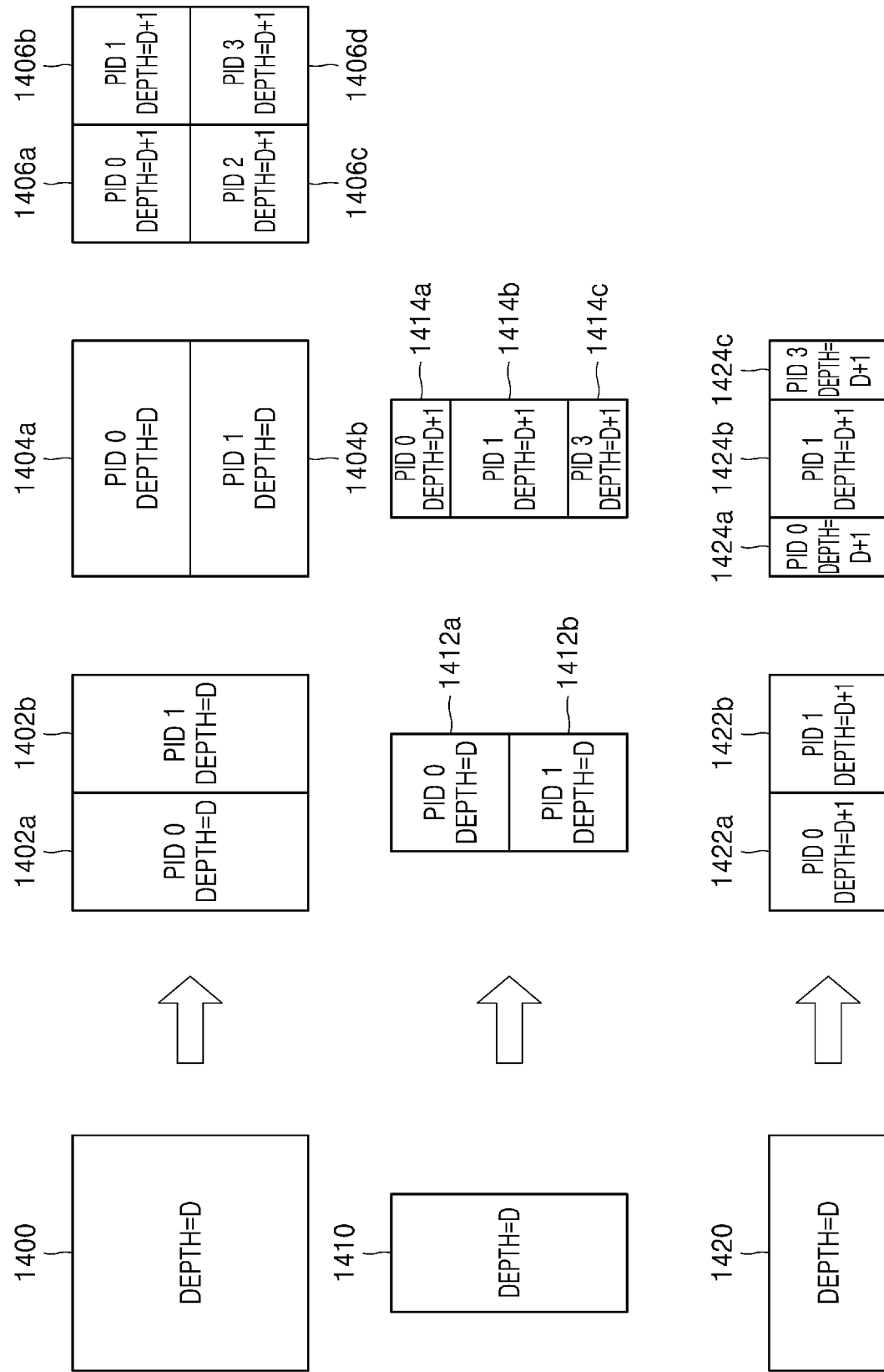
FIG. 17 illustrates depths that are determinable based on shapes and sizes of coding units, and part indexes (PIDs) that are for distinguishing the coding units, according to an embodiment.

FIG. 17 illustrates depths that are determinable based on shapes and sizes of coding units, and part indexes (PIDs) that are for distinguishing the coding units, according to an embodiment.

According to an embodiment, the image decoding apparatus 100 may determine various-shape second coding units by splitting a square first coding unit 1400. Referring to FIG. 17, the image decoding apparatus 100 may determine second coding units 1402a and 1402b, 1404a and 1404b, and 1406a, 1406b, 1406c, and 1406d by splitting the first coding unit 1400 in at least one of vertical and horizontal directions based on split shape mode information. That is, the image decoding apparatus 100 may determine the second coding units 1402a and 1402b, 1404a and 1404b, and 1406a, 1406b, 1406c, and 1406d, based on the split shape mode information of the first coding unit 1400.

According to an embodiment, depths of the second coding units 1402a and 1402b, 1404a and 1404b, and 1406a, 1406b, 1406c, and 1406d that are determined based on the split shape mode information of the square first coding unit 1400 may be determined based on the length of a long side thereof. For example, because the length of a side of the square first coding unit 1400 is equal to the length of a long side of the non-square second coding units 1402a and 1402b, and 1404a and 1404b, the first coding unit 1400 and the non-square second coding units 1402a and 1402b, and 1404a and 1404b may have the same depth, e.g., D. On the contrary, when the image decoding apparatus 100 splits the first coding unit 1400 into the four square second coding units 1406a, 1406b, 1406c, and 1406d based on the split shape mode information, because the length of a side of the square second coding units 1406a, 1406b, 1406c, and 1406d is ½ times the length of a side of the first coding unit 1400, a depth of the second coding units 1406a, 1406b, 1406c, and 1406d may be D+1 which is deeper than the depth D of the first coding unit 1400 by 1.

According to an embodiment, the image decoding apparatus 100 may determine a plurality of second coding units 1412a and 1412b, and 1414a, 1414b, and 1414c by splitting a first coding unit 1410, a height of which is longer than its width, in a horizontal direction based on the split shape mode information. According to an embodiment, the image decoding apparatus 100 may determine a plurality of second coding units 1422a and 1422b, and 1424a, 1424b, and 1424c by splitting a first coding unit 1420, a width of which is longer than its height, in a vertical direction based on the split shape mode information.

According to an embodiment, a depth of the second coding units 1412a and 1412b, and 1414a, 1414b, and 1414c, or 1422a and 1422b, and 1424a, 1424b, and 1424c, which are determined based on the split shape mode information of the non-square first coding unit 1410 or 1420, may be determined based on the length of a long side thereof. For example, because the length of a side of the square second coding units 1412a and 1412b is ½ times the length of a long side of the first coding unit 1410 having a non-square shape, a height of which is longer than its width, a depth of the square second coding units 1412a and 1412b is D+1 which is deeper than the depth D of the non-square first coding unit 1410 by 1.

Furthermore, the image decoding apparatus 100 may split the non-square first coding unit 1410 into an odd number of second coding units 1414a, 1414b, and 1414c based on the split shape mode information. The odd number of second coding units 1414a, 1414b, and 1414c may include the non-square second coding units 1414a and 1414c and the square second coding unit 1414b. In this case, because the length of a long side of the non-square second coding units 1414a and 1414c and the length of a side of the square second coding unit 1414b are ½ times the length of a long side of the first coding unit 1410, a depth of the second coding units 1414a, 1414b, and 1414c may be D+1 which is deeper than the depth D of the non-square first coding unit 1410 by 1. The image decoding apparatus 100 may determine depths of coding units split from the first coding unit 1420 having a non-square shape, a width of which is longer than its height, by using the aforementioned method of determining depths of coding units split from the first coding unit 1410.

According to an embodiment, the image decoding apparatus 100 may determine PIDs for identifying split coding units, based on a size ratio between the coding units when an odd number of split coding units do not have equal sizes. Referring to FIG. 17, a coding unit 1414b of a center location among an odd number of split coding units 1414a, 1414b, and 1414c may have a width being equal to that of the other coding units 1414a and 1414c and a height being twice that of the other coding units 1414a and 1414c. That is, in this case, the coding unit 1414b at the center location may include two of the other coding unit 1414a or 1414c. Therefore, when a PID of the coding unit 1414b at the center location is 1 based on a scan order, a PID of the coding unit 1414c located next to the coding unit 1414b may be increased by 2 and thus may be 3. That is, discontinuity in PID values may be present. According to an embodiment, the image decoding apparatus 100 may determine whether an odd number of split coding units do not have equal sizes, based on whether discontinuity is present in PIDs for identifying the split coding units.

According to an embodiment, the image decoding apparatus 100 may determine whether to use a particular splitting method, based on PID values for identifying a plurality of coding units determined by splitting a current coding unit. Referring to FIG. 17, the image decoding apparatus 100 may determine an even number of coding units 1412a and 1412b or an odd number of coding units 1414a, 1414b, and 1414c by splitting the first coding unit 1410 having a rectangular shape, a height of which is longer than its width. The image decoding apparatus 100 may use PIDs indicating respective coding units so as to identify the respective coding units. According to an embodiment, the PID may be obtained from a sample at a predetermined location of each coding unit (e.g., an upper left sample).

According to an embodiment, the image decoding apparatus 100 may determine a coding unit at a predetermined location from among the split coding units, by using the PIDs for distinguishing the coding units. According to an embodiment, when the split shape mode information of the first coding unit 1410 having a rectangular shape, a height of which is longer than its width, indicates to split a coding unit into three coding units, the image decoding apparatus 100 may split the first coding unit 1410 into three coding units 1414a, 1414b, and 1414c. The image decoding apparatus 100 may assign a PID to each of the three coding units 1414a, 1414b, and 1414c. The image decoding apparatus 100 may compare PIDs of an odd number of split coding units so as to determine a coding unit at a center location from among the coding units. The image decoding apparatus 100 may determine the coding unit 1414b having a PID corresponding to a middle value among the PIDs of the coding units, as the coding unit at the center location from among the coding units determined by splitting the first coding unit 1410. According to an embodiment, the image decoding apparatus 100 may determine PIDs for distinguishing split coding units, based on a size ratio between the coding units when the split coding units do not have equal sizes. Referring to FIG. 17, the coding unit 1414b generated by splitting the first coding unit 1410 may have a width being equal to that of the other coding units 1414a and 1414c and a height being twice that of the other coding units 1414a and 1414c. In this case, when the PID of the coding unit 1414b at the center location is 1, the PID of the coding unit 1414c located next to the coding unit 1414b may be increased by 2 and thus may be 3. When the PID is not uniformly increased as described above, the image decoding apparatus 100 may determine that a coding unit is split into a plurality of coding units including a coding unit having a size different from that of the other coding units. According to an embodiment, when the split shape mode information indicates to split a coding unit into an odd number of coding units, the image decoding apparatus 100 may split a current coding unit in such a manner that a coding unit of a predetermined location among an odd number of coding units (e.g., a coding unit of a center location) has a size different from that of the other coding units. In this case, the image decoding apparatus 100 may determine the coding unit of the center location, which has a different size, by using PIDs of the coding units. However, the PIDs and the size or location of the coding unit of the predetermined location are not limited to the aforementioned examples, and various PIDs and various locations and sizes of coding units may be used.

According to an embodiment, the image decoding apparatus 100 may use a predetermined data unit where a coding unit starts to be recursively split.

Figure 18:
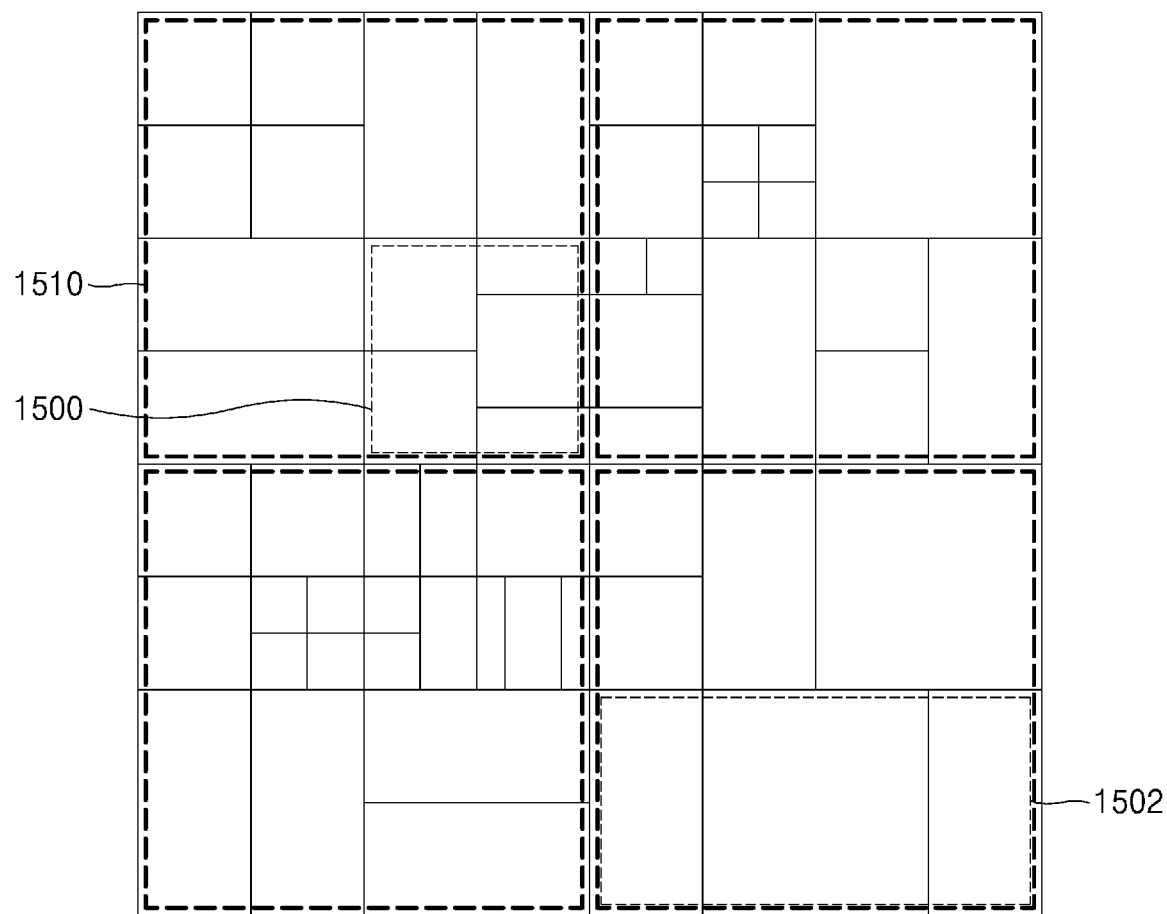
FIG. 18 illustrates that a plurality of coding units are determined based on a plurality of predetermined data units included in a picture, according to an embodiment.

FIG. 18 illustrates that a plurality of coding units are determined based on a plurality of predetermined data units included in a picture, according to an embodiment.

According to an embodiment, a predetermined data unit may be defined as a data unit where a coding unit starts to be recursively split by using at least one of block shape information and split shape mode information. That is, the predetermined data unit may correspond to a coding unit of an uppermost depth, which is used to determine a plurality of coding units split from a current picture. In the following descriptions, for convenience of explanation, the predetermined data unit is referred to as a reference data unit.

According to an embodiment, the reference data unit may have a predetermined size and a predetermined shape. According to an embodiment, the reference data unit may include M×N samples. Herein, M and N may be equal to each other, and may be integers expressed as powers of 2. That is, the reference data unit may have a square or non-square shape, and then may be split into an integer number of coding units.

According to an embodiment, the image decoding apparatus 100 may split the current picture into a plurality of reference data units. According to an embodiment, the image decoding apparatus 100 may split the plurality of reference data units, which are split from the current picture, by using the split shape mode information of each reference data unit. The operation of splitting the reference data unit may correspond to a splitting operation using a quadtree structure.

According to an embodiment, the image decoding apparatus 100 may previously determine the minimum size allowed for the reference data units included in the current picture. Accordingly, the image decoding apparatus 100 may determine various reference data units having sizes equal to or greater than the minimum size, and may determine one or more coding units by using the block shape information and the split shape mode information with reference to the determined reference data unit.

Referring to FIG. 18, the image decoding apparatus 100 may use a square reference coding unit 1500 or a non-square reference coding unit 1502. According to an embodiment, the shape and size of reference coding units may be determined based on various data units that may include one or more reference coding units (e.g., sequences, pictures, slices, slice segments, largest coding units, or the like).

According to an embodiment, the obtainer 105 of the image decoding apparatus 100 may obtain, from a bitstream, at least one of reference coding unit shape information and reference coding unit size information with respect to each of the various data units. An operation of splitting the square reference coding unit 1500 into one or more coding units has been described above in relation to the operation of splitting the current coding unit 300 of FIG. 6, and an operation of splitting the non-square reference coding unit 1502 into one or more coding units has been described above in relation to the operation of splitting the current coding unit 400 or 450 of FIG. 7. Thus, detailed descriptions thereof will not be provided herein.

According to an embodiment, the image decoding apparatus 100 may use a PID for identifying the size and shape of reference coding units, to determine the size and shape of reference coding units according to some data units previously determined based on a predetermined condition. That is, the obtainer 105 may obtain, from the bitstream, only the PID for identifying the size and shape of reference coding units with respect to each slice, each slice segment, or each largest coding unit which is a data unit satisfying a predetermined condition (e.g., a data unit having a size equal to or smaller than a slice) among the various data units (e.g., sequences, pictures, slices, slice segments, largest coding units, or the like). The image decoding apparatus 100 may determine the sizes and shapes of reference data units with respect to each data unit, which satisfies the predetermined condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the sizes and shapes of reference coding units may be previously determined. That is, the image decoding apparatus 100 may determine at least one of the sizes and shapes of reference coding units included in a data unit serving as a unit for obtaining the PID, by selecting the previously determined at least one of the size and shape of reference coding units based on the PID.

According to an embodiment, the image decoding apparatus 100 may use one or more reference coding units included in a largest coding unit. That is, a largest coding unit split from an image may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quadtree structure. That is, the image decoding apparatus 100 may determine the reference coding units by splitting the largest coding unit n times based on a quadtree structure, and may split the reference coding unit based on at least one of the block shape information and the split shape mode information according to various embodiments.

Figure 19:
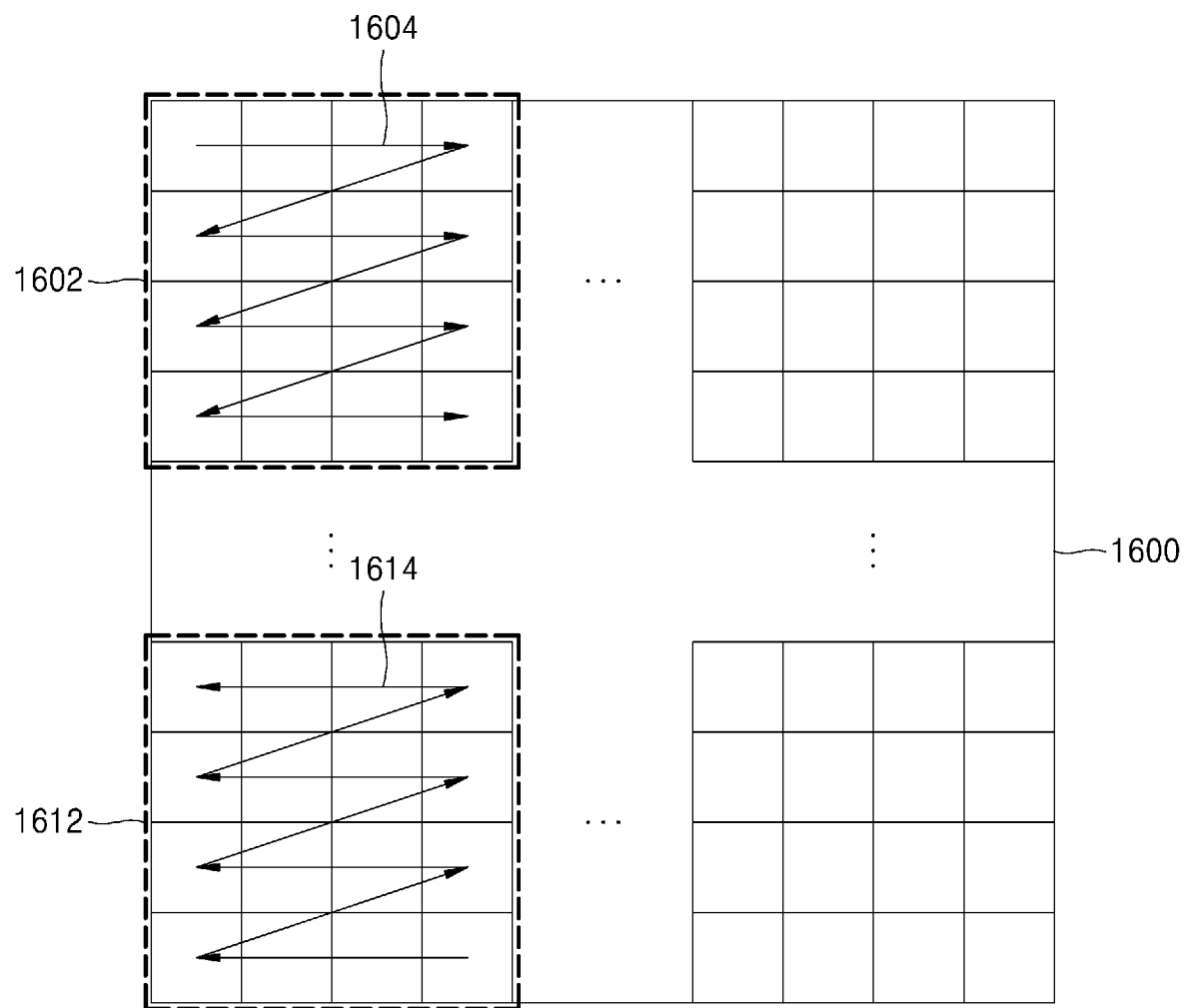
FIG. 19 illustrates a processing block serving as a criterion for determining a determination order of reference coding units included in a picture, according to an embodiment.

FIG. 19 illustrates a processing block serving as a criterion for determining a determination order of reference coding units included in a picture 1600, according to an embodiment.

According to an embodiment, the image decoding apparatus 100 may determine one or more processing blocks split from a picture. The processing block is a data unit including one or more reference coding units split from a picture, and the one or more reference coding units included in the processing block may be determined according to a particular order. That is, a determination order of one or more reference coding units determined in each of processing blocks may correspond to one of various types of orders for determining reference coding units, and may vary depending on the processing block. The determination order of reference coding units, which is determined with respect to each processing block, may be one of various orders, e.g., raster scan order, Z-scan, N-scan, up-right diagonal scan, horizontal scan, and vertical scan, but is not limited to the aforementioned scan orders.

According to an embodiment, the image decoding apparatus 100 may obtain processing block size information and may determine the size of one or more processing blocks included in the picture. The image decoding apparatus 100 may obtain the processing block size information from a bitstream and may determine the size of one or more processing blocks included in the picture. The size of processing blocks may be a predetermined size of data units, which is indicated by the processing block size information.

According to an embodiment, the obtainer 105 of the image decoding apparatus 100 may obtain the processing block size information from the bitstream according to each particular data unit. For example, the processing block size information may be obtained from the bitstream in a data unit such as an image, sequence, picture, slice, slice segment, or the like. That is, the obtainer 105 may obtain the processing block size information from the bitstream according to each of the various data units, and the image decoding apparatus 100 may determine the size of one or more processing blocks, which are split from the picture, by using the obtained processing block size information. The size of the processing blocks may be integer times that of the reference coding units.

According to an embodiment, the image decoding apparatus 100 may determine the size of processing blocks 1602 and 1612 included in the picture 1600. For example, the image decoding apparatus 100 may determine the size of processing blocks based on the processing block size information obtained from the bitstream. Referring to FIG. 19, according to an embodiment, the image decoding apparatus 100 may determine a width of the processing blocks 1602 and 1612 to be four times the width of the reference coding units, and may determine a height of the processing blocks 1602 and 1612 to be four times the height of the reference coding units. The image decoding apparatus 100 may determine a determination order of one or more reference coding units in one or more processing blocks.

According to an embodiment, the image decoding apparatus 100 may determine the processing blocks 1602 and 1612, which are included in the picture 1600, based on the size of processing blocks, and may determine a determination order of one or more reference coding units in the processing blocks 1602 and 1612. According to an embodiment, determination of reference coding units may include determination of the size of the reference coding units.

According to an embodiment, the image decoding apparatus 100 may obtain, from the bitstream, determination order information of one or more reference coding units included in one or more processing blocks, and may determine a determination order with respect to one or more reference coding units based on the obtained determination order information. The determination order information may be defined as an order or direction for determining the reference coding units in the processing block. That is, the determination order of reference coding units may be independently determined with respect to each processing block.

According to an embodiment, the image decoding apparatus 100 may obtain, from the bitstream, the determination order information of reference coding units according to each particular data unit. For example, the obtainer 105 may obtain the determination order information of reference coding units from the bitstream according to each data unit such as an image, sequence, picture, slice, slice segment, or processing block. Because the determination order information of reference coding units indicates an order for determining reference coding units in a processing block, the determination order information may be obtained with respect to each particular data unit including an integer number of processing blocks.

According to an embodiment, the image decoding apparatus 100 may determine one or more reference coding units based on the determined determination order.

According to an embodiment, the obtainer 105 may obtain the determination order information of reference coding units from the bitstream as information related to the processing blocks 1602 and 1612, and the image decoding apparatus 100 may determine a determination order of one or more reference coding units included in the processing blocks 1602 and 1612 and may determine one or more reference coding units, which are included in the picture 1600, based on the determination order. Referring to FIG. 19, the image decoding apparatus 100 may determine determination orders 1604 and 1614 of one or more reference coding units in the processing blocks 1602 and 1612, respectively. For example, when the determination order information of reference coding units is obtained with respect to each processing block, different types of the determination order information of reference coding units may be obtained for the processing blocks 1602 and 1612. When the determination order 1604 of reference coding units in the processing block 1602 is a raster scan order, reference coding units included in the processing block 1602 may be determined according to a raster scan order. On the contrary, when the determination order 1614 of reference coding units in the other processing block 1612 is a backward raster scan order, reference coding units included in the processing block 1612 may be determined according to the backward raster scan order.

According to an embodiment, the image decoding apparatus 100 may decode the determined one or more reference coding units. The image decoding apparatus 100 may decode an image, based on the reference coding units determined as described above. A method of decoding the reference coding units may include various image decoding methods.

According to an embodiment, the image decoding apparatus 100 may obtain, from the bitstream, block shape information indicating the shape of a current coding unit or split shape mode information indicating a splitting method of the current coding unit, and may use the obtained information. The block shape information or the split shape mode information may be included in the bitstream related to various data units. For example, the image decoding apparatus 100 may use the block shape information or the split shape mode information which is included in a sequence parameter set, a picture parameter set, a video parameter set, a slice header, or a slice segment header. Furthermore, the image decoding apparatus 100 may obtain, from the bitstream, a syntax element corresponding to the block shape information or the split shape mode information according to each largest coding unit, each reference coding unit, or each processing block, and may use the obtained syntax element.

The disclosure has been particularly shown and described with reference to embodiments thereof. In this regard, it will be understood by one of ordinary skill in the art that various changes in form and details may be made therein without departing from the scope of the disclosure. Therefore, the embodiments should be considered in a descriptive sense only and not for purposes of limitation. The scope of the disclosure is defined not by the detailed descriptions of the disclosure but by the following claims, and all differences within the scope will be construed as being included in the disclosure.

The embodiments of the disclosure can be written as a program executable on a computer, and can be implemented in general digital computers that execute the program by using a computer-readable recording medium. Examples of the computer-readable recording medium include magnetic storage media (e.g., ROM, floppy disks, hard disks, etc.), optical recording media (e.g., CD-ROMs, or DVDs), or the like.

What is claimed is:

1. An image decoding method comprising:
    determining at least one coding unit by hierarchically splitting a current image;
    determining at least one transform unit in the at least one coding unit;
    determining whether to decode residual data of the at least one transform unit according to a transform skip mode;
    based on determining that the residual data is to be decoded according to the transform skip mode, obtaining a significant subgroup flag about a subgroup in the at least one transform unit;
    based on the significant subgroup flag indicating that the subgroup comprises at least one non-zero significant coefficient and scanning information about coefficients of the subgroup, obtaining at least one first bin about at least one of a significant coefficient flag, a sign flag, a first flag, and a parity flag of a coefficient of a current scan position, the number of the at least one first bin being equal to or smaller than a predetermined number of bins, and the at least one first bin being arithmetic encoded by using a context model;
    obtaining the residual data comprising at least one coefficient in the subgroup, based on at least one of a base level of the coefficient of the current scan position obtained by arithmetic decoding the first bin by using the context model and a remainder of an absolute value excluding the base level; and
    obtaining a reconstruction block of the coding unit, based on the residual data,
    wherein the significant subgroup flag indicates whether the subgroup comprises the at least one non-zero significant coefficient,
    the significant coefficient flag indicates whether the coefficient of the current scan position is a non-zero coefficient,
    the first flag indicates whether an absolute value of the coefficient of the current scan position is greater than 1, and
    the parity flag of the coefficient of the current scan position indicates whether the coefficient of the current scan position is an odd number or an even number.

2. An image decoding apparatus comprising:
    at least one processor configured to:
    determine at least one coding unit by hierarchically splitting a current image;
    determine at least one transform unit in the at least one coding unit;
    determine whether to decode residual data of the at least one transform unit according to a transform skip mode;
    based on determining that the residual data is to be decoded according to the transform skip mode, obtain a significant subgroup flag about a subgroup in the at least one transform unit;
    based on the significant subgroup flag indicating that the subgroup comprises at least one non-zero significant coefficient and scan information about coefficients of the subgroup, obtain at least one first bin about at least one of a significant coefficient flag, a sign flag, a first flag, and a parity flag of a coefficient of a current scan position, the number of the at least one first bin being equal to or smaller than a predetermined number of bins and the at least one first bin being arithmetic encoded by using a context model,
    obtain the residual data comprising at least one coefficient in the subgroup, based on at least one of a base level of the coefficient of the current scan position obtained by arithmetic decoding the first bin by using the context model and a remainder of an absolute value excluding the base level, and
    obtain a reconstruction block of the coding unit, based on the residual data,
    wherein the significant subgroup flag indicates whether the subgroup comprises the at least one non-zero significant coefficient,
    the significant coefficient flag indicates whether the coefficient of the current scan position is a non-zero coefficient,
    the first flag indicates whether an absolute value of the coefficient of the current scan position is greater than 1, and
    the parity flag of the coefficient of the current scan position indicates whether the coefficient of the current scan position is an odd number or an even number.

3. An image encoding method comprising:
    determining at least one coding unit by hierarchically splitting a current image;
    determining at least one transform unit comprised in the coding unit;
    determining whether to encode residual data of the at least one transform unit according to a transform skip mode;
    based on determining that the residual data is to be encoded according to the transform skip mode, generating a significant subgroup flag about a subgroup in the at least one transform unit;
    based on the subgroup including at least one non-zero significant coefficient and scanning information about coefficients of the subgroup, generating at least one first bin by arithmetic encoding at least one of a significant coefficient flag, a sign flag, a first flag, and a parity flag of a coefficient of a current scan position by using a context model, the number of the at least one first bin being equal to or less than a predetermined number of bins; and
    generating a bitstream including the residual data that includes the significant subgroup flag and the first bin, wherein the significant subgroup flag indicates whether the subgroup comprises at least one non-zero significant coefficient, the significant coefficient flag indicates whether the coefficient of the current scan position is a non-zero coefficient, the first flag indicates whether an absolute value of the coefficient of the current scan position is greater than 1, and the parity flag of the coefficient of the current scan position indicates whether the coefficient of the current scan position is an odd number or an even number.

4. A non-transitory computer-readable storage medium storing a bitstream, the bitstream being encoded by an image encoding method comprising:

determining at least one coding unit by hierarchically splitting a current image;

determining at least one transform unit comprised in the coding unit;

determining whether to encode residual data of the at least one transform unit according to a transform skip mode;

based on determining that the residual data is to be encoded according to the transform skip mode, generating a significant subgroup flag about a subgroup in the at least one transform unit;

based on the subgroup including at least one non-zero significant coefficient and scanning information about coefficients of the subgroup, generating at least one first bin by arithmetic encoding at least one of a significant coefficient flag, a sign flag, a first flag, and a parity flag of a coefficient of a current scan position by using a context model, the number of the at least one first bin being equal to or less than a predetermined number of bins; and generating a bitstream including the residual data that includes the significant subgroup flag and the first bin, wherein the significant subgroup flag indicates whether the subgroup comprises at least one non-zero significant coefficient, the significant coefficient flag indicates whether the coefficient of the current scan position is a non-zero coefficient, the first flag indicates whether an absolute value of the coefficient of the current scan position is greater than 1, and the parity flag of the coefficient of the current scan position indicates whether the coefficient of the current scan position is an odd number or an even number.

* * * * *